United States Patent [19]

Caldarale et al.

[11] Patent Number: 5,659,794
[45] Date of Patent: Aug. 19, 1997

[54] SYSTEM ARCHITECTURE FOR IMPROVED NETWORK INPUT/OUTPUT PROCESSING

[75] Inventors: Charles R. Caldarale, Minneapolis; Peter J. Hancock, White Bear Lake; David R. Johnson, Oakdale; Robert M. Malek, White Bear Lake; James R. McBreen, Shoreview; Hans C. Mikkelsen, Afton; Jerome J. Witalka, Brooklyn Center, all of Minn.

[73] Assignee: Unisys Corporation, Blue Bell, Pa.

[21] Appl. No.: 414,900

[22] Filed: Mar. 31, 1995

[51] Int. Cl.⁶ ..................................................... H01J 3/00
[52] U.S. Cl. ................... 395/821; 395/200.02; 395/825; 395/826; 395/309; 395/733; 395/200.64
[58] Field of Search .................... 395/200.01, 200.02, 395/200.03, 200.06, 200.08, 200.1, 200.12, 200.14, 200.15, 200.2, 309, 822, 825, 827, 872, 882

[56] References Cited

U.S. PATENT DOCUMENTS

| | | | |
|---|---|---|---|
| 5,237,662 | 8/1993 | Green et al. | 395/275 |
| 5,243,699 | 9/1993 | Nickolls et al. | 395/275 |
| 5,299,313 | 3/1994 | Petersen et al. | 395/200 |
| 5,307,459 | 4/1994 | Petersen et al. | 395/200 |
| 5,363,488 | 11/1994 | Hidaka et al. | 395/275 |

*Primary Examiner*—Jack B. Harvey
*Assistant Examiner*—Raymond N. Phan
*Attorney, Agent, or Firm*—Charles A. Johnson; Mark T. Starr

[57] ABSTRACT

A network input/output processing system for sending and receiving messages between a large scale computer system and associated communications networks. Executive operating system services provide access to a control table, an input queue, and an output queue stored in the computer system's main memory. A network input/output processor responds to requests by application programs, through a communications program, for receiving input from and sending output to a network, concurrently with requests to communicate with directly attached peripheral devices such as disk drives, tape drives, and printers. The network input/output processor receives initialization, reset, and termination requests via the control table. Requests to receive input are received from the input queue. Input data is stored into buffers as directed by the input request. Requests to send output are received from the output queue. Output data is read from the buffers as directed by the output request. Executive operating system services provide for control of input data transfers and output data transfers. Special purpose Instruction Processor instructions provide the capability to build control programs for processing input and output messages used by the network input/output processor to effect message transfers, thereby minimizing host instruction pathlength for communications I/O. The system architecture minimizes internal data copy between processes by using transferable buffers as communications buffers.

34 Claims, 34 Drawing Sheets

SYSTEM ARCHITECTURE FOR IMPROVED NETWORK INPUT/OUTPUT PROCESSING

A portion of the disclosure of this patent application contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

This invention relates generally to input/output processing for computer systems, and more specifically to a network input/output architecture for a computer system that supports message transfers to and from computer networks.

2. Background Information

The efficient performance of input and output operations is one of the most critical requirements for computer system design. Contemporary large-scale computer systems typically interface with many different attached peripheral devices such as magnetic disk drives, optical disk drives, magnetic tape drives, cartridge tape libraries, and the like. Thus, a robust yet efficient mechanism must be provided to send output to and receive input from such devices. The operating system software of the computer system, together with the other software and microcode controlling the peripheral devices, must provide the application programmer with sufficient software interfaces so that the application program can implement its desired functionality. Input/Output (I/O) control systems are well known in the art for providing common interfaces to the various peripheral devices attached to the computer system. For an overview of I/O Control Systems and I/O instructions, the reader is directed to consult "The Encyclopedia of Computer Science," Third Edition, Anthony Ralston and Edwin D. Reilly, ed., pp. 672-80. One implementation of an I/O control system is known as an I/O Processor. An I/O processor is a specialized processing unit in the computer system that is dedicated to performing I/O functions to and from the attached peripheral devices. The presence of the I/O processor improves overall system performance because it relieves the Central Processing Unit (CPU) or other Instruction Processors (IPs) from much of the processing overhead associated with I/O operations. In some large scale systems, there may be many I/O Processors, each connected to a subset of the entire system's set of peripheral devices. The I/O Processor may, in conjunction with the operating system, support a secure, protected interface to the supported I/O functions for the benefit of the application programs being executed by the computer system. The I/O Processor detects I/O request-related errors and ensures that the application program cannot corrupt the I/O resources of the computer system. This protection is not without a cost, however. The overhead required to perform the extra error-checking detracts from the system's performance.

For communicating over communications networks such as Local Area Networks (LANs), Metropolitan Area Networks (MANs), and Wide Area Networks (WANs), most large scale computer systems use dedicated outboard communications processors such as the Distributed Communications Processor (DCP), commercially available from Unisys Corporation. These communications processors allow the application program running on the computer system to exchange data at a relatively high rate of speed with other computer systems, but at the cost of processing overhead due to the control and interface aspects of the computer system/communications processor linkage. Furthermore, a costly extra piece of equipment, the communications processor, is required to provide efficient communications I/O for the computer system.

A design approach providing access to communications networks and attached peripheral devices is desired. The preferred architectural solution would feature low overhead for communications processing with communications networks, and would provide support for high speed access to the attached peripheral devices with the necessary error detection capabilities. This solution should minimize the operating system overhead and I/O hardware/microcode overhead for communications I/O. In addition, it should eliminate the need for an outboard communications processor, thereby making the computer system less expensive. The integrated approach should also minimize the latency time of messages transferred to and from the network, thus increasing overall system performance. The present invention fulfills the above requirements for dramatically improving large scale computer system I/O performance.

SUMMARY OF THE INVENTION

An object of this invention is to efficiently perform I/O services of a computer system to and from connected communications networks.

Another object of this invention is execute I/O services to and from a variety of peripheral devices such as disk drives, tape drives, and printers, and to and from connected communications networks in a single I/O processor.

Another object of this invention is to provide an I/O processor that concurrently supports efficient access to communication networks and attached peripheral devices.

Yet another object of this invention is to provide a specialized network I/O processor that improves overall computer system performance due to increased efficiency in handling communications I/O at the same time it supports traditional I/O to attached peripheral devices.

Still another object of this invention is to minimize the host computer system instruction pathlength for physical communications I/O, thereby improving the overall performance of the system.

A further object of the present invention is to minimize the I/O hardware/microcode overhead for performing communications I/O.

Another object of the present invention is to give application programs access to improved operating system services for low-overhead construction of communications I/O programs.

Yet another object of this invention is to provide a system architecture where communications I/O can be done to and from application-accessible buffers to minimize the number of times data is copied from memory-to-memory within the system.

Still another object of this invention is to provide a low overhead mechanism for performing virtual to physical address translation for communications I/O, while still allowing the application accessible buffers to be dynamically removed from physical memory space.

Yet another object of the present invention is to provide new Instruction Processor (IP) instructions for reducing the overhead in constructing communications I/O programs.

Still another object of this invention is to increase the bandwidth and lower the latency for message data passed between a host computer system and a communications network interface.

Another object of this invention is to remove existing extraneous overhead and latency occurring when performing communications I/O requests due to the computer system executing protocol necessary for I/O to peripheral devices, but unnecessary for network communications.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the Drawings and Description of the Preferred Embodiment, with the scope and aspects of the invention defined in the appended claims.

According to the present invention, the foregoing and other objects and advantages are attained by a system architecture for performing network input/output processing operations. A network input/output processor supports application program requests to the operating system for sending output and receiving input from communications networks and attached peripheral devices. System microcode enhancements and specialized operating system constructs provide the capability to minimize the overhead necessary to perform communications I/O. Father efficiencies are provided by special-purpose instructions directly supporting communications I/O. With the network input/output processor, outboard communications processors for network communications are unnecessary, because the network input/output processor efficiently supports communications I/O and peripheral device I/O.

In accordance with an aspect of this invention, a network input/output processor comprises network input/output processing logic for processing communications I/O requests received from a computer system's instruction processor to send network output messages and receive network input messages. A network interface controller controls the interface with the communications networks and the network input/output processor to receive input data and send output data. Peripheral I/O requests are handled by channel input/output processing logic and a plurality of channel adapters for receiving peripheral device input data and sending peripheral device output data.

In accordance with another aspect of the invention, a method of input/output communication comprises the steps of initializing the network input/output processor to communicate with the peripheral devices and the communications networks, and accepting input/output requests from the instruction processor. Further steps include receiving a network input message from a communications network, storing the network input data into a main storage unit, and notifying the instruction processor of its arrival. Network output data received by the network input/output processor from the instruction processor is sent to a selected communications network and a status is returned to the instruction processor. Steps for receiving peripheral device input include initiating a request for peripheral input data, receiving the peripheral input data, and storing the peripheral input data in the main storage unit. Peripheral output data received by the network input/output processor from the instruction processor is sent to a selected peripheral device and a status is returned to the instruction processor.

Still other objects and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims.

DESCRIPTION OF THE PREFERRED EMBODIMENT

TABLE OF CONTENTS

I. Network I/O Architecture Overview
  A. Initialization
  B. Input Operation
  C. Output Operation
  D. Termination and Error Handling
II. Network I/O Processor Architecture Data Structures
  A. The NIOP Input Queue and the NIOP Output Queue
  B. Queue Banks
  C. The NIOP Queue Bank (NIOPQB)
  D. Message Program Buffers (MPBs)
  E. The Universal Processor Interface Control Table
    1. Channel Address Word Area
    2. Channel Status Words
    3. The Enable/Disable Network Interface Order Code
III. Network I/O Processor Architecture Algorithms
  A. Input Processing
  B. Output Processing
IV. Common Exec Services
  A. Overview
  B. INIT$NETWORK
  C. RSET$NETWORK
  D. TERM$NETWORK
V. Exec Service-Based Input/Output
  A. NET$IN and NET$OUT
VI. Instruction-Based Input/Output
  A. Network I/O Architecture Support Instructions
  B. An Example For Using The Network I/O Architecture Support Instructions Appendix A. Network I/O Architecture Support Instruction Algorithms

I. Network I/O Architecture Overview

Figure 1:
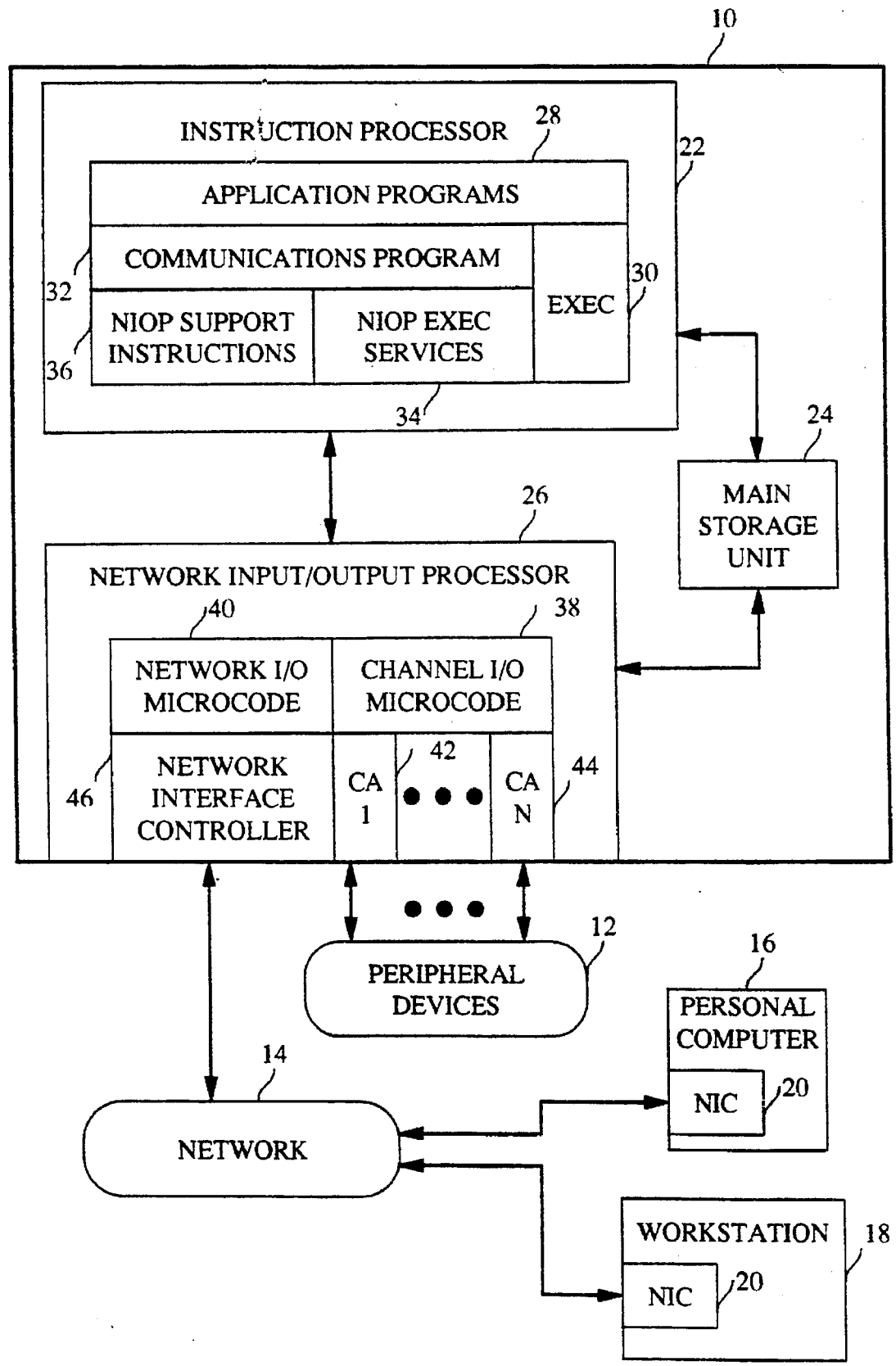
FIG. 1 is a block diagram illustrating the computer hardware and software components of the environment in which the present invention operates.

FIG. 1 is a block diagram illustrating the computer hardware and software components of the environment in which the present invention operates. A Computer System 10 is connected to various Peripheral Devices 12 and to at least one Network 14. In the preferred embodiment, the Computer System 10 is a 2200 Series Enterprise Server commercially available from Unisys Corporation, although other large scale computer systems may also be used. The Peripheral Devices 12 consist of magnetic and optical disk drives, magnetic tape drives, printers, and other devices directly connected to the Computer System 10. Each Network 14 may be a Local Area Network (LAN), a Metropolitan Area Network (MAN), or a Wide Area Network (WAN), each of which may support a variety of communications network interfaces such as the Fiber Distributed Data Interface (FDDI), Ethernet, and Asynchronous Transfer Mode (ATM) standards. Connected to the Network 14 are various Personal Computers 16, Workstations 18, or other servers, only one of each being shown in FIG. 1, but it being understood that the number of Personal Computers, Workstations, or other servers connected to the Network and desiring to communicate with the Computer System 10 may be from several systems to hundreds of systems. Within each such system is a Network Interface Card (NIC) 20, which enables an application program being executed by the Personal Computer 16 or Workstation 18 to communicate with the Computer System 10 via the Network 14.

There are three main components internal to the Computer System 10. There is at least one Instruction Processor (IP) 22, which executes instructions from the Computer System's Instruction Set Architecture (ISA). There is at least one Main Storage Unit (MSU) 24, which accepts requests from the Instruction Processor 22 to read data from and write data to the memory contained in the Main Storage Unit 24. Finally, there is at least one Network Input/Output Processor (NIOP) 26, which interfaces with the Peripheral Devices 12 and the Network 14 to implement Input/Output (I/O) requests from the Instruction Processor. The NIOP 26 also reads data from and writes data to the Main Storage Unit 24. Only one IP, MSU, and NIOP are shown in FIG. 1, but multiple IPs, MSUs, and NIOPs may be used in Computer Systems of different sizes and capabilities.

The IP 22 executes Application Programs 28 started by the users of the Computer System. During their execution by the IP, Application Programs 28 typically require services provided by the Operating System Executive (Exec) 30. For example, when an Application Program needs to read data from or write data to one of the Peripheral Devices 12, the Application Program calls an Exec I/O service to perform the requested function. If an Application Program needs to send a message to or receive a message from any other computer system (such as a Personal Computer 16 or Workstation 18) connected to the Network 14, the Application Program uses a service provided by the Communications Program 32. The Communications Program 32 is a computer program that provides network communications-related I/O services and is optimized for contemporary cooperative processing environments. The Communications Program 32 uses either Network I/O Processor (NIOP) Exec Services 34 or NIOP Support Instructions 36 to implement Application Program requests for communications I/O. NIOP Exec Services 34 provides operating system-level constructs to initialize, recover, and terminate a Network Interface and to control communications I/O over a Network Interface. NIOP Support Instructions 36 are additions to the Instruction Set Architecture of the Computer System 10 to allow the Communications Program 32 to directly control communications I/O incurring less system overhead than the NIOP Exec Services for controlling communications I/O. Either NIOP Exec Services 34 or NIOP Support Instructions 36 are supported in a given implementation of the Network I/O processing architecture. However, initialization, reset, and termination services common to both are used. More details of the NIOP Exec Services 34 and the NIOP Support Instructions 36 are provided below.

The Network I/O Processor (NIOP) 26 contains Channel Microcode 38 and Network I/O Microcode 40, both of which respond to requests from the IP 22 to communicate with the Peripheral Devices 12 and the Network 14, respectively. To implement requests for communication with the Peripheral Devices 12, the Channel Microcode 38 utilizes a Channel Adapter (CA) component. There are multiple CA cards present in an NIOP 26. These CAs are labeled CA 1 42 through CA N 44 on FIG. 1. The CAs support a number of industry standards applicable to I/O, including the Block Multiplexer Channel (BMC) standard (as specified in the Federal Information Processing Standards For I/O Channel Interfaces, FIPS60), the Intelligent Peripheral Interface (IPI) standard (as specified in IPI Physical Level, X3.129—1986; IPI Device-Generic Command Set for Magnetic and Optical Disk Drives, X3.132—1987; and IPI Device-Genetic Command Set for Magnetic Tape Drives, X3.147—1988), the Small Computer System Interface (SCSI) standard (as specified in X3.131—1986), and the Unisys Systems Connection (USCON) standard (supporting the Enterprise Systems Architecture/390 ESCON I/O Interface, IBM#SA22-7202). To implement requests for communication with computer systems connected to the Network 14, the Network I/O Microcode 40 utilizes the Network Interface Controller 46, which is essentially a counterpart to the NIC 20 contained in a Personal Computer 16 or a Workstation 18. There may be more than one Network Interface Controller 46 per NIOP, although only one is shown in FIG. 1. NICs may be bundled in physical, configurable entities called Network Channels. Each instance of a Network Interface Controller 46 and its connection to the Network 14 is called a Network Interface. The Network Interface embodies the logic which provides the interface from the Network I/O Microcode to the Network 14. The Network Interface implements the physical layer of the network protocol. For example, one NIOP 26 may have a Network Interface Controller communicating over an FDDI-based network and another Network Interface Controller communicating over an Ethernet-based network.

Note the dual functionality being performed by the NIOP 26. The NIOP concurrently handles requests to communicate with Peripheral Devices 12 and also the Network 14. These communications paths have very different requirements for initialization, input, output, termination, and error recovery, but are efficiently handled by one processing component, the NIOP 26.

Figure 2:
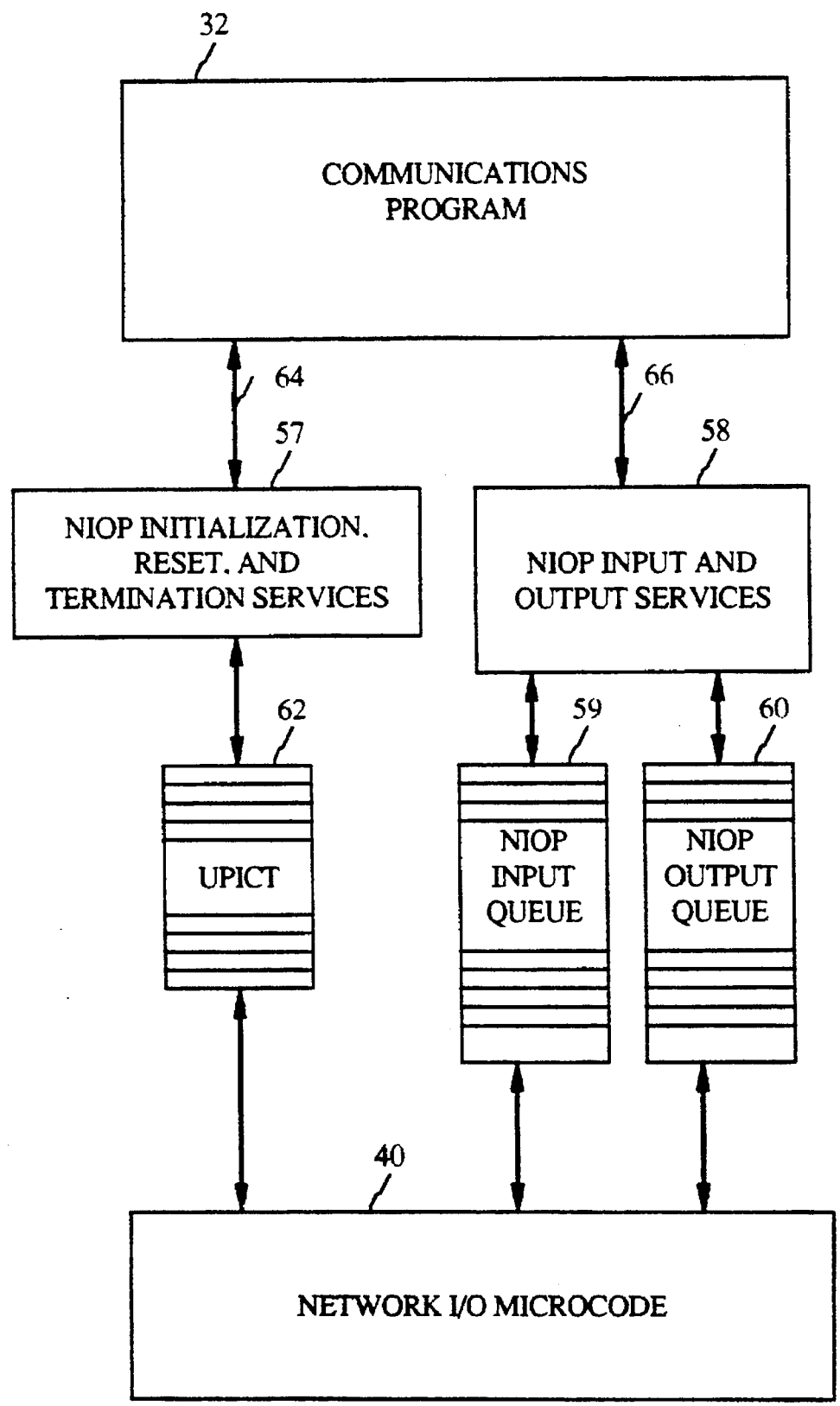
FIG. 2 is a block diagram illustrating the major components of the present invention.

FIG. 2 is a block diagram illustrating the major components of the present invention. The Communications Program 32 is the controller of every Network Interface. The NIOP Initialization, Reset, and Termination Services 57 provides initialization, termination, and NIOP error handling services. Network I/O initiation services are provided by the NIOP Exec Services 34 (for Exec Service-based systems) or the NIOP Support Instructions 36 (for Instruction-based systems), both of which are represented on FIG. 2 as NIOP Input and Output Services 58. Message data to be transferred to the Network reside in NIOP message buffers made up of Queue Banks. A Queue Bank (not shown) is a unit of storage in the Main Storage Unit 24 consisting of a Control Area and a Text Area. The Control Area (which is transparent to Application Programs) contains control fields used by the Instruction Processor (IP) 22 in performing queuing and I/O management functions. The Text Area holds a description of the message to be held in the Queue Bank and the message data itself. The message data is described by one or more Access Control Words (ACWs).

For each Network Interface, two queues are used as the main host software/Network I/O Microcode interface. The NIOP Input Queue 59 is used to pass Input Message Programs (IMPs) from the Communications Program to the Network I/O Microcode. The NIOP Input Queue 59 resides in the Main Storage Unit. An IMP is a description of the storage area in the Main Storage Unit where the Network I/O Microcode writes input messages received from the Network. An IMP consists of a series of Transfer Descriptor Words (TDWs), one for each portion of the storage area where portions of input messages are written. Upon completion of an input message transfer, the Network I/O Microcode writes the completion status to the NIOP Input Queue 59. The NIOP Output Queue 60 is used to pass Output Message Programs (OMPs) from the Communications Program to the Network I/O Microcode. The NIOP Output Queue 60 also resides in the Main Storage Unit. An OMP is a description of the storage area where an output message to be sent over the Network is held. An OMP consists of a series of TDWs, one for each portion of the storage area from where output messages are retrieved. Upon completion of an output message transfer, the Network I/O Microcode writes the completion status to the NIOP Output Queue 60. For output transfers, the Network I/O Microcode is allowed to present an early successful completion status. This allows the Network I/O Microcode to increase its efficiency because the Network I/O Microcode can obtain multiple NIOP Output Queue entries, write successful completion status for each, and then actually transmit the data over the network at a later point in time. (If the Network I/O Microcode cannot send the data, the error is handled like an error in transmission over the network by the upper layer protocol.) For IMPs and OMPs, the first TDW is located in the NIOP Input Queue/NIOP Output Queue entries. Subsequent TDWs, if any, reside within a Message Program Buffer (MPB) (not shown in FIG. 2). There is an MPB associated with each NIOP Input Queue/NIOP Output Queue entry. The NIOP Input Queue, NIOP Output Queue, and associated MPBs reside in an NIOP Queue Bank (NIOPQB) (not shown in FIG. 2), which is stored in the Main Storage Unit. There is one NIOPQB per Network Interface.

In addition to the NIOP Input Queue and NIOP Output Queue, the Universal Processor Interface Control Table (UPICT) is used to pass initialization and termination functions and status between the Exec 30 and the Network I/O Microcode 40. The Universal Processor Interface (UPI) is the means by which various types of processors in the Computer System 10 communicate with an IP 22. The UPI is a processor-to-processor signal used by a processor to notify another processor that there is a message in a mailbox requiring its attention. The UPICT is a control structure that has the IP-to-NIOP and the NIOP-to-IP mailboxes for a particular NIOP. There is one UPICT per NIOP. The UPICT resides in the Main Storage Unit 24.

For Network Interface initialization and termination, three Exec services are defined. These services are applicable to NIOPs supporting either Exec Service-based systems or Instruction-based systems. Software interface 64 represents the call from the Communications Program to these three services. The INIT$NETWORK Exec service is used by the Communications Program 32 to initialize a Network Interface. The RSET$NETWORK Exec service is used by the Communications Program 32 to reset a Network Interface. The TERM$NETWORK Exec service is used by the Communications Program 32 to terminate a Network Interface.

For Exec Service-based systems, two NIOP Exec Services 34 are defined for placing IMPs and OMPs on the two NIOP queues. Software interface 66 represents the subroutine call from the Communications Program to these two services. The NET$IN Exec service builds IMPs, enqueues IMPs to an NIOP Input Queue 58, and releases completed IMPs. The NET$OUT Exec service builds OMPs, enqueues OMPs to an NIOP Output Queue 60, and releases completed OMPs. For Instruction-based systems, the NIOP Support Instructions 36 replace the NIOP Exec Services 34 to provide instructions whose functions are equivalent to NET$IN and NET$OUT. These instructions allow a non-privileged program, such as the Communications Program 32, to directly interface with the Network I/O Processor without the risk of corruption of memory (e.g., the Communications Program cannot alter the real (physical memory) addresses in an IMP (which could cause input messages to be written to the wrong area of memory). For both Exec Service-based and Instruction-based systems, the Communications Program 32 retrieves Network Interface status by directly reading the status placed in the NIOP queues by the Network I/O Processor. Network Interface functions such as station management and utility functions are passed between the Communications Program and the Network Interface Controller 46 (not shown in FIG. 2) via specially designated messages. These messages receive no special processing by the Exec, the NIOP Support Instructions, or the Network I/O Processor.

A. Initialization

Figure 3:
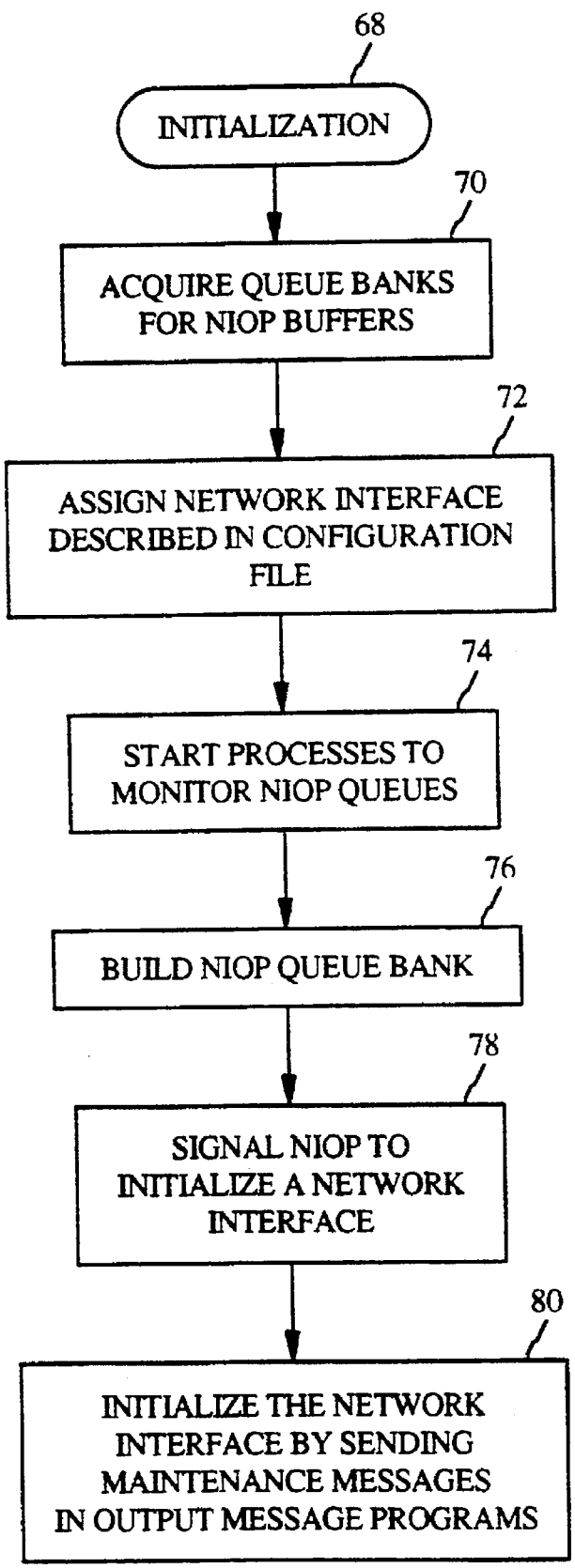
FIG. 3 flow chart illustrating the steps for initializing a Network Interface according to the present invention.

FIG. 3 is a flow chart illustrating the steps for initializing a Network Interface according to the present invention. Initialization 68 of the Network Interface readies the NIOP to accept input from and send output to the Network. At Step 70, the Communications Program 32 acquires Queue Banks from a Computer System Available Queue for use as NIOP buffers. The NIOP buffers store input and output message data. There is no predetermined or pre-existing relationship between Queue Banks and a Network Interface. Next, at Step 72, the Communications Program exclusively assigns the Network Interface(s) described in its configuration fie. The processes in the Communications Program which monitor the NIOP queues are started at Step 74. The Communications Program requests the Exec to initialize the Network Interface by building the NIOP Queue Bank (NIOPQB) at Step 76, and by signaling the NIOP to initialize the Network Interface at Step 78. For Exec Service-based systems, the gate addresses for NET$IN and NET$OUT and the virtual addresses of the NIOPQB and a data structure called the NIOP Control Bank (NIOPCB) (described further below) are returned. For Instruction-based systems, the virtual addresses of the NIOPQB and NIOPCB are returned. The Communications Program initializes the Network Interface by sending maintenance messages in Output Message Programs through the Network I/O Microcode to the Network Interface at Step 80. Message transfer can now begin through the Network Interface.

Figure 4:
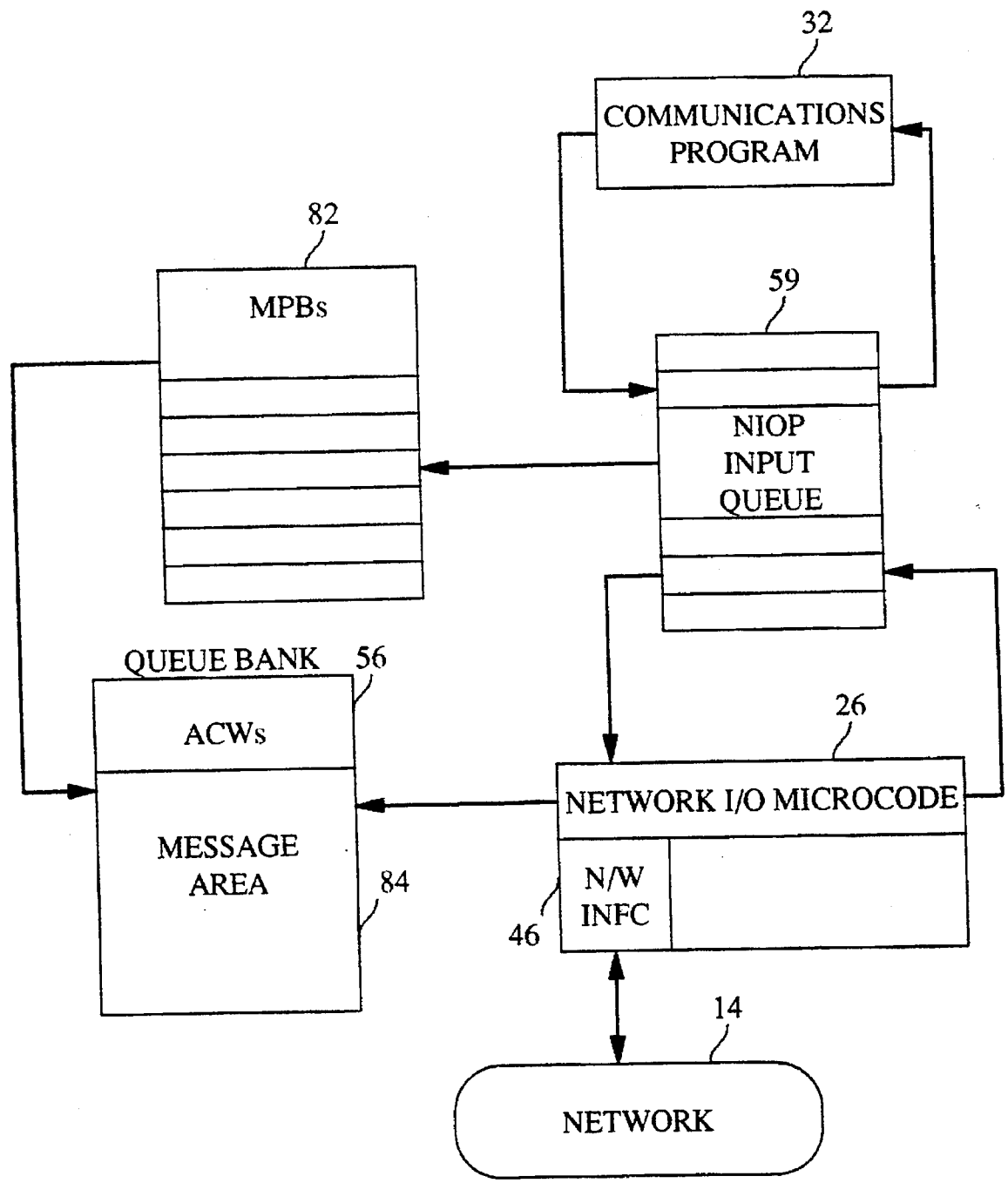
FIG. 4 is a block diagram illustrating an input operation for the present invention.
Figure 5:
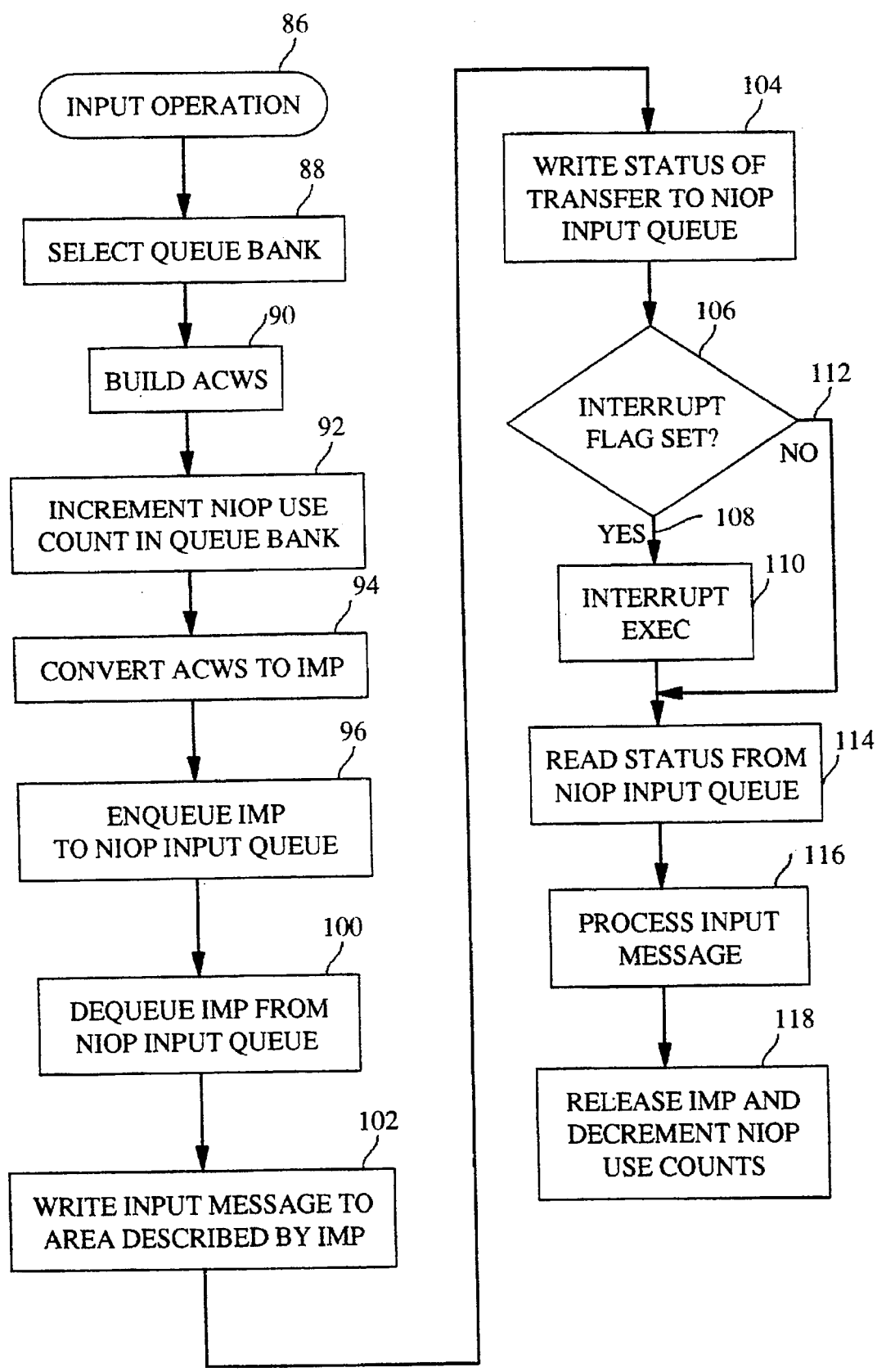
FIG. 5 is a flow chart illustrating the steps for performing an input operation according to the present invention.

B. Input Operation FIG. 4 is a block diagram illustrating an input operation for the present invention. The system components used to get input data from the Network 14 include the Network Interface (N/W INFC) 46, the Network I/O Microcode 40 being executed by the NIOP, the NIOP Input Queue 59, and the Communications Program 32. FIG. 5 is a flow chart illustrating the steps for performing an input operation according to the present invention. The Input operation 86 commences with Step 88, where a Queue Bank is selected for receiving an input message. At Step 90, Access Control Words (ACWs) 56 describing the Message Area 84 of the Queue Bank (as shown on FIG. 4) are built by the Communications Program. An NIOP Use Count is then incremented at Step 92 to indicate that the Queue Bank real addresses are in use by the NIOP. The ACWs in the Queue Bank are converted to an Input Message Program (IMP) (which is a series of TDWs in the MPB) at Step 94. Next, the IMP is enqueued to the NIOP Input Queue by copying the first TDW from the MPB to the NIOP Input Queue entry and writing the Message ID to the NIOP Input Queue entry at Step 96. (Note that the Valid bit (discussed further below) was set in this first TDW when it was written to the MPB). For Instruction-based systems, Steps 92 through 96 are accomplished by the Build IMP (BIMP) and Enqueue To NIOP Input Queue (ENIQ) instructions described below. For Exec Service-based systems, these steps are performed by the NET$IN Exec service 34 for the particular interface, as called by the Communications Program 32. When an input message arrives over the Network 14 through the Network Interface 46, IMPs are dequeued from the NIOP Input Queue 59 by the Network I/O Microcode at Step 100. The input message is written at Step 102 by the Network I/O Microcode 40 to the area described by the IMP. The status of the data transfer is then written to the NIOP Input Queue entry at Step 104. If the interrupt flag associated with the NIOP Input Queue is set at Test Step 106, Yes path 108 is taken to Step 110, where the Network I/O Microcode presents an interrupt to the Exec 30. This interrupt is an indication that a Communications Program process needs to be activated to process the input message. If the interrupt flag is not set, No path 112 is taken to Step 114. At this step, the Communications Program 32 reads the status from the NIOP Input Queue. Next, at Step 116, the input message is processed by the Communications Program. Normal storage read instructions are used to access the NIOP Input Queue in the Main Storage Unit 24. At Step 118, the IMP is released, Queue Bank NIOP Use Counts are decremented for each Queue Bank in the IMP and the NIOP Input Queue entry is made available for reuse. For Instruction-based systems, this is accomplished by the Release Input Message Program (RIMP) instruction. For Exec Service-based systems, this is accomplished by a future call to the NET$IN service.

Figure 6:
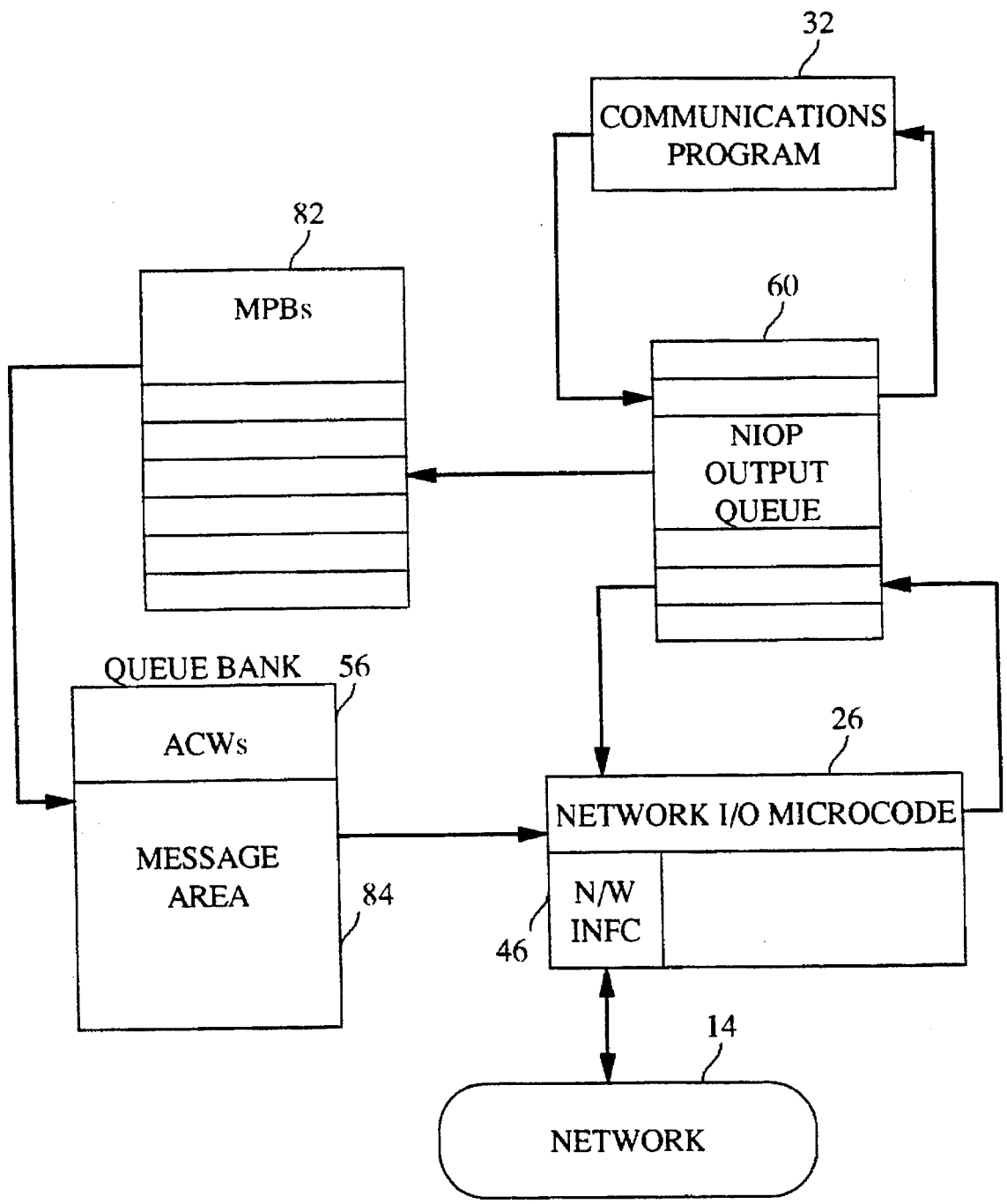
FIG. 6 is a block diagram illustrating an output operation for the present invention.
Figure 7:
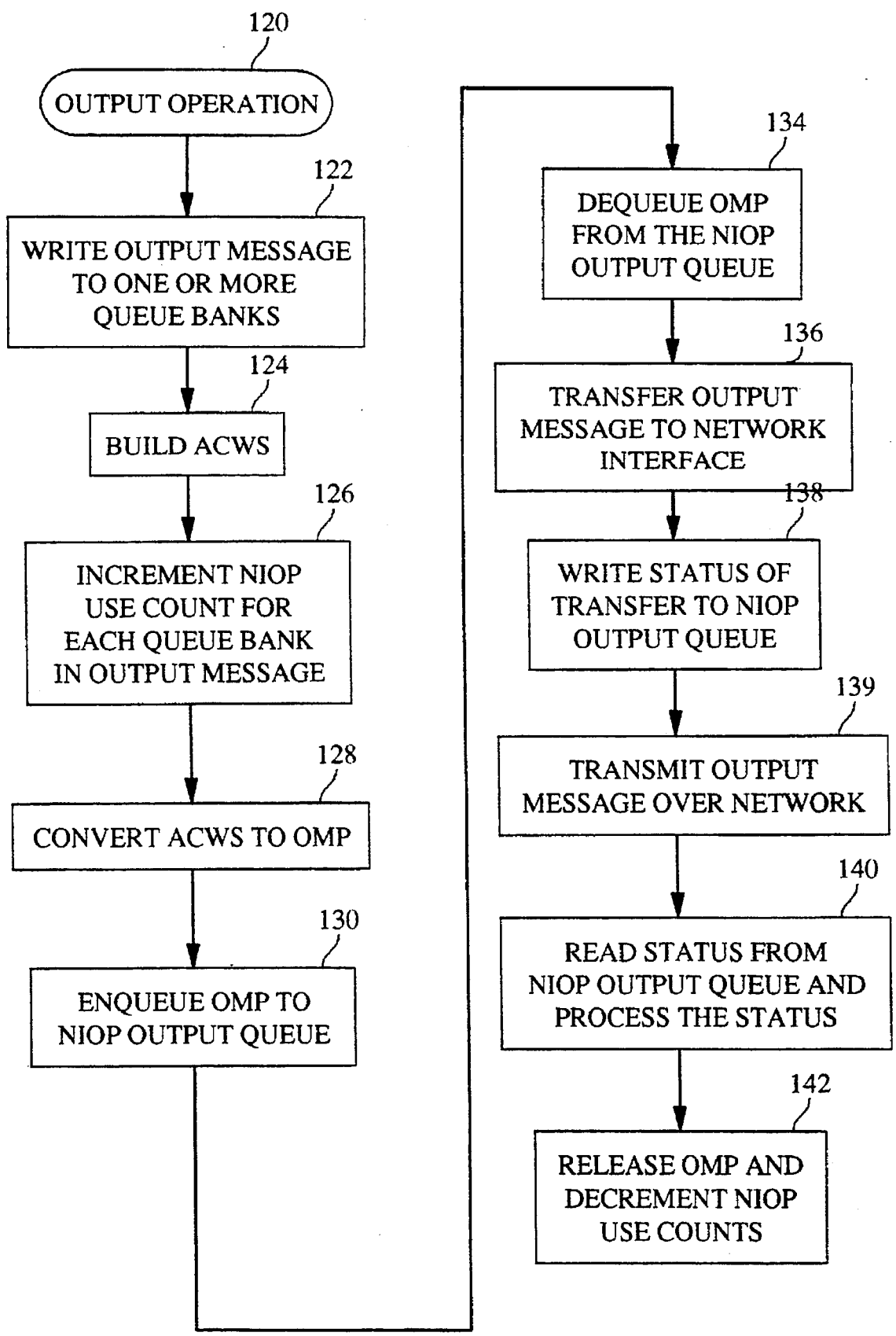
FIG. 7 is a flow chart illustrating the steps for performing an output operation according to the present invention.

C. Output Operation FIG. 6 is a block diagram illustrating an output operation for the present invention. The system components used to send output data to the Network 14 include the Network Interface Controller 46, the Network I/O Microcode 26 being executed by the NIOP, the NIOP Output Queue 60, and the Communications Program 32. FIG. 7 is a flow chart illustrating the steps for performing an output operation according to the present invention. The Output operation 120 commences with Step 122. At this step, the output message is written to one or more Queue Banks within the Message Area 84 by the Communications Program 32 and the Application Program. The Application Program writes the application-level message to be sent, and the Communications Program writes the network protocol segments needed to deliver the message over the Network and the Access Control Words (ACWs). The ACWs 56 describing the Message Area are built at Step 124. An NIOP Use Count for each Queue Bank in the output message is incremented by Step 126 to indicate that the Queue Bank real addresses are in use by the NIOP. Next, at Step 128, the ACWs are converted to an Output Message Program (OMP). Next, the OMP is enqueued to the NIOP Output Queue by the Communications Program 32 by copying the first TDW from the MPB to the NIOP Output Queue entry and writing the Message ID to the NIOP Output Queue entry at Step 130. (Note that the Valid bit (discussed further below) was set in this first TDW when it was written to the MPB). For Instruction-based systems, Steps 126 through 130 are accomplished by the Build OMP (BOMP) and Enqueue To NIOP Output Queue (ENOQ) instructions described below. For Exec Service-based systems, these steps are performed by the NET$OUT Exec service 34 for the particular interface, as called by the Communications Program 32. At Step 134, the OMP is dequeued from the NIOP Output Queue 60 by the Network I/O Microcode 40. The output message is then transferred to the Network Interface (N/W INFC) 46. At Step 138, the status of the transfer is written to the NIOP Output Queue entry by the Network I/O Microcode. After the status is written, at Step 139, the output message is transmitted over the Network. The Communications Program 32 reads the status from the NIOP Output Queue at Step 140 and processes it. At Step 142, the OMP is released, Queue Bank NIOP Use Counts are decremented for each Queue Bank in the OMP, and the NIOP Output Queue entry is made available for reuse. For Instruction-based systems, this is accomplished by the Release Output Message Program (ROMP) instruction. For Exec Service-based systems, this is accomplished by a future call to the NET$OUT service.

D. Termination and Error Handling

Hardware/microcode errors detected in the Network Interface 46 component of the NIOP 26 are reported to the Communications Program using the NW INFC RA 156 in the NIOP Input Queue or NIOP Output Queue entry used for the message transfer. The protocol used for the Network handles message recovery in the event of an error. The Communications Program ignores the input message if an error is detected during reception and assumes the message transfer completed successfully for output messages. Other hardware/microcode errors that are detected are reported to the Communications Program using the NIOP RA 154 in the NIOP Input Queue or NIOP Output Queue entry used for the message transfer and to the Exec 30 in the UPI Control Table 62. The Communications Program's response to these errors is to down, then reinitialize the Network Interface. For errors detected in the input message data (such as checksum errors), the error is reported to the Communications Program in the NIOP Input Queue entry used for the message transfer. Network protocol is then used to handle message recovery and the Communications Program ignores the input message.

The Exec 30 provides two services to support the error handling needed by network input/output. The first service provides for the resetting of a Network Interface. The second service provides for the termination of the Communications Program's use of a Network Interface.

II. Network I/O Processor Architecture Data Structures

A. The NIOP Input Queue and the NIOP Output Queue

Figure 8:
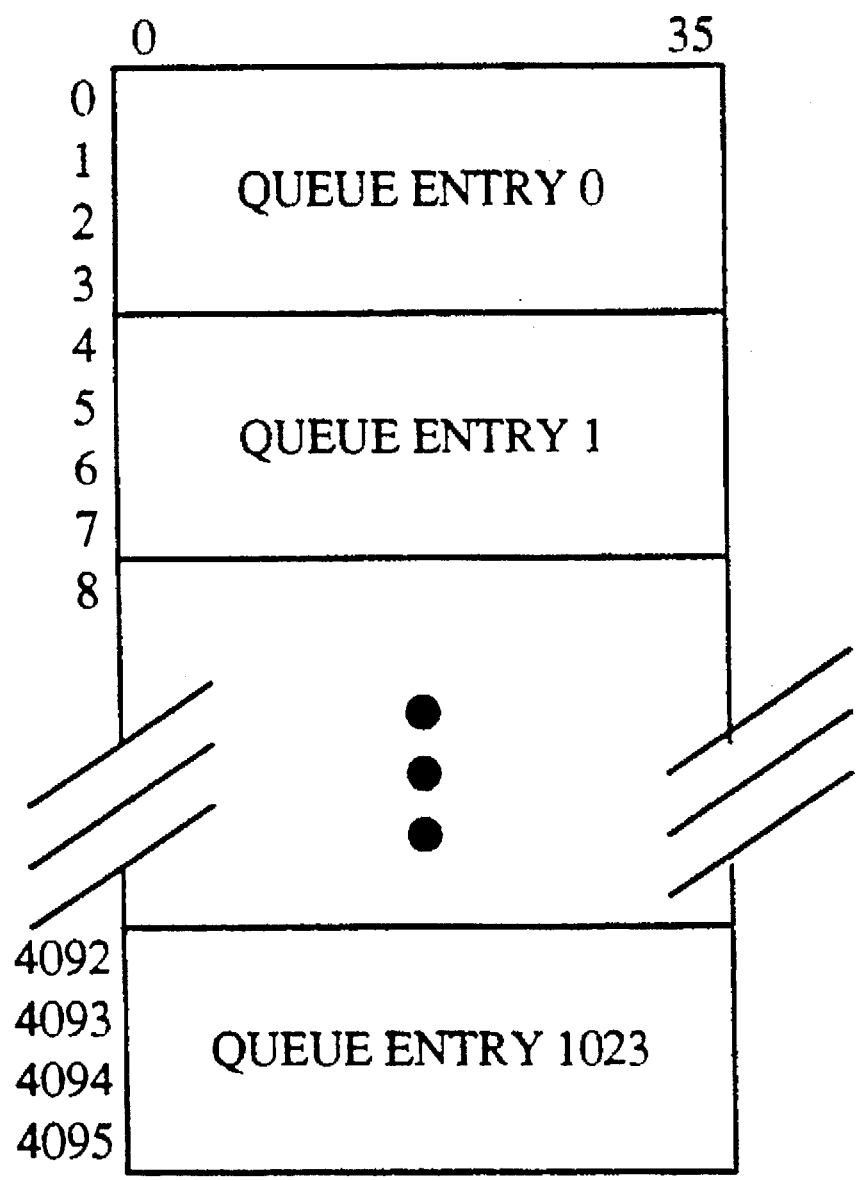
FIG. 8 is a diagram showing the format of the NIOP Input Queue and NIOP Output Queue.

The NIOP Input Queue 58 is used to pass Input Message Programs (IMPs) from software being executed by the Instruction Processor 22 to the Network I/O Microcode 40 and completion status from the Network I/O Microcode to the IP-based software. An IMP is a description of the storage area in the Main Storage Unit 24 to which the NIOP writes input messages received from the Network. The IMP consists of one or more Transfer Descriptor Words (TDWs). The NIOP Output Queue 60 is used to pass Output Message Programs (OMPs) from software being executed by the Instruction Processor 22 to the Network I/O Microcode 40 and completion status from the Network I/O Microcode to the IP-based software. The OMP also consists of one or more TDWs. FIG. 8 is a diagram showing the format of the NIOP Input Queue and NIOP Output Queue. In the preferred embodiment, the NIOP Input Queue and NIOP Output Queue are 4096 36-bit words long and consist of 1024 four-word entries. The queues begin at 4096-word boundaries in memory contained in the Main Storage Unit. The Network I/O Microcode is passed the real address of the first NIOP Input Queue or NIOP Output Queue entry to be alequeued via an Enable/Disable Network Interface Order Code. Because only a single NIOP dequeues from the NIOP Input Queue and the NIOP Output Queue, the NIOP does not lock the NIOP Input Queue and NIOP Output Queue, and a dequeue pointer is maintained internally for each queue by the Network I/O Microcode. Each queue entry contains a Valid bit, which indicates the validity of the queue entry. The validity of the Valid bit is from the Network I/O Microcode's perspective. If the Valid bit is set, the Network I/O Microcode has a queue entry to process. The NIOP Exec Services 34 (for Exec service-based systems) or the NIOP Support Instructions 36 (for Instruction-based systems) set the Valid bit when an IMP is enqueued to an NIOP Input Queue entry or when an OMP is enqueued to an NIOP Output Queue entry. If the Valid bit is clear in the queue entry addressed by the Network I/O Microcode's dequeue pointer, then the Network I/O Microcode polls the Valid bit. When the Valid bit is set, the Network I/O Microcode reads the queue entry and performs the message transfer request. Upon transfer completion, the Network I/O Microcode clears the Valid bit, which indicates that the queue entry contains the completion status.

Figure 9A:
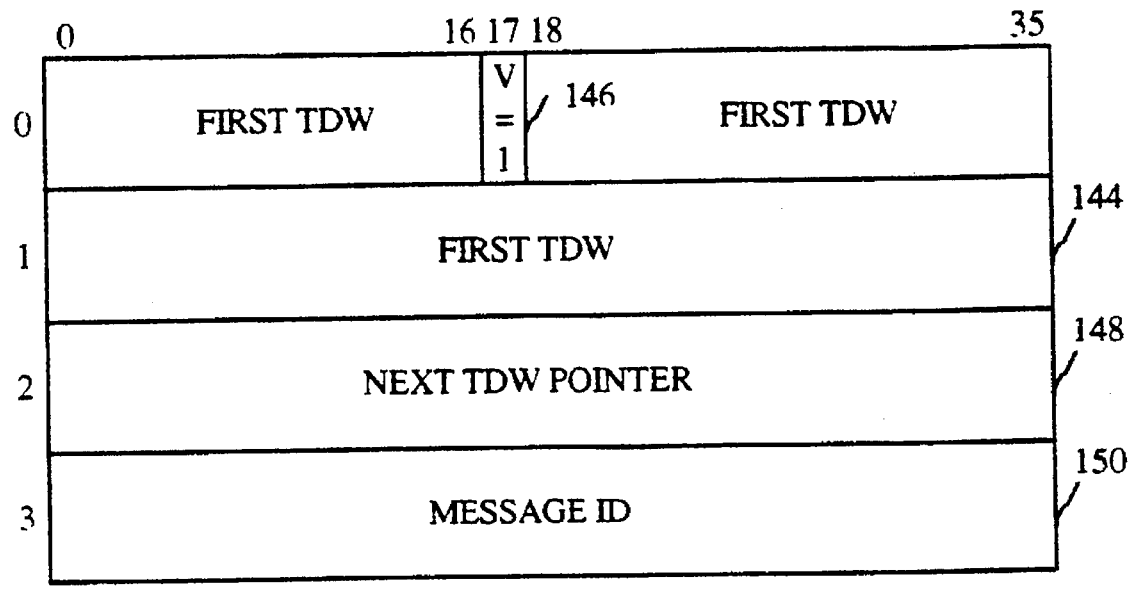
FIG. 9A is a diagram of an NIOP Queue entry at initiation time.
Figure 9B:
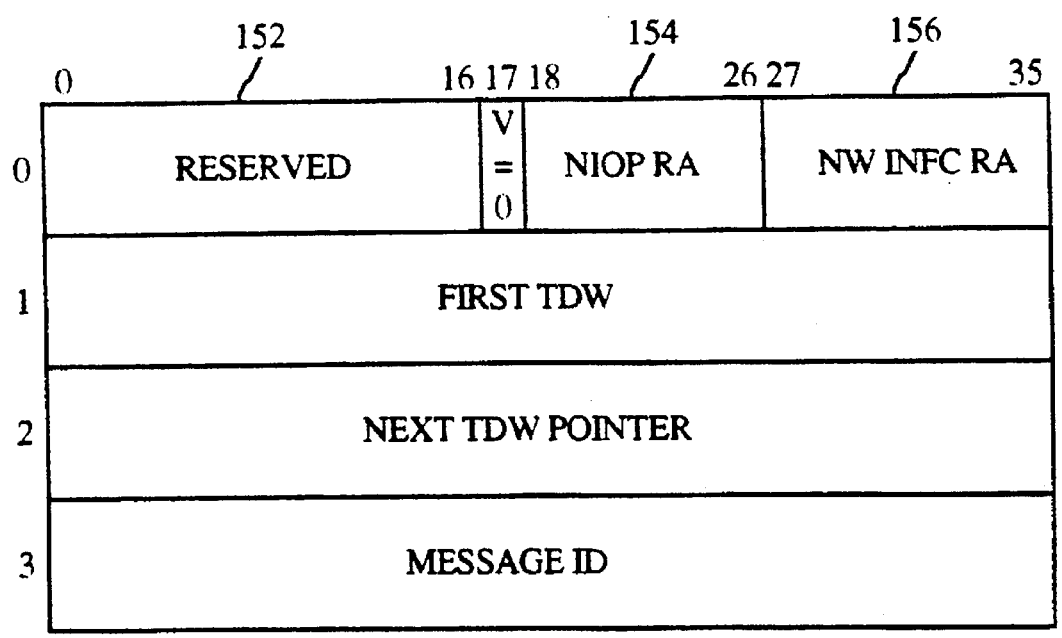
FIG. 9B is a diagram of an NIOP Queue entry at completion time.

FIG. 9A is a diagram of an NIOP Queue entry at initiation time. Bits 0-35 of Words 0-1 hold the First Transfer Descriptor Word (TDW) 144 of an IMP or OMP. Bit 17 of Word 0 holds the Valid bit 146. The Valid bit is used by the NIOP to determine if the queue entry contains a valid message program. The Valid bit is cleared by the NIOP when the completion status is written. Bits 0-35 of Word 2 hold the Next TDW Pointer 148. If the Data Chain (DC) bit (discussed below) is set in the First TDW, this field holds the real address of the second TDW of the IMP (or OMP). If the DC bit is clear in the First TDW, this field is ignored. Bits 0-35 of Word 3 are the Message ID 150. FIG. 9B is a diagram of an NIOP Queue entry at completion time. Words 1 through 3 of the entry remain as in FIG. 9A. Bits 0-16 of Word 0 are now Reserved 152. Bits 18-26 of Word 0 hold an NIOP Recovery Action (NIOP RA) 154. This field is used by the Communications Program to check the completion status of the message transfer. When this field is zero, no recovery action is required because the transfer is assumed to be successfully completed. (Note that the NIOP is allowed to report an error in the data transfer asynchronously) If this field is non-zero, the field specifies a recovery action to be attempted by the NIOP Exec Services and/or the Communications Program. Bits 27-35 of Word 0 hold the Network Interface Recovery Action (NW INFC RA) 156. If the NIOP RA 154 indicates that the Network Interface status should be checked, then the NW INFC RA indicates the appropriate action for Network Interface error recovery by the Communications Program. Error checking and recovery is done by the Communications Program, and not by the Exec, as much as possible. This approach minimizes the negative side effects of two entities controlling the interface For all other NIOP RA indications, the NW INFC RA is ignored.

Figure 10:
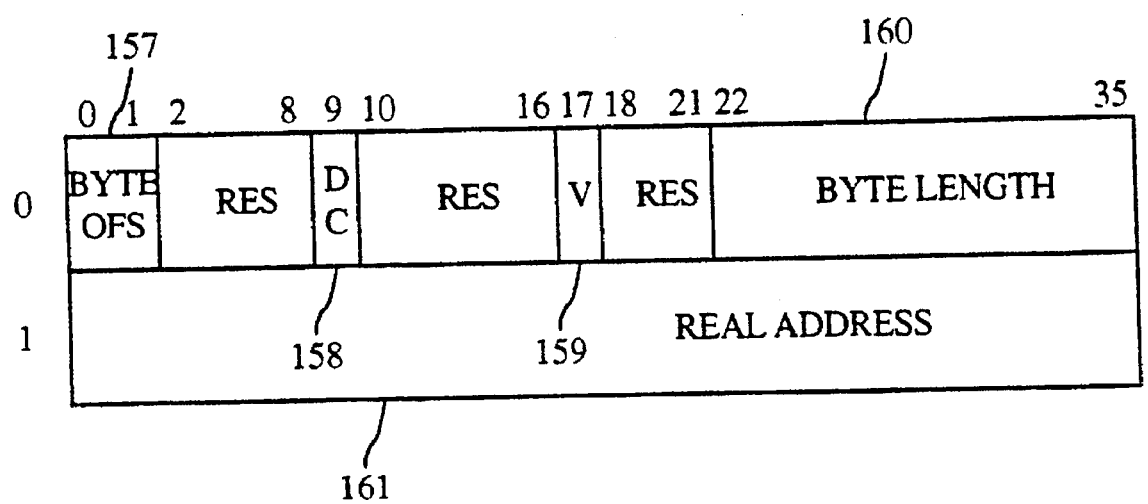
FIG. 10 is a diagram of the format of a Transfer Descriptor Word.

Transfer Descriptor Words (TDWs) are the entries in the Input and Output Message Programs. TDWs hold the real address and byte length of a message buffer (or portion thereof), and control information. There is one or more TDWs for each segment of a message. FIG. 10 is a diagram of the format of a Transfer Descriptor Word. The Byte Offset (BYTE OFS) field 157, in Bits 0–1 of Word 0, specifies the byte offset in the first word of an output message segment. If the Byte Offset value is zero, the location of the first byte transferred is Bits 1–8 of the first word of the message segment. If the Byte Offset value is one, the location of the first byte is Bits 10–17. If the Byte Offset value is two, the location of the first byte is Bits 19–26. If the Byte Offset value is three, the location of the first byte is Bits 28–35. For Input Message Program TDWs, the Byte Offset must be zero. Bits 2–8, 10–16, and 18–21 of Word 0 of the TDW are Reserved (RES). The Data Chain (DC) field 158, in Bit 9 of Word 0, if set, indicates that another TDW follows this TDW. If DC is clear, it indicates that this TDW is the last TDW in the IMP or the OMP. The Valid bit 159 is stored in Bit 17 of Word 0. For the first TDW in an IMP or an OMP, the Valid bit is used by the NIOP to determine if the NIOP Input Queue/NIOP Output Queue entry contains a valid IMP/OMP. The Valid bit is cleared by the NIOP when the completion status is written. For all other TDWs, this bit is reserved. The Byte Length field 160, in Bits 22–35 of Word 0, indicates the number of bytes in the portion of the message buffer described by the TDW. The maximum area described by a TDW is 16,384 bytes. The Real Address field 161, in Bits 0–35 of Word 1, specifies the real address in the Main Storage Unit of the first word of the message segment described by the TDW.

Figure 11:
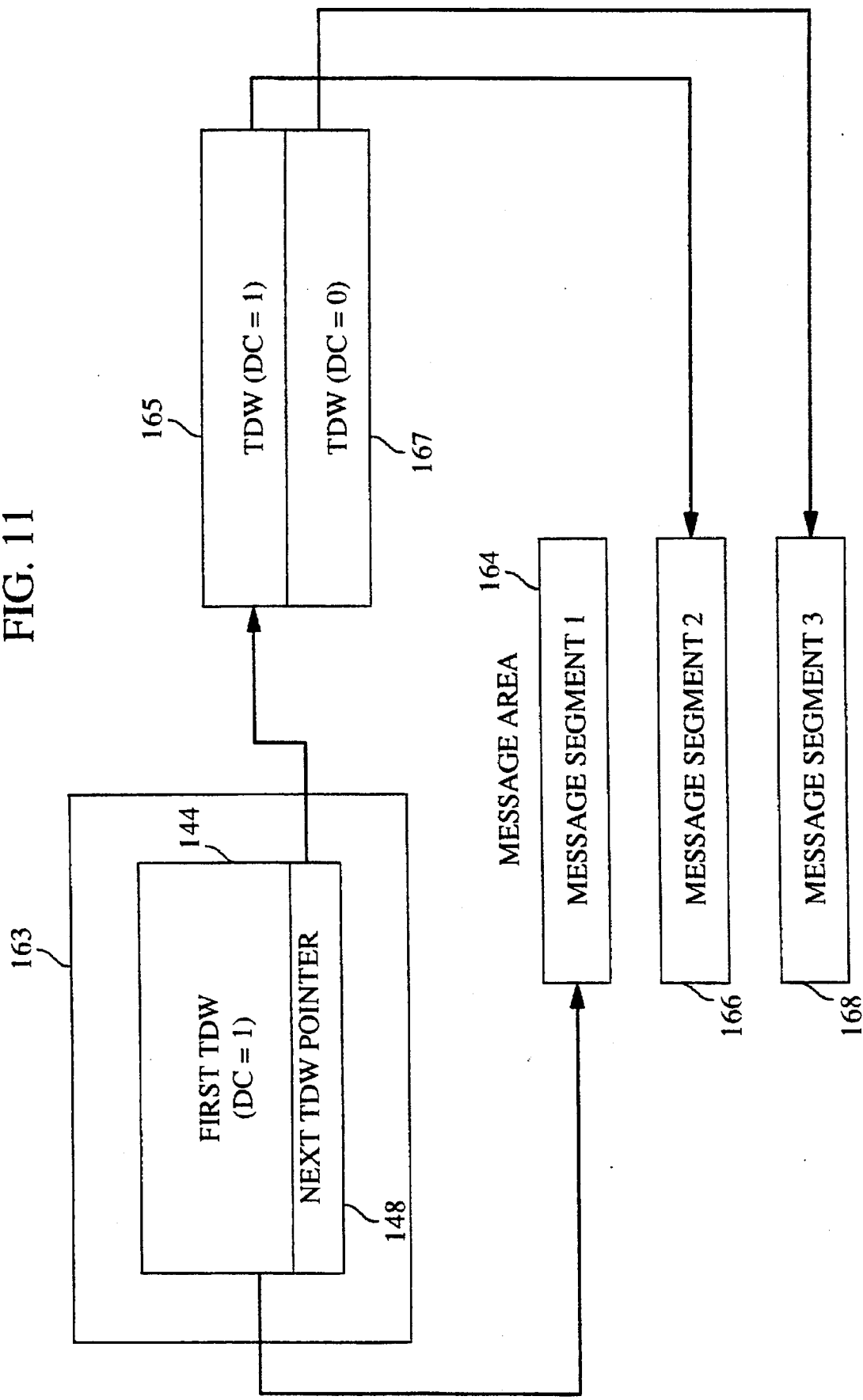
FIG. 11 is a block diagram showing an example of an Input Message Program with three message segments.

FIG. 11 is a block diagram showing an example of an Input Message Program with three message segments. The NIOP Input Queue entry 163 has its First TDW field 144 pointing to the first word of the message segment. The First TDW has its DC field set to one. The Next TDW Pointer field 148 points to another TDW 165, which points to the second message segment 166. The second TDW has its DC field set to one, indicating it is part of a data chain. The next contiguous word in the real address space holds the final TDW 167, which points to the third message segment 168. This final TDW has its DC field set to zero, indicating that there are no more TDWs in the IMP. An OMP may consist of a chain of TDWs in a similar manner. To minimize memory references, the NIOP Input Queue/NIOP Output Queue/MPB format requires that the Network I/O Microcode accesses the MPB only if more than one TDW is required to describe the message buffer.

B. Queue Banks

Figure 12:
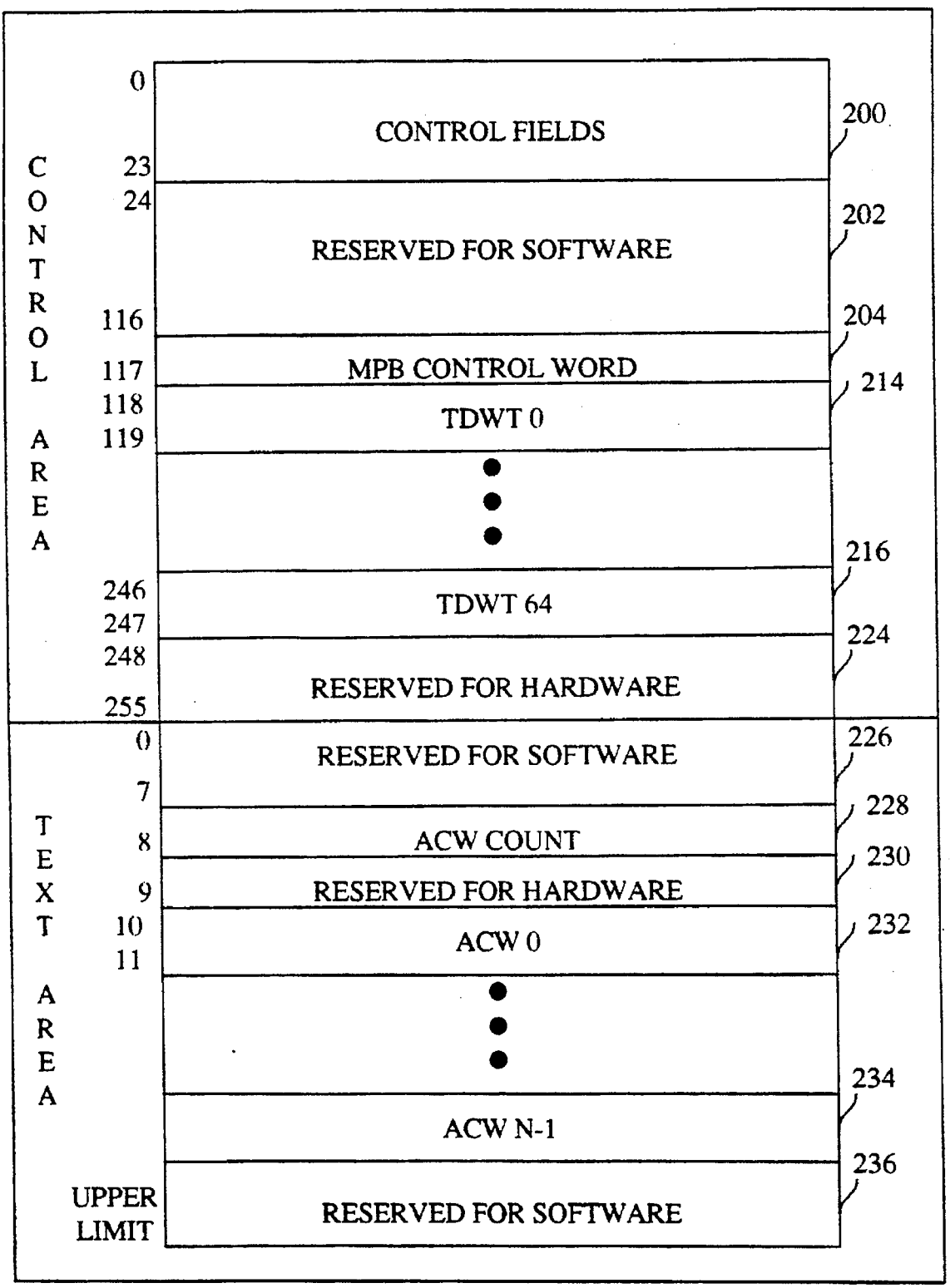
FIG. 12 is a diagram of the format of a Queue Bank used as an NIOP buffer.
Figure 13A:
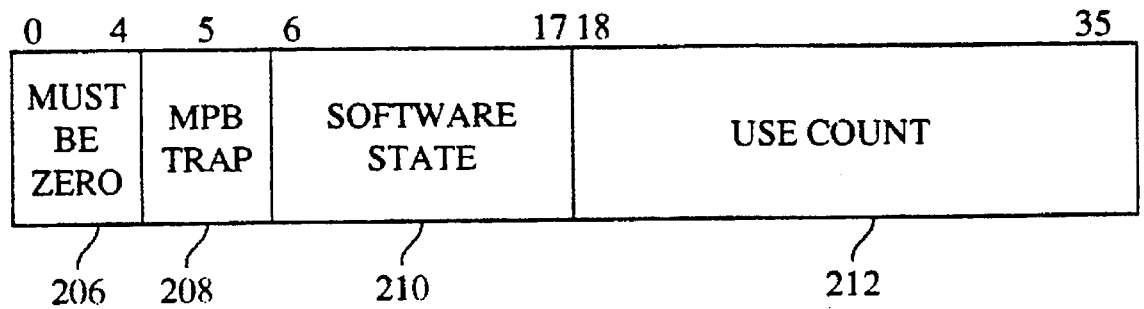
FIG. 13A is a diagram of the format of the Message Program Buffer Control Word.

Queue Banks are used as NIOP message buffers. Queue Banks enable an Application Program to Communications Program interface based on bank bequeathal rather than data copy operations. This enables the system to avoid the processor overhead related to data copies, which is especially important for large messages used in such applications as file transfers and manipulation of multimedia data objects. Queue Banks also enable minimal overhead access validation. FIG. 12 is a diagram of the format of a Queue Bank used as an NIOP buffer. The first 256 words of the Queue Bank represent the Control Area and the remaining words represent the Text Area. Within the Control Area are a plurality of Control Fields 200 and space Reserved For Software 202 use. A Message Program Buffer (MPB) Control Word 204 is in Word 117 of the Control Area. FIG. 13A is a diagram of the format of the MPB Control Word. The MPB Control Word is used to manage a Queue Bank's use in MPBs. Bits 0–4 of the MPB Control Word must be zero 206. The MPB Trap field 208, in Bit 5, is used to delay the use of this Queue Bank in an IMP or OMP until the memory mangament function is done managing memory pages in the Queue Bank. Otherwise, the Build IMP or Build OMP instruction or the NET$IN or NET$OUT service attempts to add the specified Queue Bank to the IMP or OMP, respectively. The Software State field 210, in Bits 6–17, is used to hold Exec-internal state. The NIOP Use Count field 212, in Bits 18–35, is an unsigned integer which indicates the number of times the Queue Bank is active as an IMP/OMP buffer. The NIOP Use Count is incremented by a Build IMP or Build OMP instruction and decremented by a Release IMP or Release OMP instruction. The NIOP Use Count is also incremented and decremented by NET$IN and NET$OUT Exec services.

Figure 13B:
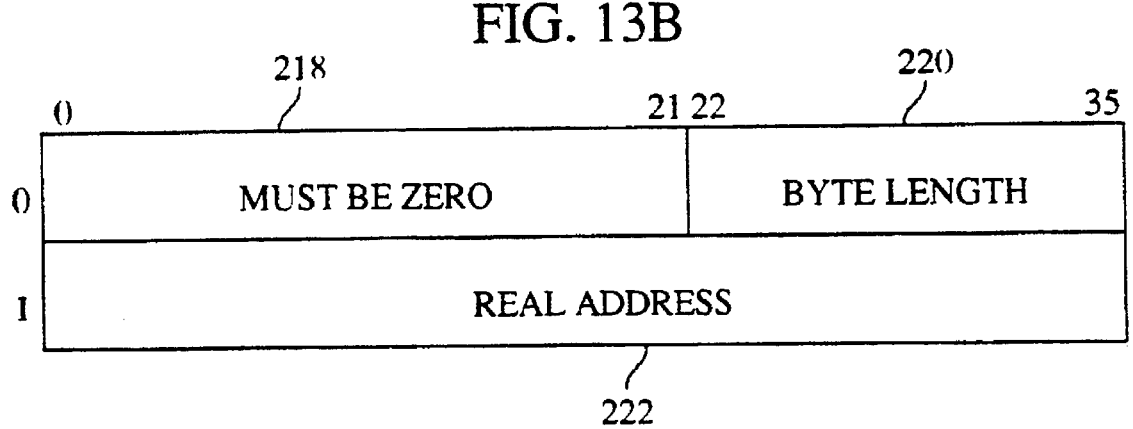
FIG. 13B is a diagram of the format of a Transfer Descriptor Word Template.

Referring back to FIG. 12, Transfer Descriptor Word Templates (TDWTs) are used by Build IMP and Build OMP instructions to translate Queue Bank relative addresses to real addresses used in IMP or OMP Transfer Descriptor Words (TDWs). The NET$IN and NET$OUT Exec services also use TDWTs to build TDWs. In the preferred embodiment, there are 65 TDWTs supported in each Queue Bank, numbered from TDWT 0 214 to TDWT 64 216. These TDWTs describe each page of the Queue Bank Text Area. Each TDWT consists of two words. FIG. 13B is a diagram of the format of a Transfer Descriptor Word Template. Bits 0–21 of Word 0 of a TDWT must be zero 218. The Byte Length field 220, in Bits 22–35 of Word 0, indicates the number of valid bytes of message area in the memory page associated with this TDWT. Any non-zero value indicates that the full page is resident in memory (although some of the page may not be accessible because it holds the Queue Bank Control Area or is beyond the Queue Bank Upper Limit). The Real Address field 222, in Bits 0–35 of Word 1, indicates the real address of the first word of the page associated with this TDWT.

Figure 13C:
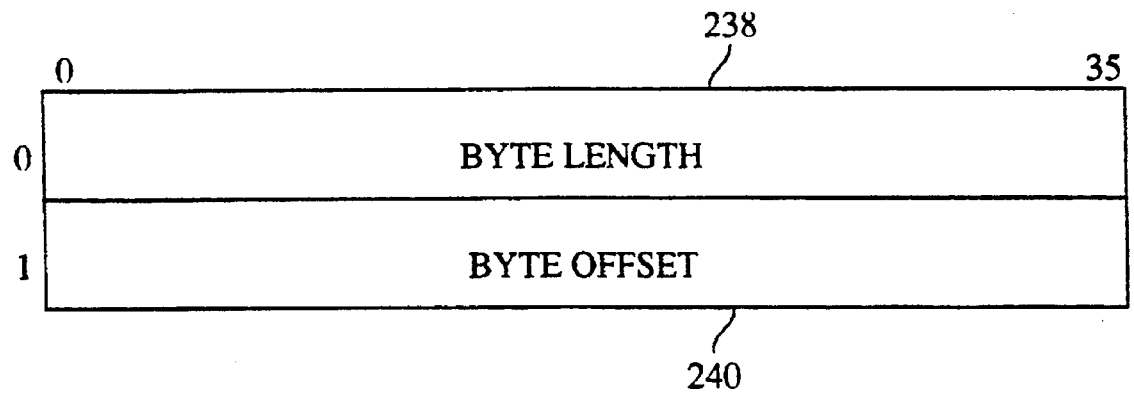
FIG. 13C is a diagram of the format of an Access Control Word.

Referring back to FIG. 12, Words 248 through 255 of the Control Area are Reserved For Hardware 224 use. Words 0 through 7 of the Text Area are Reserved For Software 226 use. The Access Control Word (ACW) Count field 228, in Word 8 of the Text Area, is the highest count of valid ACWs for this Queue Bank. Word 9 of the Text Area is Reserved For Hardware 230. ACWs are the Communications Program's description of a message segment. There is space for multiple ACWs within the Text Area of a Queue Bank. Each ACW corresponds to a message segment in the Queue Bank. These ACWs are represented on FIG. 12 as ACW 0 232 through ACW N-1 234. The remainder of the words in the Text Area, up to and including an Upper Limit, are available to hold the message segments. FIG. 13C is a diagram of the format of an ACW. Word 0 of each ACW holds a Byte Length field 238. The Byte Length is the number of bytes in the message segment. For the Build IMP instruction, an Addressing Exception error message is generated if the Byte Length is not a multiple of four. For the NET$IN Exec service, an error status is generated if the Byte Length is not a multiple of four. The Byte Offset field 240 is stored in Word 1 of the ACW. This field is the byte offset of the message segment. The Byte Offset is relative to the first byte of the Queue Bank Text Area. For both Exec service-based systems and instruction-based systems,, an Addressing Exception error message is generated if the Byte Offset is not a multiple of four.

Figure 14A:
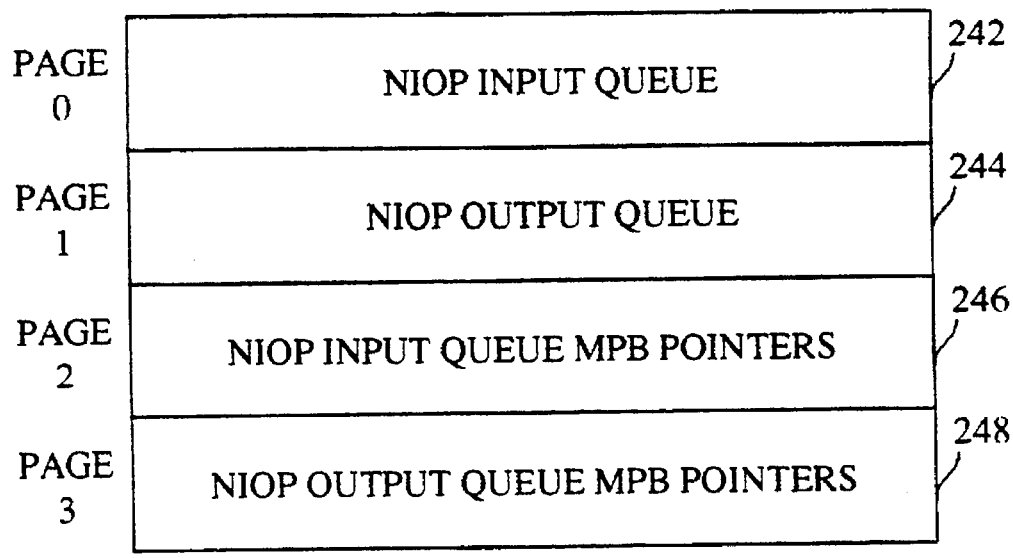
FIG. 14A is a diagram of the format of the Network I/O Processing Queue Bank.
Figure 14B:
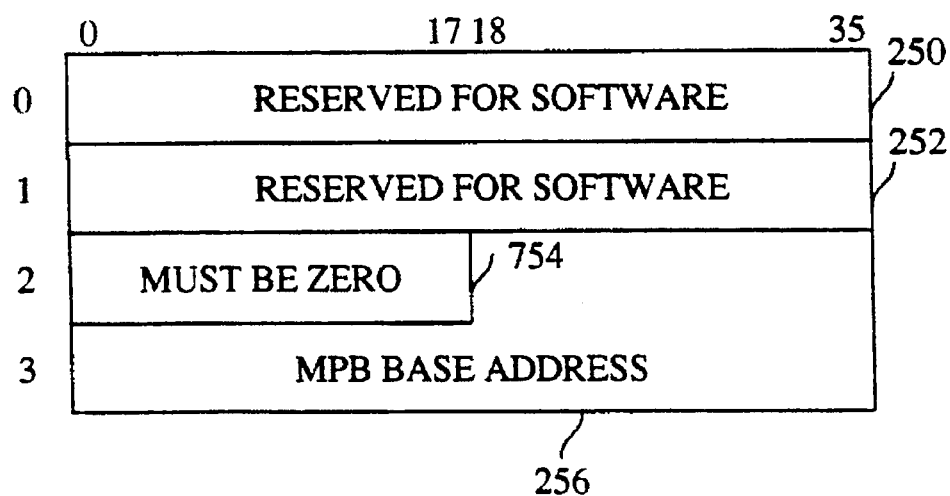
FIG. 14B is a diagram of the format of the NIOP Input Queue/NIOP Output Queue Message Program Buffer Pointer.

C. The NIOP Queue Bank (NIOPQB) The Network I/O Processor (NIOP) Queue Bank (NIOPQB) contains the NIOP Queues and pointers to Message Program Buffers (MPBs) (which hold IMPs/OMPs and various control information). There is a fixed relationship between NIOP Input Queue/NIOP Output Queue entries and MPBs. The NIOPQB and associated MPBs are established during the execution of the INIT$NETWORK Exec service. The Communications Program is allowed read access to the NIOPQB (to allow the Communications Program to read the completion status written in the NIOP Input Queue/NIOP Output Queue), but is denied write access to the NIOPQB (to prevent the Communications Program from compromising system integrity). The NIOPQB and all structures pointed to by NIOPQB fields must remain fixed in real address space while visible to the NIOP. FIG. 14A is a diagram of the format of the NIOP Queue Bank. There are four pages of memory in the NIOPQB. The NIOP Input Queue, NIOP Output Queue, and associated MPB pointers are sized to fit into one memory page (which, in the preferred embodiment, is 4096 words). The NIOP Input Queue 242 is stored in Page 0 and the NIOP Output Queue 244 is stored in Page 1. The NIOP Input Queue MPB Pointers 246 are stored in Page 2 and the NIOP Output Queue MPB Pointers 248 are stored in Page 3. FIG. 14B is a diagram of the format of the NIOP Input Queue/NIOP Output Queue Message Program Buffer Pointer. The NIOP Input Queue/NIOP Output Queue MPB Pointers are used to access the MPB associated with the corresponding NIOP Input Queue/NIOP Output Queue entry. Bits 0–35 of Word 0 250 and Word 1 252 are Reserved For Software use. Bits 0–17 of Word 2 254 Must Be Zero. Bits 18–35 of Word 2 and Bits 0–35 of Word 3 hold the MPB Base Address 256. The MPB Pointers are initialized by Exec software and are not modified by the NIOP Support Instructions.

D. Message Program Buffers (MPBs)

Figure 15:
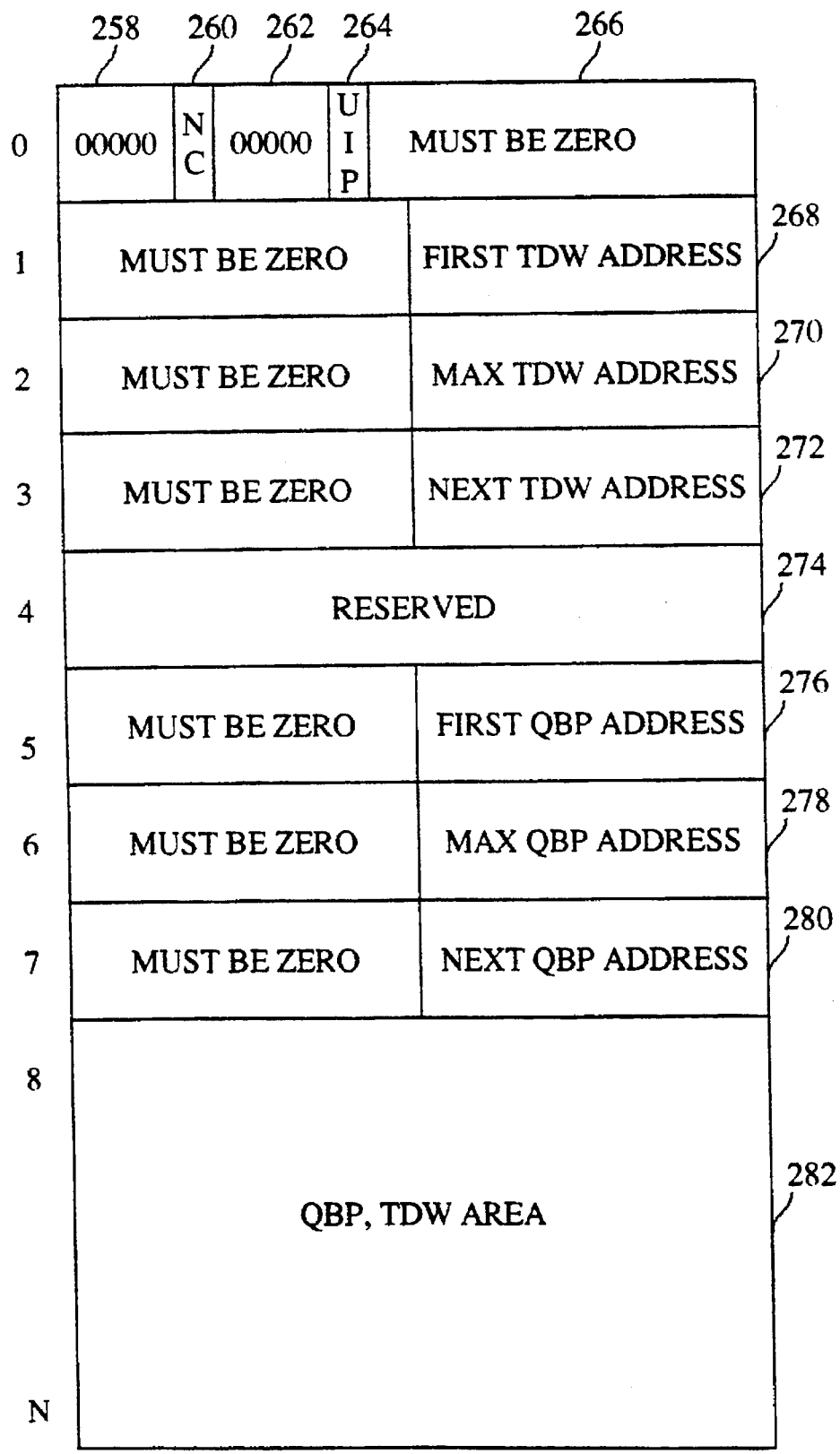
FIG. 15 is a diagram of the format of a Message Program Buffer.

Message Program Buffers hold IMP/OMP Transfer Descriptor Words (TDWs), pointers to Queue Banks within the IMP/OMPs, and control information. FIG. 15 is a diagram of the format of a Message Program Buffer. Bits 0–4 of Word 0 Must Be Zero 258. The NIOP Controlled (NC) field 260 is stored in Bit 5 of Word 0. The purpose of the NC field is to coordinate usage of the NIOP Input Queue/NIOP Output Queue entries between multiple host software threads. When NC is set, the IMP/OMP has been enqueued to the NIOP Input Queue/NIOP Output Queue and not yet released by a Release Input Message Program (RIMP) or a Release Output Message Program (ROMP) instruction, or by operation of a NET$IN or NET$OUT service. Bits 6–10 of Word 0 Must be Zero 262. The Update In Progress (UIP) flag 264 is stored in Bit 11. The UIP flag is used to prevent simultaneous update of the entry by two processes. When the UIP is set, the MPB is currently being updated. The UIP is checked by NIOP Support Instructions and the NET$IN and NET$OUT services prior to any MPB modification. If the UIP is found set, an error is generated. This error indicates that a hardware fault occurred on another processor during the execution of an NIOP Support Instruction or that two processes attempted to modify the same MPB concurrently. Bits 12–35 of Word 0 also Must Be Zero 266.

The First, Next, and Max TDW Addresses are used to coordinate the writing of IMP/OMP TDWs in the MPB. The First TDW Address field 268, in Bits 18–35 of Word 1, hold the address (relative to the MPB) of the first IMP/OMP TDW location. This address is initialized by Exec software and not modified by the NIOP Support Instructions or the NIOP Exec Services. The Max TDW Address field 270, in Bits 18–35 of Word 2, hold the address (relative to the MPB) of the last IMP/OMP TDW location. This address is initialized by Exec software and not modified by the NIOP Support Instructions or the NIOP Exec Services. The Next TDW Address field 272, in Bits 18–35 of Word 3, hold the address (relative to the MPB) of the IMP/OMP TDW location where the Build IMP/OMP instructions will write the next TDW. This address is incremented to point to the next, unused TDW location after the Build IMP/OMP instruction mites all TDWs for a Queue Bank. This address is reset to equal the First TDW Address by the Release IMP/OMP instructions. The Next TDW Address is incremented by two words as TDWs are added. Word 4 is Reserved 274. The First, Next, and Max Queue Bank Pointers are used to coordinate the writing of Queue Bank Pointers in the MPB. The First Queue Bank Pointer (QBP) Address field 276, in Bits 18–35 of Word 5, holds the address (relative to the MPB) of the first QBP location. QBP fields have the same format as the MPB Pointer shown in FIG. 14B, except Bits 18–35 of Word 2 and Bits 0–35 of Word 3 hold a Queue Bank Base Address instead of a MPB Base Address. The Queue Bank Base Address is the absolute address of the first Control Area word of the Queue Banks in the IMP/OMP. The First QBP Address is initialized by Exec software and not modified by the NIOP Support Instructions. The Max QBP Address field 278, in Bits 18–35 of Word 6, holds the address (relative to the MPB) of the last IMP/OMP QBP location. This address is initialized by Exec software and not modified by the NIOP Support Instructions. The Next QBP Address field 280, in Bits 18–35 of Word 7, holds the address (relative to the MPB) of the QBP location where the Build IMP/OMP instructions will write the next QBP. This address is incremented by four as Build IMP/OMP instructions add QBPs to the MPB and is reset to equal the First QBP Address by the Release IMP/OMP instructions. The storage area in Words 8 through N 282 holds the TDWs and QBPs. The ability to dynamically allocate space to QBPs and MPBs accommodates varying numbers of Queue Banks and TDWs per IMP/OMP. Bits 0–17 of Word 1, 2, 3, 5, 6, and 7 Must Be Zero.

E. The UPI Control Table

Figure 16:
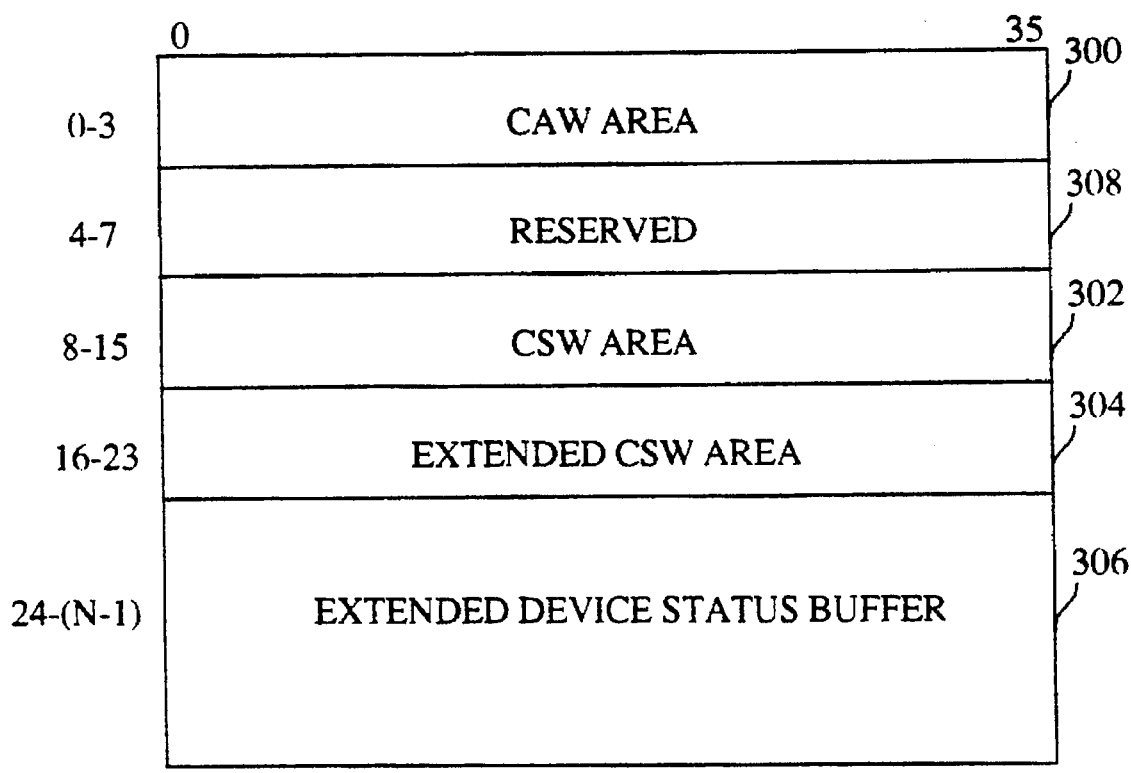
FIG. 16 is a diagram of the format of the Universal Processor Interface Control Table.

The Universal Processor Interface (UPI) Control Table (UPICT) is used for communication between Instruction Processor (IP) software and the Network I/O Processor (NIOP). The UPICT accommodates the dual network and channel functionality. An NIOP has a single UPICT, even if it is being used in a dual mode of operation. FIG. 16 is a diagram of the format of the Universal Processor Interface Control Table. The Channel Address Word (CAW) Area 300, in Bits 0–35 of Words 0–3, is used by IP-based software to send Channel Address Words (CAWs) to the NIOP. The Channel Status Word (CSW) Area 302, in Bits 0–35 of Words 8–15, the Extended CSW Area 304, in Bits 0–35 of Words 16–23, and the Extended Device Status Buffer 306, in Bits 0–35 of Words 24 through the end of the UPICT, are used by the NIOP to report status to IP-based software. Bits 0–35 of Words 4–7 are Reserved 308. Fields in the CAWs and CSWs indicate the channel or Network Interface associated with the CAW/CSW.

1. Channel Address Word Area

Figure 17:
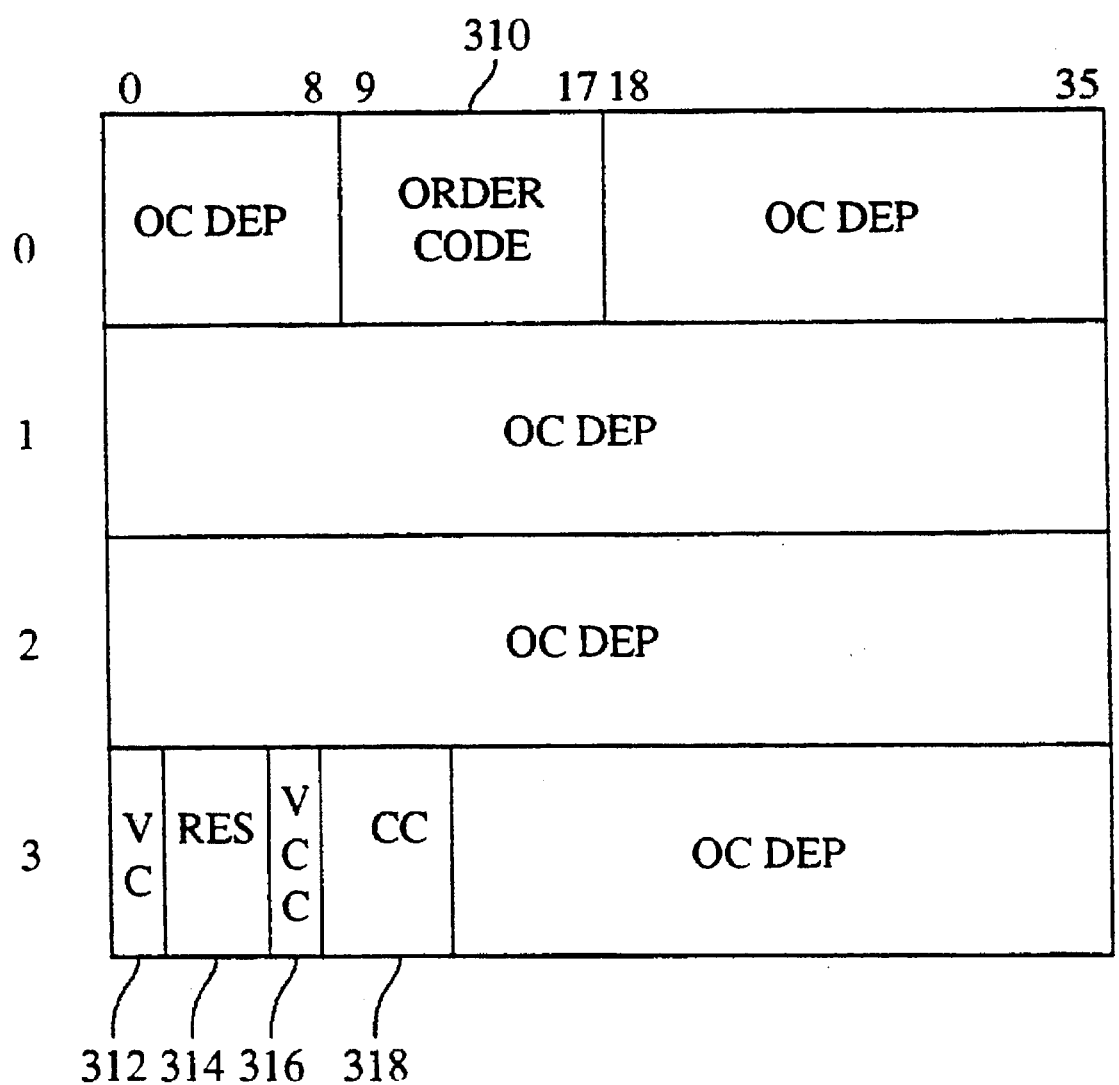
FIG. 17 is a diagram of the general format of the Channel Address Word Area.

FIG. 17 is a diagram of the general format of the Channel Address Word Area. The CAW Area is a four-word structure used to pass an Order Code (OC) to the NIOP. The Order Code represents a request by the IP-based software for the NIOP to perform an I/O-related action. The contents of the CAW Area are dependent on the specific Order Code to be sent. The Order Code 310 is stored in Bits 9–17 of Word 0 of the CAW Area. The Valid CAW (VC) bit 312, stored in Bit 0 of Word 3, is used to indicate that the CAW is ready to be processed by the NIOP. Bits 1–4 of Word 3 are reserved (RES) 314. The Valid Condition Code (VCC) bit 316, stored in Bit 5 of Word 3, is used to indicate that the NIOP has returned a Condition Code in response to the CAW. The Condition Code (CC) field 318, stored in Bits 6–11 of Word 3, is written by the Network I/O Microcode as a response to the CAW. Condition Codes vary according to the specific Order Codes being used. Generally, the Condition Code indicates that the Order Code was successfully executed or that an error or hardware fault has occurred. All other fields in the CAW are Order Code Dependent (OC DEP), meaning that they are used for different purposes depending on which Order Code has been specified.

2. Channel Status Words

Figure 18:
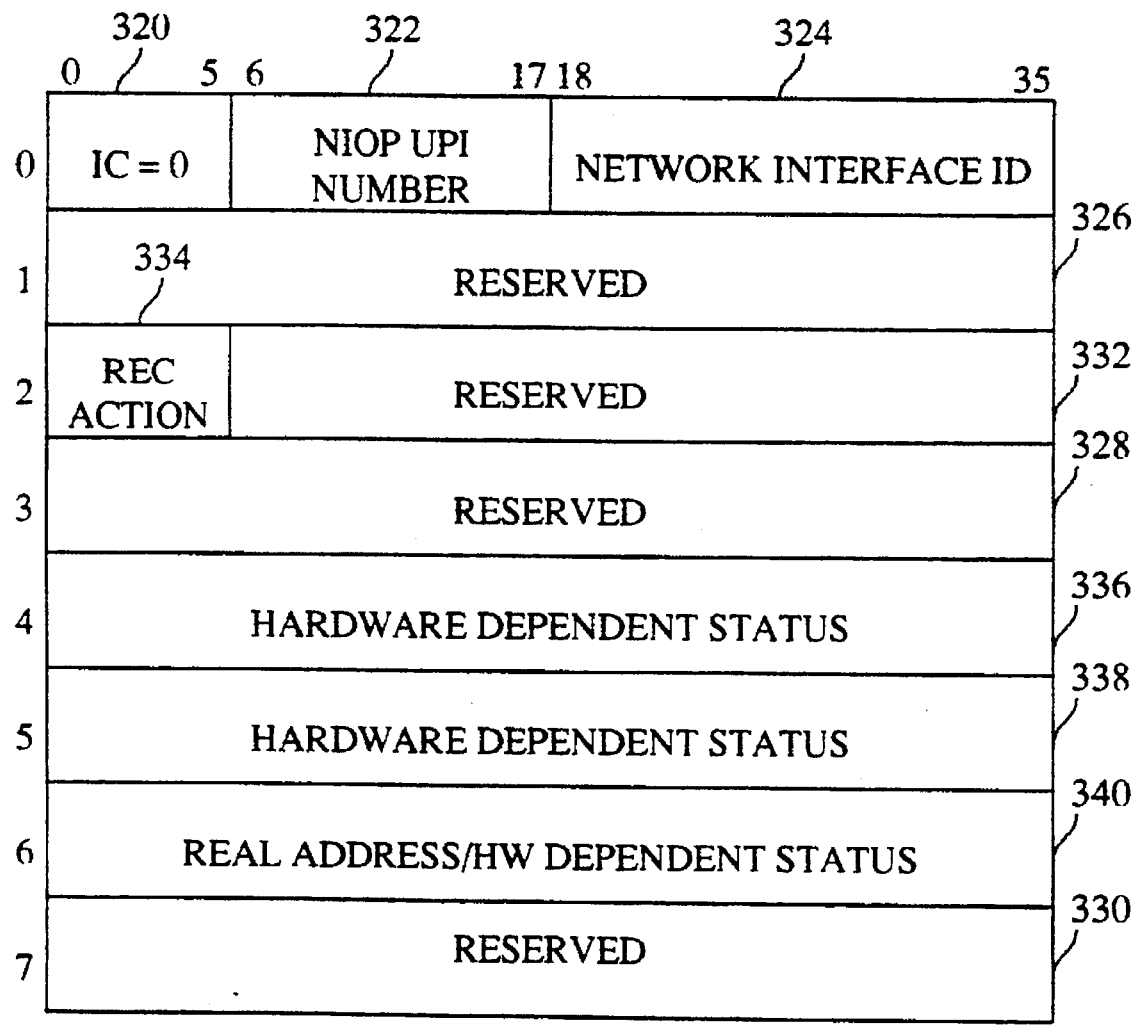
FIG. 18 is a diagram of the format of the Channel Program Channel Status Word.

There are two main Channel Status Words (CSWs) passed from the NIOP to the NIOP Exec Services to report errors and other conditions to the operating system. FIG. 18 is a diagram of the format of the Channel Program Channel Status Word. The Channel Program Channel Status Word (CPCSW) is used to report status for NIOP transfers. The Interrupt Code (IC) 320, in Bits 0–5 of Word 0, indicates that this CSW is a CPCSW when IC is zero. The NIOP UPI Number 322, in Bits 6–17 of Word 0, contains the UPI Number of the NIOP. The Network Interface Identifier (ID) 324, in Bits 18–35 of Word 0, identifies the Network Interface associated with the transfer for which status is being reported. The Network Interface Identifier format allows for multiple Network Interfaces to be supported on a single physical I/O channel. The Network Interface Identifier contains six bits used as a channel number identifier and four bits used as an interface number identifier. The final eight bits of the Network Interface Identifier must be zero. Bits 0–35 of Word 1 326, Word 3 328, and Word 7 330, and Bits 6–35 of Word 2 332 are Reserved. The Recovery Action (REC ACTION) field 334 indicates the result of a Network Interface transfer. Bits 0–35 of Word 4 336 and Word 5 338 contain a Hardware Dependent Status. When the Recovery Action field is non-zero, this field specifies the cause of the non-zero Recovery Action. Bits 0–35 of Word 6 hold a Real Address/Hardware (HW) Dependent Status 340. When the Recovery Action indicates storage access-related errors, this field contains the real address being referenced by the NIOP when the error was detected. Otherwise, this field contains further status to specify the cause of the non-zero Recovery Action.

Figure 19:
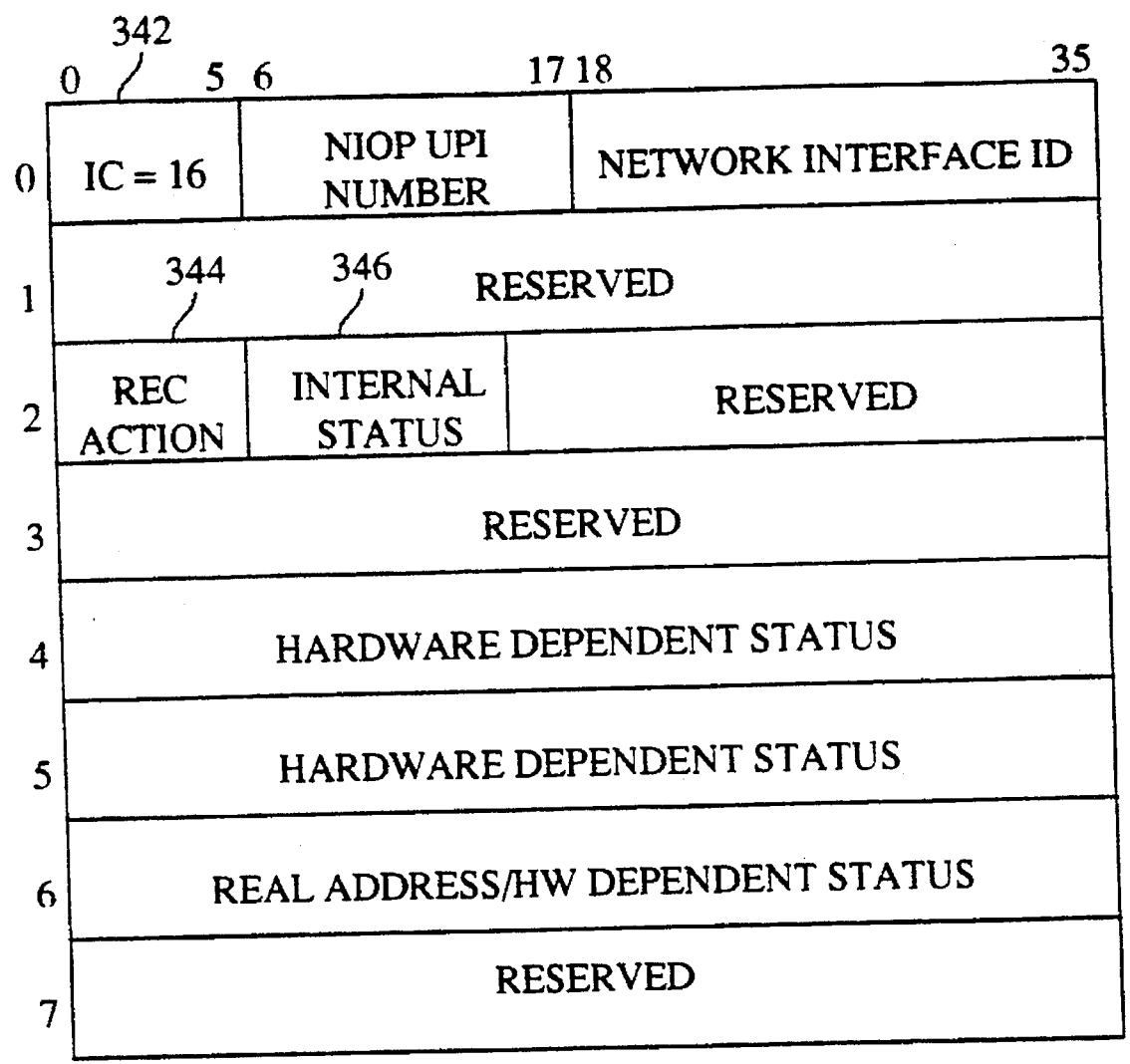
FIG. 19 is a diagram of the format of the NIOP Queue Channel Status Word.

FIG. 19 is a diagram of the format of the NIOP Queue Channel Status Word. The NIOP Queue Channel Status Word (NQCSW) is used to report the NIOP queue conditions. These conditions include finding the Interrupt Flag set following the transfer of an input message and detecting a fault while accessing an NIOP queue. If an error is detected on an NIOP Queue access, an NQCSW is written to the UPI Control Table and the Network Interface is disabled. For the NQCSW, the Interrupt Code (IC) 342 is set to sixteen decimal. When the Recovery Action (REC ACTION) field 344 is non-zero, a fault occurred on a queue reference. The Internal Status field 346 indicates the cause of the CSW. The Internal Status field has the following sub-fields. Bits 6–11 and Bits 13–14 must be zero. Bit 12 of the Internal Status is the Interrupt bit. If the Interrupt Flag has been set in the Interrupt Control Word, then an NQCSW is generated to return the status to the IP-based software. The Interrupt Control Word is used by the NIOP to determine if IP-based software requires a positive indication that the completion status has been stored to the NIOP Input Queue. The NIOP is passed the real address of the Interrupt Control Word for a Network Interface via the Enable/Disable Network Interface Order Code. The Interrupt Control Word must have zeroes in Bits 0–34 and the Interrupt Flag in Bit 35. If the Interrupt Flag is set when an input transfer is completed, then an NQCSW is presented in the UPICT (in addition to presenting completion status in the NIOP Input Queue). Otherwise, only the NIOP Input Queue completion status is presented.

3. The Enable/Disable Network Interface Order Code

Figure 20:
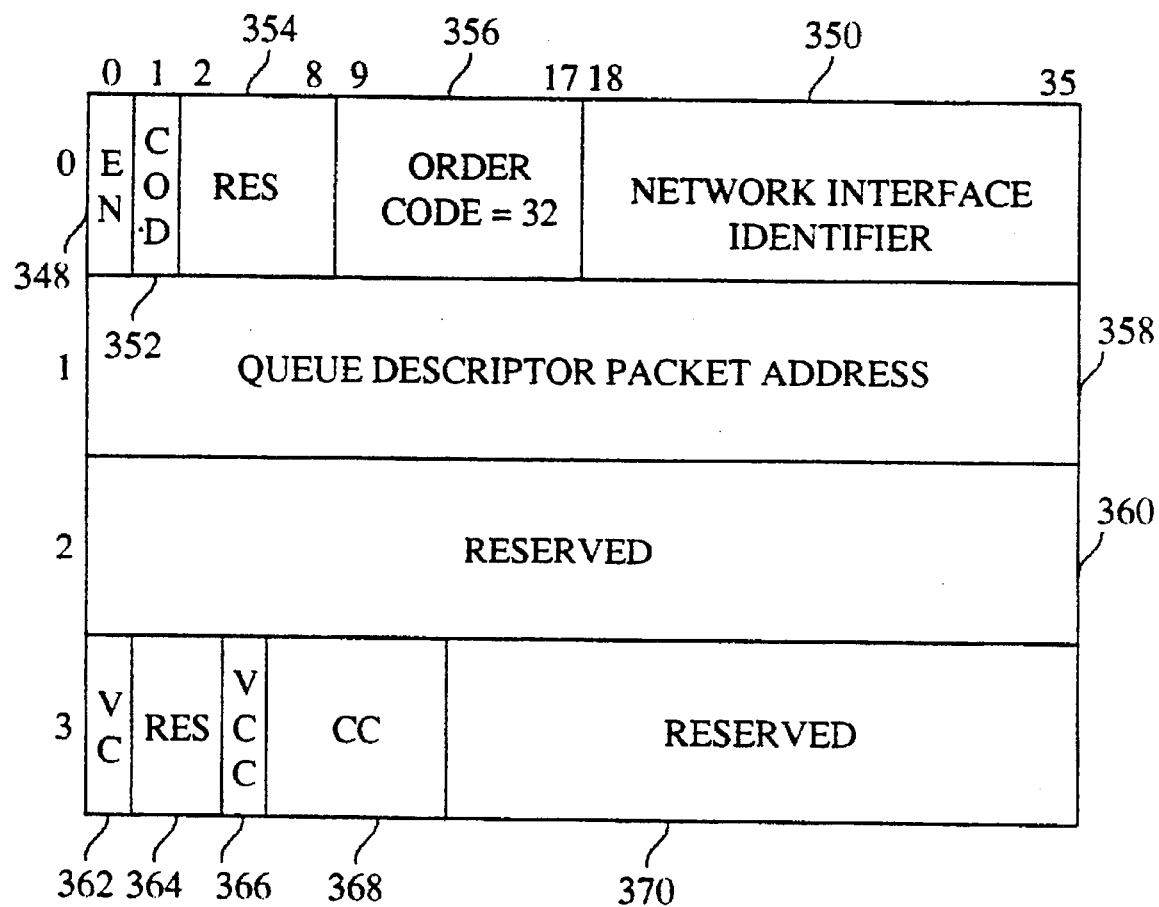
FIG. 20 is a diagram of the format of the Enable/Disable Network Interface Channel Address Word.

The Enable/Disable Network Interface (EDNI) is an Order Code used to direct the NIOP to enable or disable a Network Interface. This Order Code is inserted into the Channel Address Word Area within the UPI Control Table. FIG. 20 is a diagram of the format of the Enable/Disable Network Interface Channel Address Word. The Enable Network Interface (EN) flag 348, in Bit 0 of Word 0, indicates whether the Network Interface should be enabled or disabled. If EN is equal to one, the Network Interface specified by the Network Interface Identifier 350 is enabled. If EN is equal to zero, the Network Interface specified by the Network Interface Identifier is disabled. The Network Interface Identifier 350 is stored in Bits 18–35 of Word 0. The Clear On Disable (COD) flag 352, in Bit 1 of Word 0, is used to indicate a request for clearing the Network Interface under certain conditions. If EN 348 is zero and COD 352 is zero, the Network Interface is disabled, but not cleared. If EN is zero and COD is one, the Network Interface is disabled and cleared. If EN is one, then the COD 352 flag is ignored. Bits 2–8 of Word 0 are Reserved (RES) 354. The Order Code field 356, in Bits 9–17 of Word 0, specifies the action to be performed by the NIOP. The Order Code is 32 (decimal) for an EDNI.

The Queue Descriptor Packet Address 358, in Bits 0–35 of Word 1 of this CAW, contains the starting real address of the Queue Descriptor Packet if EN 348 is one (i.e., it indicates enabling the Network Interface is to be performed). If EN is zero, this field is ignored. Bits 0–35 of Word 2 are Reserved 360. The Valid CAW (VC) flag 362, in Bit 0 of Word 3, is used to indicate that the CAW is ready to be processed by the NIOP. Bits 1–4 of Word 3 are Reserved (RES) 364. The Valid Condition Code (VCC) field 366, in Bit 5 of Word 3, is used to indicate that the NIOP has returned a Condition Code in response to the CAW. The Condition Code (CC) 368, stored in Bits 6–11 of Word 3, is ignored by the NIOP when the NIOP receives a CAW, but it is written by the NIOP as a response to a CAW. Valid Condition Codes include indications of successful execution of the request, occurrence of an NIOP-internal hardware fault, detection of a fault while attempting to read the CAW, the addressed Network Interface was unavailable, insufficient internal NIOP resources exist to support the Network Interface, and the NIOP disabled the NIOP Input Queue and NIOP Output Queue, but a Network Interface error was detected.

Figure 21:
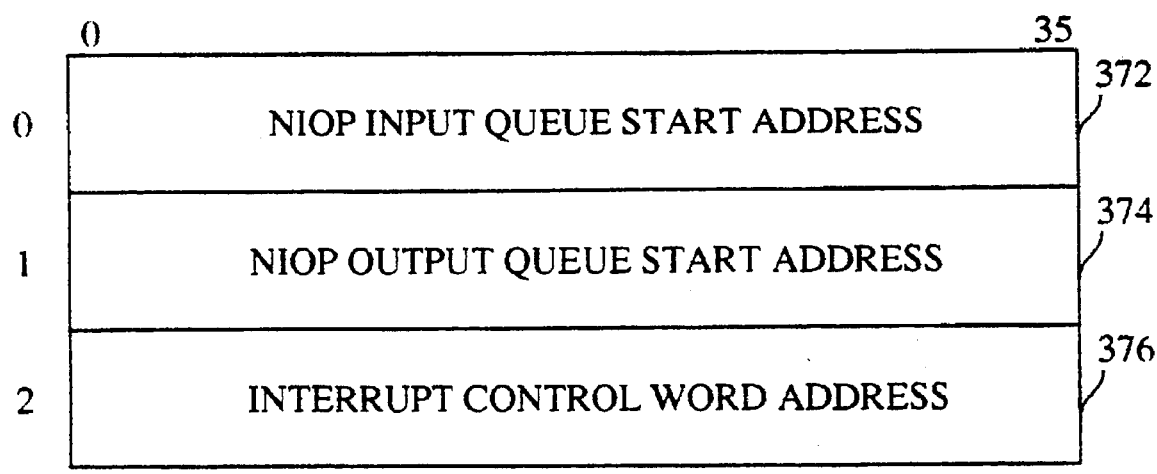
FIG. 21 is a diagram of the format of a Queue Descriptor Packet.

Referring back to FIG. 20, when the EN field 348 is one, the Network Interface is enabled and polling of the NIOP Input Queue (NIOP Input Queue) 58 and NIOP Output Queue (NIOP Output Queue) 60 by the Network I/O Microcode 40 begins.. Following the enabling of the Network Interface, the Communications Program is typically required to send initialization messages to the Network Interface. These initialization messages are specific to the type of Network Interface. The Queue Descriptor Packet referenced by the Queue Descriptor Packet Address 358 contains queue initialization information. FIG. 21 is a diagram of the format of a Queue Descriptor Packet. The NIOP Input Queue Start Address 372 and the NIOP Output Queue Start Address 374 are the real addresses of the first NIOP Input Queue and NIOP Output Queue entry, respectively, to be processed. The Interrupt Control Word Address 376 is the real address of the Interrupt Control Word. The NIOP uses the Queue Descriptor Packet to set up the NIOP Input Queue and the NIOP Output Queue during Network Interface enabling operations.

When the EN field 348 is zero and the COD field 352 is zero, the Network Interface is disabled, but not cleared. All NIOP Input Queue, NIOP Output Queue, IMP, and OMP addresses are discarded. All active transfers of data are terminated and their status is discarded. The Network Interface state sufficient to allow a microstore dump is retained, and all network traffic is disabled. When the NIOP has initiated a status presentation for a Network Interface and the EDNI effort disables that Network Interface, the NIOP completes the status presentation.

When the EN field 348 is zero and the COD field 352 is one, the Network Interface is disabled and cleared. Processing is as for when COD is zero as stated above, except that the Network Interface state is cleared.

III. Network I/O Processing Algorithms

A. Input Processing

Figure 22:
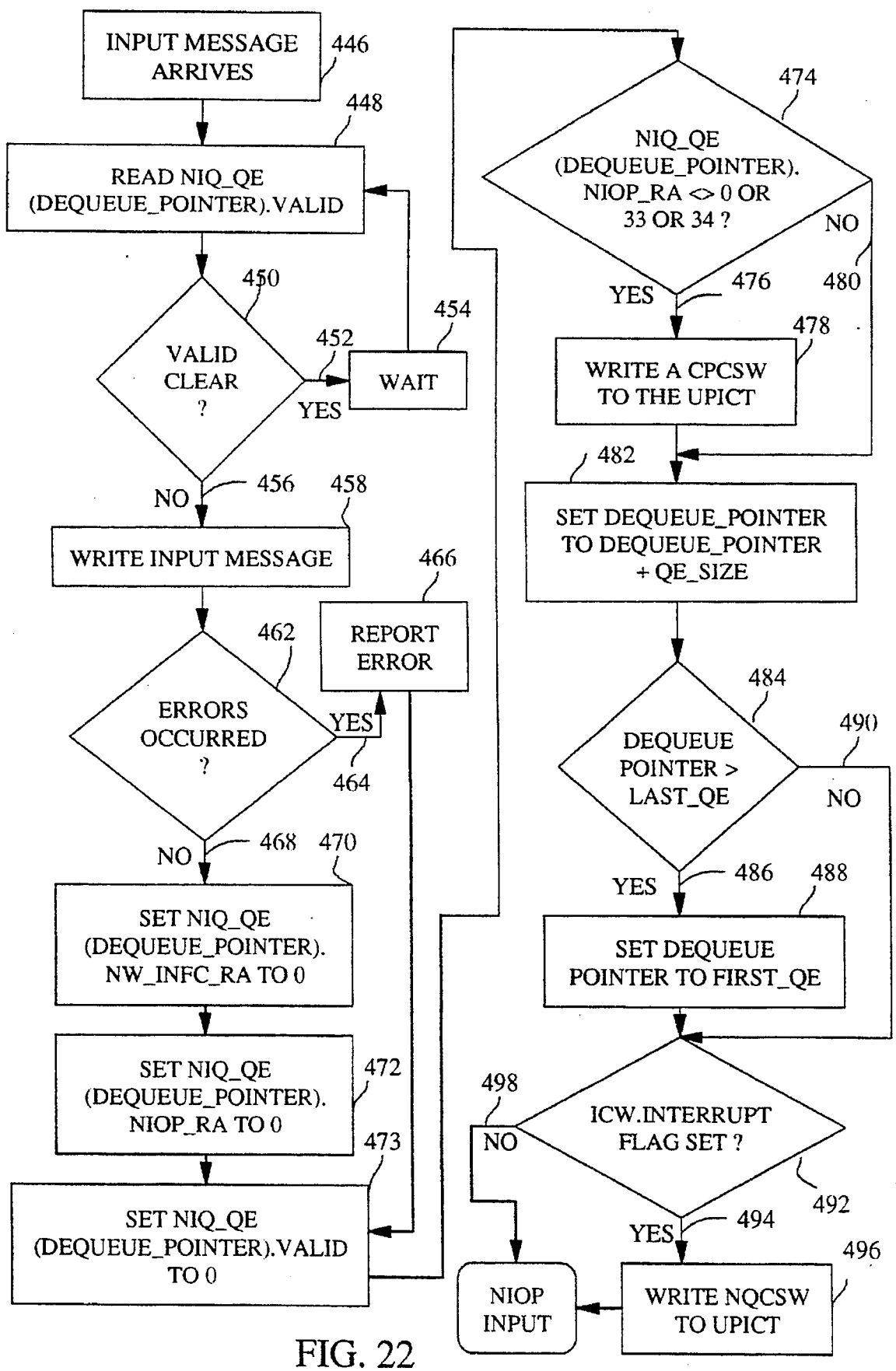
FIG. 22 is a flow chart of the steps performed by the Network I/O Microcode to transfer input messages from the Network Interface to memory.

FIG. 22 is a flow chart of the steps performed by the Network I/O Microcode 40 to transfer input messages from the Network Interface to memory. These steps are performed after the Network Interface has been enabled by the Enable/Disable Network Interface Order Code. The Dequeue Pointer is a conceptual internal register set to point to the first queue entry to be processed as part of the EDNI Order Code. In the preferred embodiment, the size of an NIOP queue entry is four words, the address of the first queue entry (relative to the start of the NIOP Input Queue) is zero, and the address of the last queue entry (relative to the start of the NIOP Input Queue) is 4092. Once an input message arrives from the Network, the NIOP reads the Valid bit of the NIOP Input Queue entry (QE) referenced by the Dequeue Pointer (Step 448). If the Valid bit is clear (Test Step 450), then the Yes path 452 is taken to Step 454, where the NIOP waits a predetermined amount of time. The NIOP then checks the Valid bit again at Step 448. If the Valid bit is not clear, then No path 456 is taken to Step 458. When input data is available from the Network Interface, the Network I/O Microcode writes the input message to the storage area described by the Input Message Program (IMP) for the current NIOP Input Queue entry. A control header embedded in the message indicates to the Communications Program whether the input message was received over the Network or is a control message generated by the Network Interface logic. If, at Test Step 462, errors occurred during the receipt of the input message, Yes path 464 is taken to Step 466, where the error is reported by writing recovery action (RA) error codes into the Network Interface Recovery Action (NW INFC RA) and NIOP Recovery Action (NIOP RA) fields of the NIOP Input Queue entry. If no errors were detected, then No path 468 is taken to Step 470. At this step, the NW INFC RA field of the NIOP Input Queue entry referenced by the Dequeue Pointer is set to zero. Next, at Step 472, the NIOP RA field of the same queue entry is set to zero. The valid bit of the NIOP Input Queue Entry is then cleared at Step 473. Processing continues with Test Step 474.

If the NIOP Recovery Action (RA) of the NIOP Input Queue entry is other than zero, 33, or 34 (codes which do not require Exec intervention in error recovery), then Yes path 476 is taken to Step 478. At this step, a Channel Program Channel Status Word (CPCSW) is written to the UPI Control Table to return the status of the input transfer to the Exec. Otherwise, the No path 480 is taken to Step 482. At Step 482, the size of a queue entry is added to the Dequeue Pointer to cause the Dequeue Pointer to point to the next entry in the NIOP Input Queue. If the Dequeue Pointer is now greater than the last queue entry ha the NIOP Input Queue (Test Step 484), then Yes path 486 is taken to Step 488, where the Dequeue Pointer is set back to the first entry in the NIOP Input Queue. Otherwise, the No path 490 is taken to Test Step 492. At this step, if the Interrupt Control Word (ICW) Interrupt Flag is set, then Yes path 494 is taken to Step 496. Here, an NIOP Queue CSW is written to the UPI Control Table (UPICT) to return the status of the transfer back to the IP-based software, and processing continues with the start of NIOP input processing. If the Interrupt Flag is not set, then No path 498 is taken back to the start of NIOP input processing.

B. Output Processing

Figure 23:
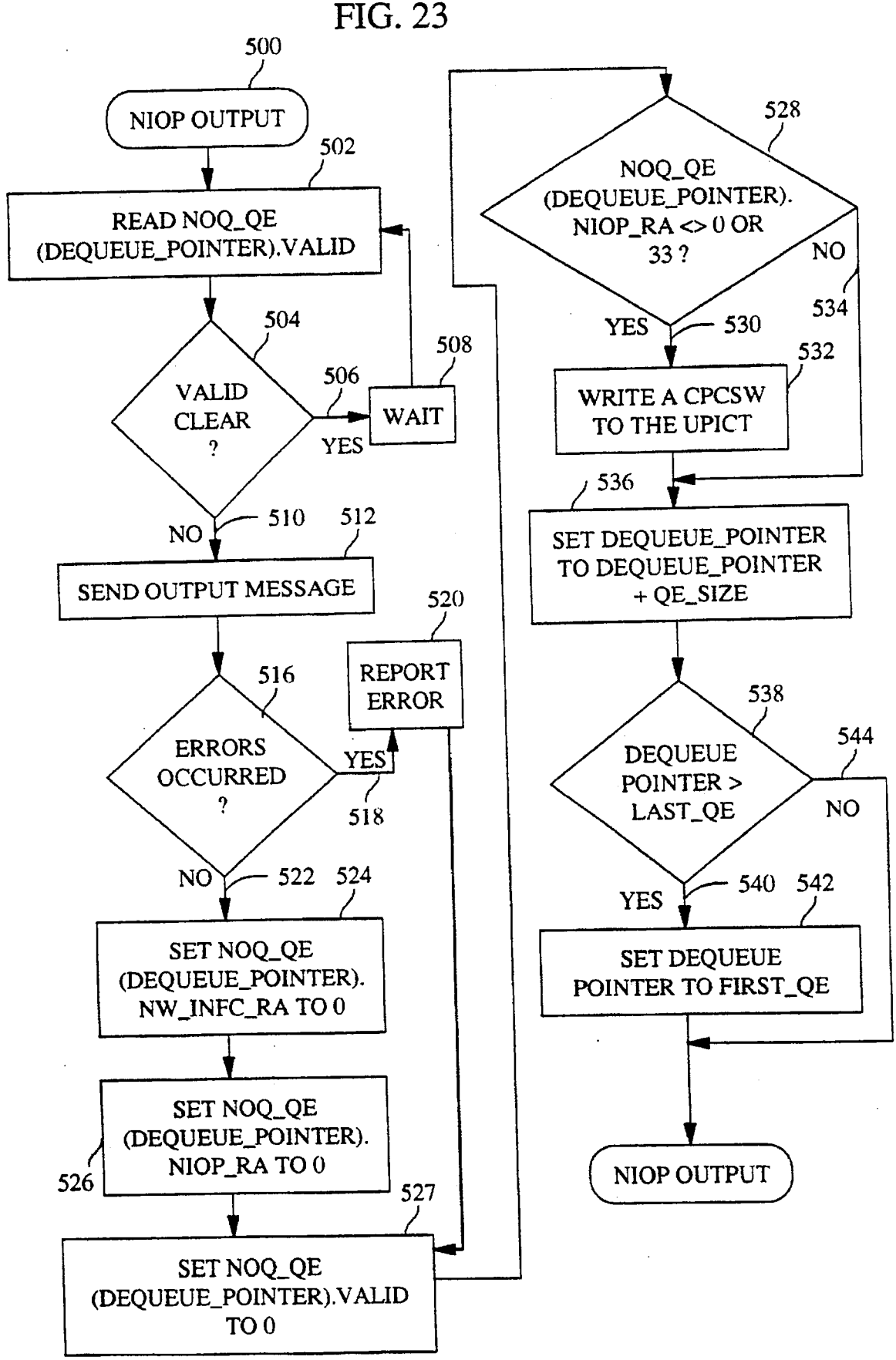
FIG. 23 is a flow chart of the steps performed by the Network I/O Microcode to transfer output messages from memory to the Network Interface.

FIG. 23 is a flow chart of the steps performed by the Network I/O Microcode to transfer output messages from memory to the Network Interface. These steps are performed after the Network Interface has been enabled by the Enable/Disable Network Interface Order Code. After commencing NIOP Output 500, the Network I/O Microcode reads the Valid bit of the NIOP Output Queue queue entry (QE) referenced by the Dequeue Pointer (Step 502). If the Valid bit is clear (Test Step 504), then the Yes path 506 is taken to Step 508, where the Network I/O Microcode waits a predetermined amount of time. The Valid bit is checked again at Step 502. If the Valid bit is not clear, then No path 510 is taken to Step 512. The output message is described by its Output Message Program (OMP). A control header embedded in the message indicates to the Network Interface whether the output message is to be sent over the Network or is a control message generated by the Communications Program. This step entails delivery of the output message to the Network Interface. Subsequently, the output message is transferred by the Network Interface over the Network. If, at Test Step 516, errors occurred during the sending of the output message, Yes path 518 is taken to Step 520, where the error is reported by writing recovery action (RA) error codes into the Network Interface Recovery Action (NW INFC RA) and NIOP Recovery Action (NIOP RA) fields of the NIOP Output Queue entry. If no errors were detected, then No path 522 is taken to Step 524. At this step, the NW INFC RA field of the NIOP Output Queue entry referenced by the Dequeue Pointer is set to zero. Next, at Step 526, the NIOP RA field of the same queue entry is set to zero. At Step 527, the Valid bit of the NIOP Output Queue entry referenced by the Dequeue Pointer is set to zero. Processing continues with Test Step 528.

If the NIOP Recovery Action (RA) of the NIOP Input Queue entry is other zero or 33 (codes which do not require Exec intervention in error recovery), then Yes path 530 is taken to Step 532. At this step, a Channel Program Channel Status Word (CPCSW) is written to the UPI Control Table to return the status of the output transfer to the Exec. Otherwise, the No path 534 is taken to Step 536. At Step 536, the size of a queue entry is added to the Dequeue Pointer to cause the Dequeue Pointer to point to the next entry in the NIOP Output Queue. If the Dequeue Pointer is now greater than the last queue entry in the NIOP Output Queue (Test Step 538), then Yes path 540 is taken to Step 542, where the Dequeue Pointer is set back to the first queue entry in the NIOP Output Queue. Otherwise, the No path 544 is taken. In either case, processing continues with the start of NIOP output.

IV. Common Exec Services

A. Overview

There are five Exec services supporting the Network I/O Architecture. Three of the services are used by both Exec Service-based systems and Instruction-based systems. These services are the INIT$NETWORK, RSET$NETWORK, and TERM$NETWORK services. The remaining two services, the NET$IN and NET$OUT services, are used by Exec-based systems only. The INIT$NETWORK service initializes a Network Interface. The NET$IN service allows a caller to access the NIOP Input Queue to obtain input from the Network. The NET$OUT service allows a caller to access the NIOP Output Queue to send output to the Network. The RSET$NETWORK service resets a Network Interface. The TERM$NETWORK service terminates a Network Interface.

A brief overview of the Exec services follows. More details are provided in the following sections. The Communications Program uses the INIT$NETWORK Exec service to enable a Network Interface and to get the data structures initialized that are used to interact with the Network Interface. The Exec returns a gate address to be used for input, and a second gate address to be used for output. The Exec also returns the addresses of the NIOP Queue Bank (NIOPQB) and NIOP Control Bank (NIOPCB).

When the Communications Program calls either the input gate (NET$IN) or the output gate (NET$OUT), the Exec converts the message descriptor into a message program (IMP or OMP) and places the message program into the queue entry (NIOP Input Queue or NIOP Output Queue) specified by the caller. When the Exec receives an NIOP Queue CSW from the Network I/O Microcode, and the NIOP Queue CSW is due to the Interrupt Flag found set upon completion of an input transfer, the Exec activates any Communication Processes waiting for input completion. The Communications Program is responsible for checking the NIOP Input Queue and the NIOP Output Queue for a completion status.

When errors occur relating to the Network Interface, the Exec disables the Network Interface. The Exec marks all entries in the queues that have not received status from the NIOP with an appropriate error value. The Exec activates any Communications Program process waiting for input completion. The Communications Program must call the RSET$NETWORK Exec service to enable the interface again.

The TERM$NETWORK Exec service call is used to terminate the use of an NIOP Network Interface and delete all of the control structures that were created to interface with the NIOP Network Interface. Because the TERM$NETWORK service deletes the NIOP structures returned on the INIT$NETWORK service call, the Communications Program may not use any of these structures after requesting a TERM$NETWORK.

B. INIT$NETWORK

Figure 24:
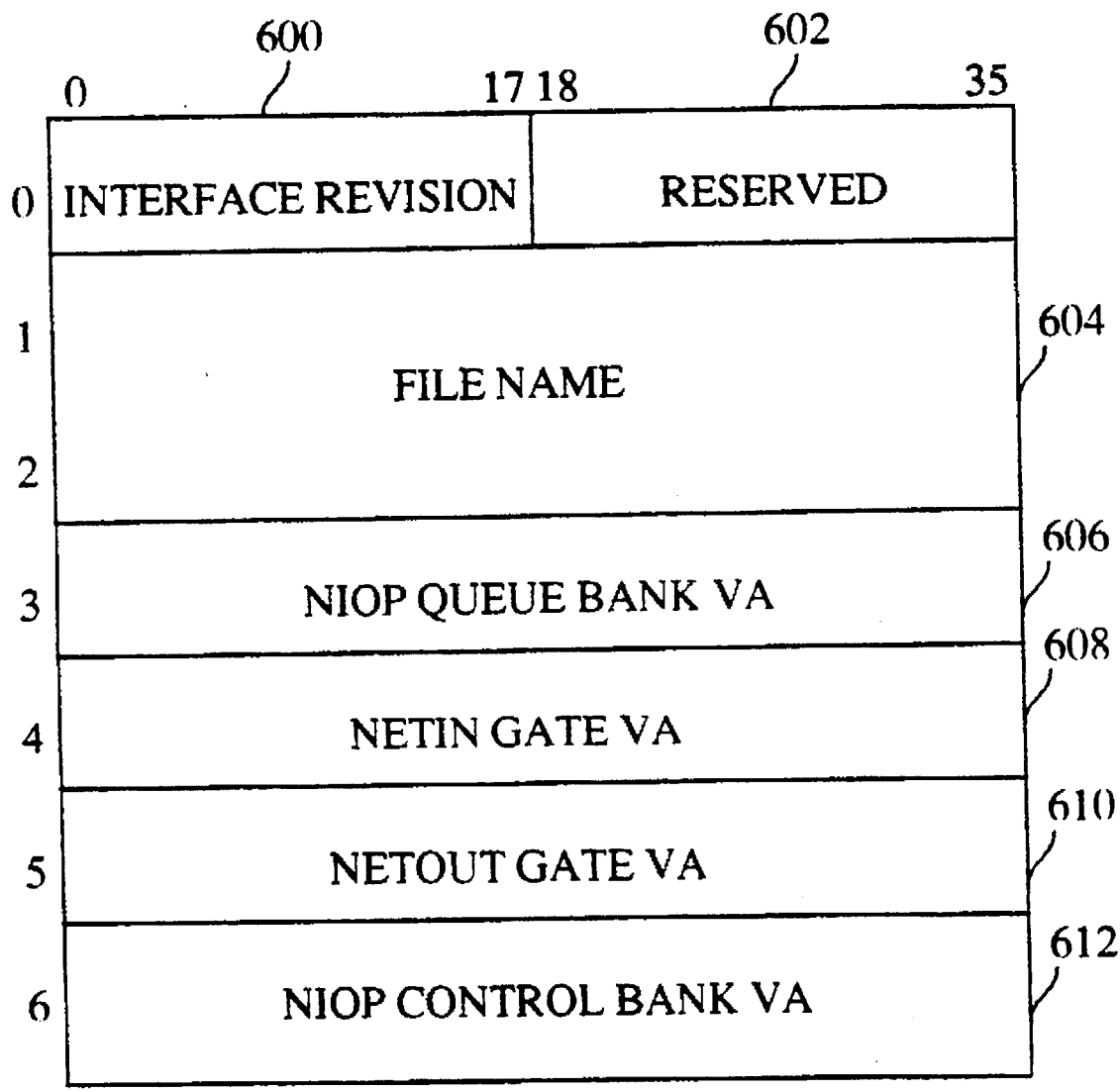
FIG. 24 is a diagram of the format of the INIT$NETWORK packet.

The INIT$NETWORK Exec service is used to enable a Network Interface and initialize the structures needed to use the Network Interface. Prior to calling INIT$NETWORK, the Communications Program must have exclusive assignment of the Network Interface. The INIT$NETWORK call has two input parameters, an INIT$NETWORK packet and the virtual address (VA) of the Queue Header (QH) to be used as an Input Wait Queue. The caller must have created the QH and have both enqueue and dequeue privileges. FIG. 24 is a diagram of the format of the INIT$NETWORK packet. The user of this packet is required to have read and write access to it. The Interface Revision field 600, in Bits 0–17 of Word 0, holds an identifier for the revision level of the interface. Bits 18–35 of Word 0 are Reserved 602. The File Name 604, in Words 1 and 2, is used to provide a system-wide unique identifier of the Network Interface. The File Name is input by the caller. The NIOP Queue Bank VA 606, in Word 3, is the virtual address of the NIOPQB (the data structure that holds the NIOP Input Queue, NIOP Output Queue, and MPB pointers). The caller has only read access to the bank. The NETIN Gate VA 608, in Word 4, is the virtual address of the gate called to enqueue an IMP to the NIOP Input Queue. This address is returned by the Exec. The NETOUT Gate VA 610, in Word 5, is the virtual address of the gate called to enqueue an OMP to the NIOP Output Queue. This address is also returned by the Exec. The NIOP Control Bank 612, in Word 6 of the packet, is the virtual address of the bank containing the Interrupt Control Word, and an area for exchanging parameter packets between the Communications Program and the Exec for the RSET$NETWORK and TERM$NETWORK services.

Figure 25:
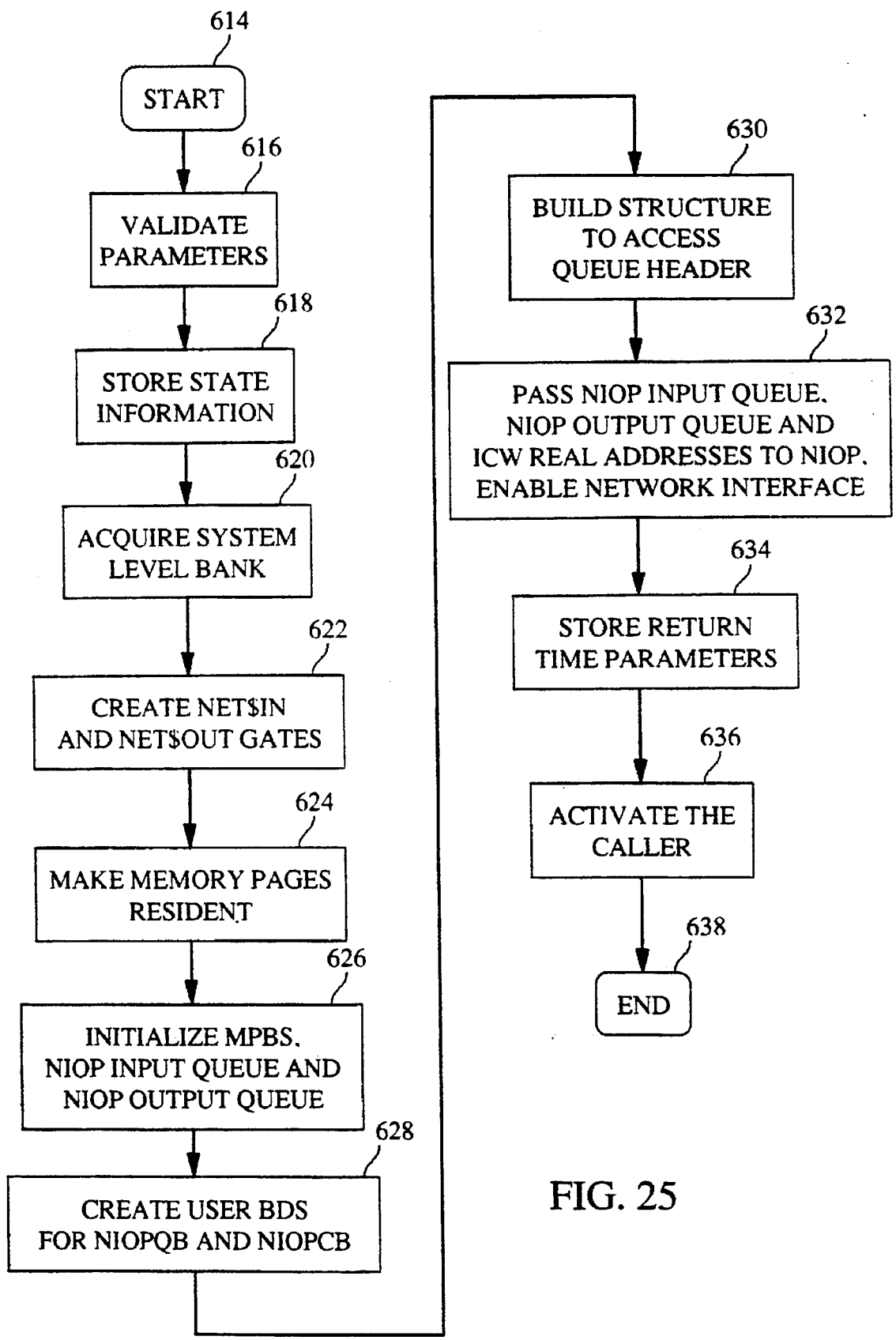
FIG. 25 is a flow chart illustrating the steps for initializing a Network Interface.

FIG. 25 is a flow chart illustrating the steps for initializing a Network Interface. After Start Step 614 for the INIT$NETWORK service, the Exec validates the input parameters contained in the INIT$NETWORK packet at Step 616. Next, at Step 618, while the file item is locked from other Exec processes, the Exec stores the current state information to allow synchronization of network termination. A system level bank is then acquired at Step 620 to hold the NIOPQB and the NIOPCB. The system level bank contains the Network Input Queue (NIOP Input Queue), the Network Output Queue (NIOP Output Queue), the Interrupt Control Word (ICW), and the Message Program Buffers (MPBs). The NET$IN and NET$OUT gates are created at Step 622, specifying the NIOPCB as the latent parameter for both NET$IN and NET$OUT. At Step 624, the memory pages which hold the NIOPQB, ICW, and the MPBs are made resident in memory and ineligible to be swapped out. At Step 626, the Exec initializes the MPBs and the NIOP Input Queue and NIOP Output Queue by allocating an MPB to each NIOP Input Queue and NIOP Output Queue entry. The Next TDW pointer of each NIOP Input Queue/NIOP Output Queue entry is initialized to the real address of the second TDW location of the associated MPB. The First, Next, and Last TDW, and QB Pointers of the MPBs are initialized per the desired allocation of TDW and QBP space.

Next, at Step 628, the Exec creates Bank Descriptors (BDs) at the caller's (user's) address tree level for the NIOP Control Bank (NIOPCB) and NIOP Queue Baak (NIOPQB). At Step 630, the Exec builds the structures needed to access the Queue Header where Communications Program processes wait for input completion. At Step 632, the NIOP Input Queue, NIOP Output Queue, mad Interrupt Control Word real addresses are passed to the NIOP, and the Network Interface is enabled by the Enable/Disable Network Interface (EDNI) Order Code. The return parameters are stored in the caller's packet at Step 634. Finally, the caller is activated at Step 636 and processing ends at End Step 638.

C. RSET$NETWORK

Figure 26:
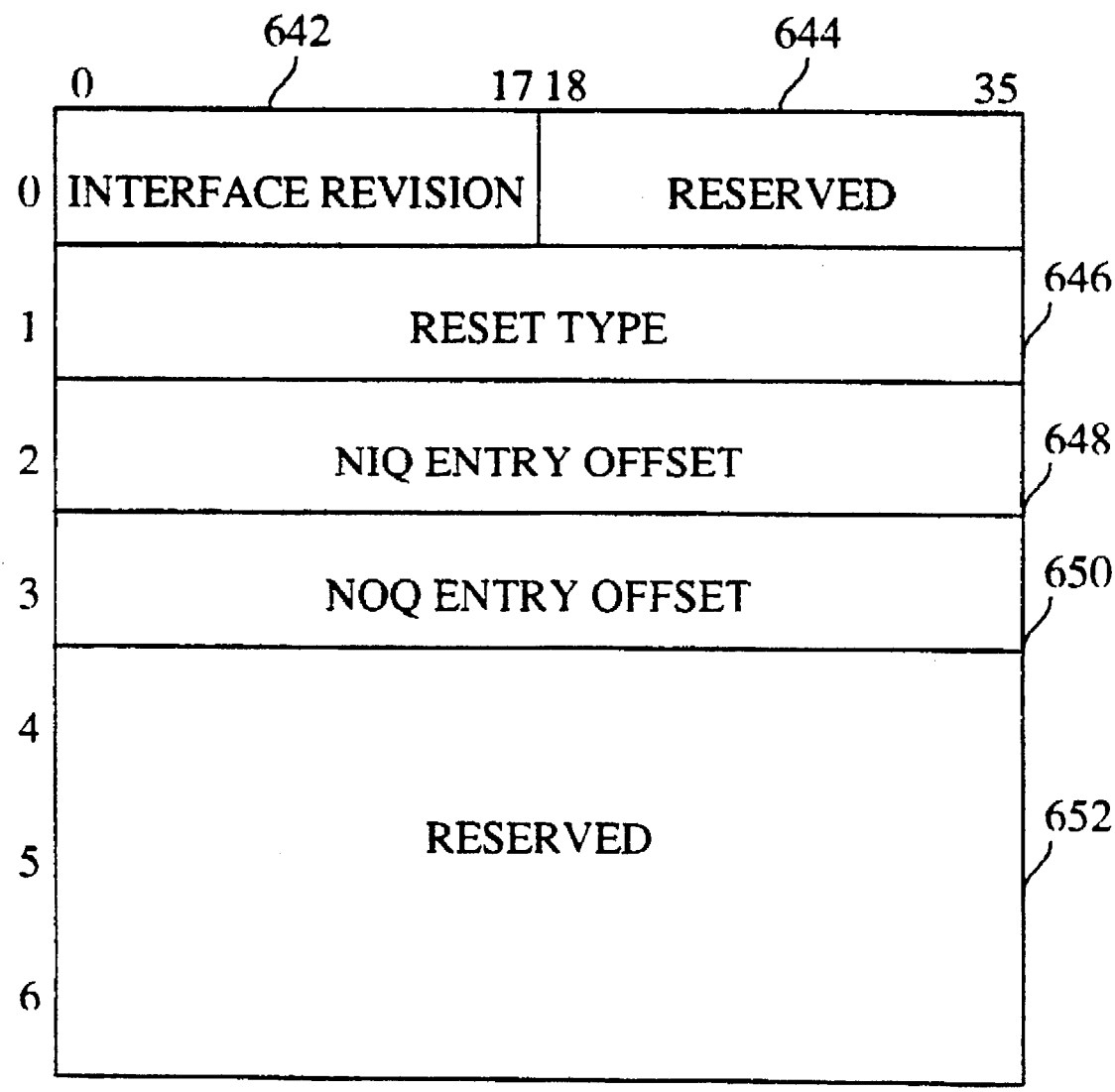
FIG. 26 is a diagram of the format of the RSET$NETWORK packet.

The RSET$NETWORK Exec service allows the caller to reset the NIOP Input Queue and NIOP Output Queue after the caller has received an indication that the queues have been disabled or the caller wants to reset the interface because of some other condition. There is one parameter for the RSET$NETWORK service call. FIG. 26 is a diagram of the format of the RSET$NETWORK packet. The Communications Program is required to have read mad write access to it. The Interface Revision field 642, in Bits 0–17 of Word 0, holds an identifier for the revision level of the interface. Bits 18–35 of Word 0 are Reserved 644. The Reset Type field 646, in Word 1, specifies the type of reset being requested. Possible types include: disable clearing to the initial state and then enable the interface; disable without clearing diagnostic dump information and then enable interface; and wait for NIOP hardware initialization and then enable the interface. The NIOP Input Queue Entry Offset 648, in Word 2, is the address (relative to the start of the NIOP Input Queue), from 0 to 4092, of the NIOP Input Queue entry that the NIOP is to poll when enabled. The NIOP Output Queue Entry Offset 650, in Word 3, is the address (relative to the start of the NIOP Output Queue) of the NIOP Output Queue entry the NIOP is to poll when enabled. The caller can specify any entry in the NIOP Input Queue and NIOP Output Queue as long as the caller processes all previously active entries before queuing any new entries. After disabling the Network Interface, the Exec stores the status and clears the valid bit in all NIOP Input Queue and NIOP Output Queue entries that the NIOP has not processed before the interface is enabled again. Bits 0–35 of Words 4 through 6 are Reserved 652.

Figure 27:
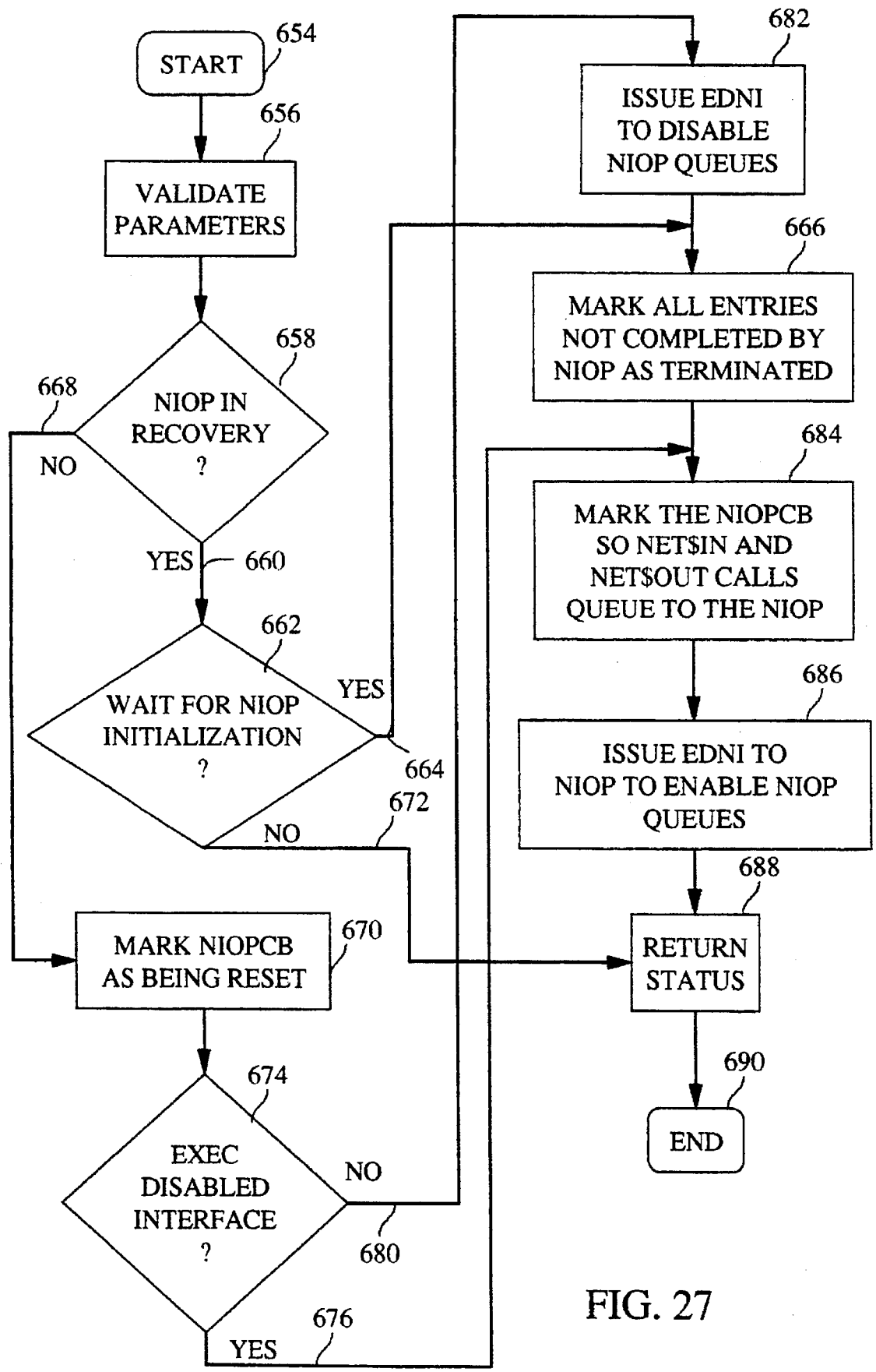
FIG. 27 is a flow chart illustrating the steps for resetting a Network Interface.

FIG. 27 is a flow chart illustrating the steps for resetting a Network Interface. After Start Step 654 for the RSET$NETWORK service, the Exec validates the input parameters contained in the RSET$NETWORK packet at Step 656. Next, at Step 658, if the NIOP is in a recovery state, then Yes path 660 is taken to Step 662. At this step, if a wait for NIOP initialization is indicated, then Yes path 664 is taken to Step 666. If a wait for NIOP initialization is not indicated (i.e., it may be downed), then No path 672 is taken to Step 688, where an error status is reported. If the NIOP is not in recovery at Step 658, then No path 668 is taken to Step 670. At this step, the Exec marks the NIOP Control Bank (NIOPCB) as being reset. Next, at Step 674, if the Exec disabled the interface, then Yes path 676 is taken to Step 678. If the Exec has not disabled the interface, then No path 680 is taken to Step 682. At Step 682, an Enable/Disable Network Interface (EDNI) order code is issued to disable the Network Interface, setting the EDNI Clear On Disable (COD) bit based on the caller's Reset Type parameter. At Step 666, all entries in the NIOP queues which were not completed by the NIOP hav ethe valid bit cleared and are marked as terminated by the RSET$NETWORK call and the Queue Banks' NIOP Use Counts for all unprocessed entries are decremented. Next, at Step 684, the NIOPCB is marked so that the NET$IN and NET$OUT calls will queue entries to the NIOP. An EDNI is then issued at Step 686 to enable the NIOP queues at the entries specified by the caller. Status is returned to the caller at 688 and RSET$NETWORK processing ends at End Step 690.

D. TERM$NETWORK

Figure 28:
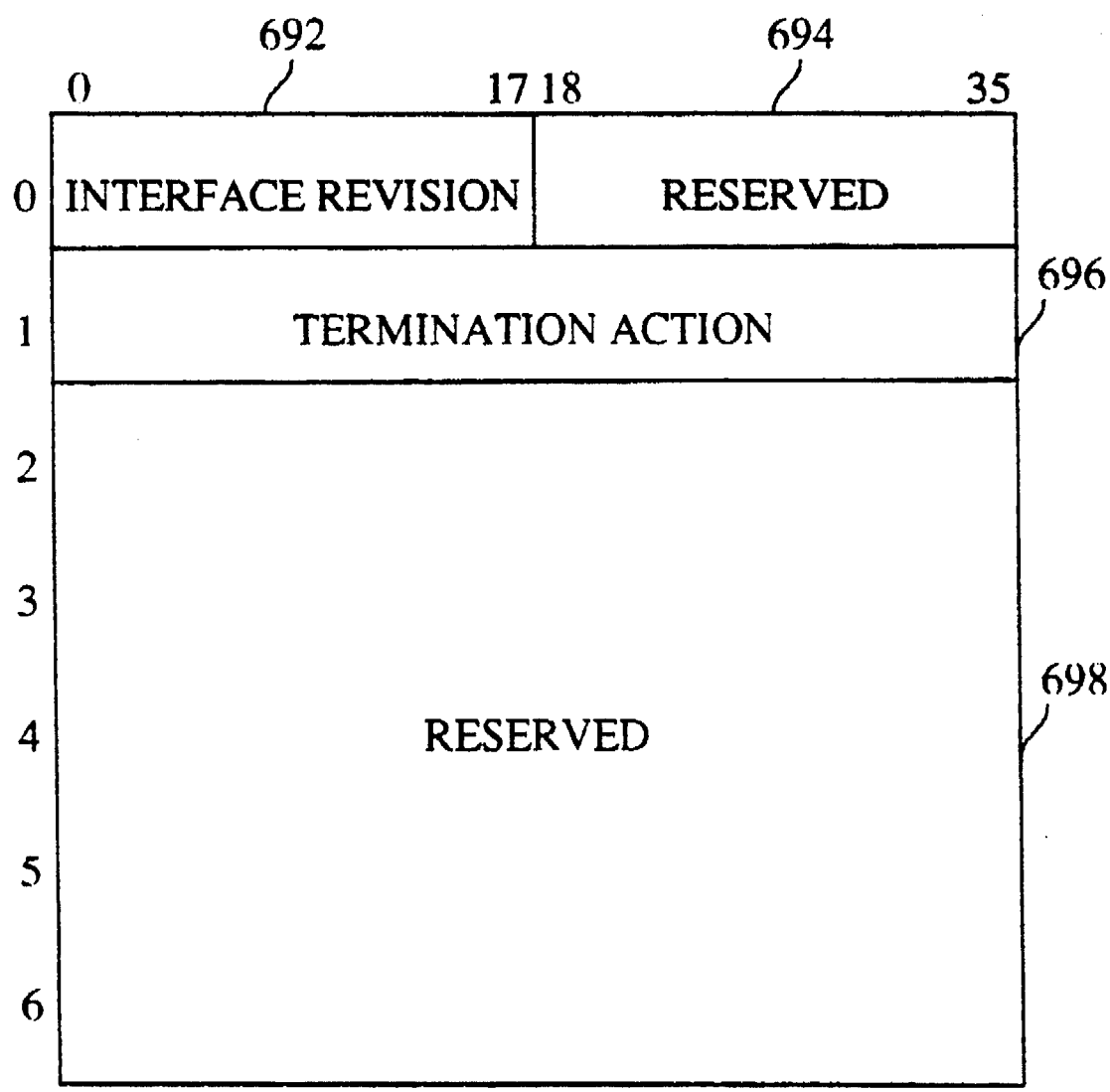
FIG. 28 is a diagram of the format of the TERM$NETWORK packet.

The TERM$NETWORK Exec service terminates the use of a Network Interface and releases the control structures acquired during the INIT$NETWORK service call. Them is one parameter for the TERM$NETWORK service. FIG. 28 is a diagram of the format of the TERM$NETWORK packet. The caller must have read and write access to the packet. The Interface Revision field 692, in Bits 0–17 of Word 0, holds an identifier for the revision level of the interface. Bits 18–35 of Word 0 are Reserved 694. The Termination Action field 696, in Word 1, specifies the action to be taken. Possible values include terminating the use of an Network Interface, and terminating the use of the Network Interface and then downing the Network Interface. Words 2 through 6 are Reserved 698.

Figure 29:
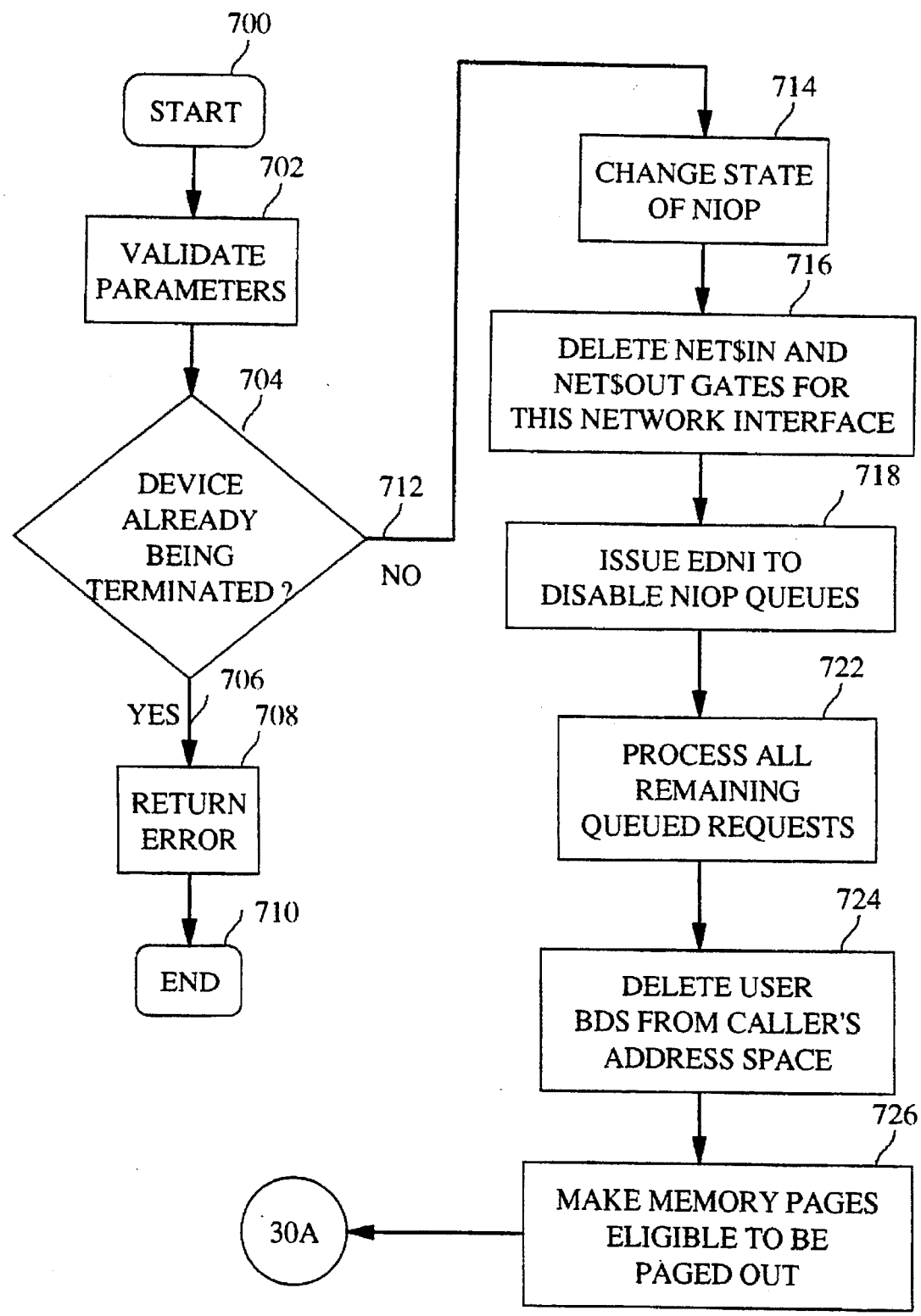
FIG. 29 FIG. 30 are flow charts illustrating the steps for terminating a Network Interface.
Figure 30:
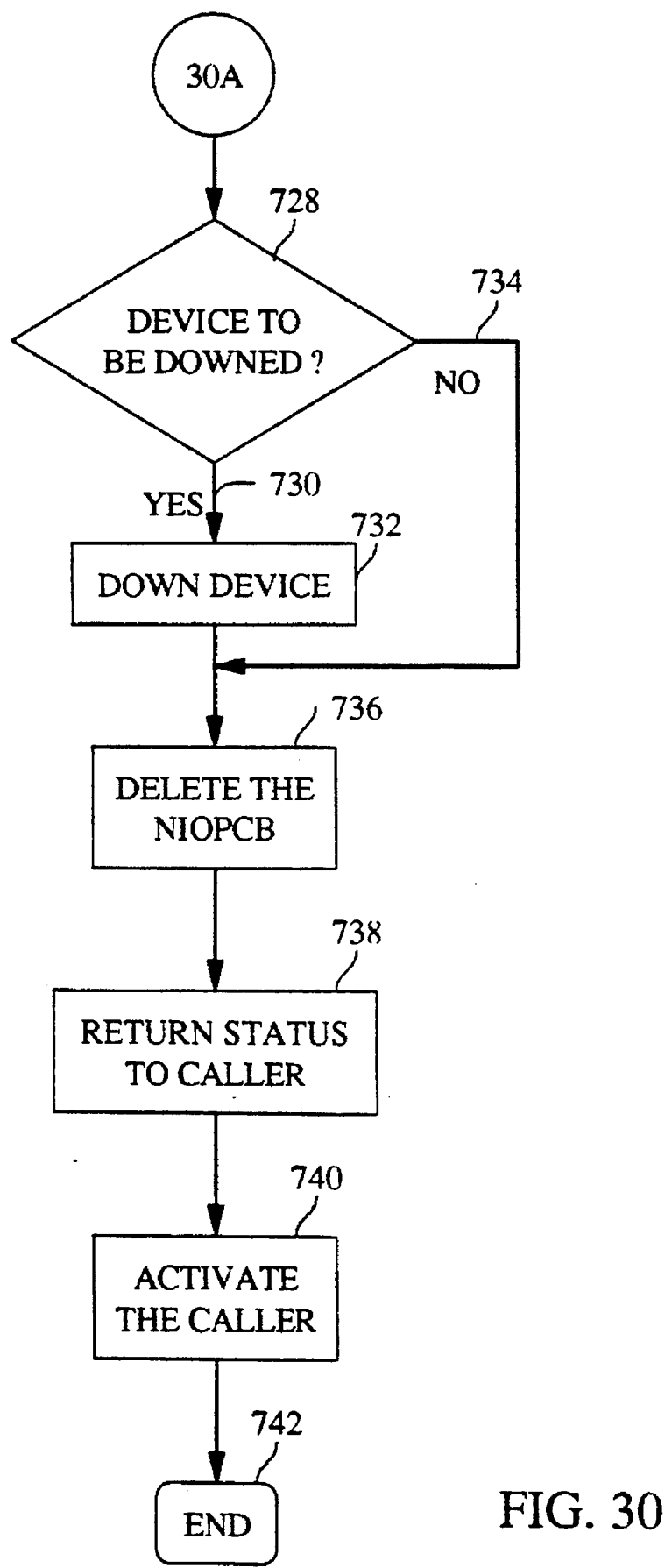

FIG. 29 and FIG. 30 are flow charts illustrating the steps for terminating a Network Interface. After Start Step 700 for the TERM$NETWORK service, the Exec validates the input parameters contained in the TERM$NETWORK packet at Step 702. At Test Step 704, if the Network Interface is already being terminated, then Yes path 706 is taken to Step 708. At this step, an error is returned and TERM$NETWORK processing ends at End Step 710. If the Network Interface is not a/ready being terminated, then No path 712 is taken to Step 714. At this step, the state of the Network Interface is changed to terminating. At Step 716, the NET$IN and NET$OUT gates for this Network Interface are deleted. Control is not returned until all processes executing NET$IN or NET$OUT for this Network Interface have exited these servicesNext, at Step 718, an Enable/Disable Network Interface (EDNI) order code is issued to disable the NIOP queues for this Network Interface (if it is not already disabled from an Exec internal disable action or if the NIOP is being recovered by the maintenance facilities of the computer system and therefore is not accessible). All remaining requests that have been queued into the NIOP Input Queue and NIOP Output Queue but have not been handled by the Exec and had their NIOP Use Counts decremented are processed at Step 722. Next, at Step 724, the user Bank Descriptors (BDs) are deleted from the caller's address space for the NIOP Control Bank and the NIOP Queue Bank. At Step 726, the memory pages which hold the NIOPQB, ICW, and MPBs are made eligible to be paged out. Termination processing continues on FIG. 30 via connector 30A.

Referring now to FIG. 30, if the Network Interface is to be downed at Test Step 728, then Yes path 730 is taken to Step 732, where the Network Interface is downed. Otherwise, No path 734 is taken. Next, at Step 736, the Exec deletes the NIOPCB. At Step 738 the status of the termination operation is returned to the caller. The caller is activated at Step 740 and processing ends at End Step 742.

V. Exec Service-Based Input/Output

A. NET$IN and NET$OUT

Figure 31:
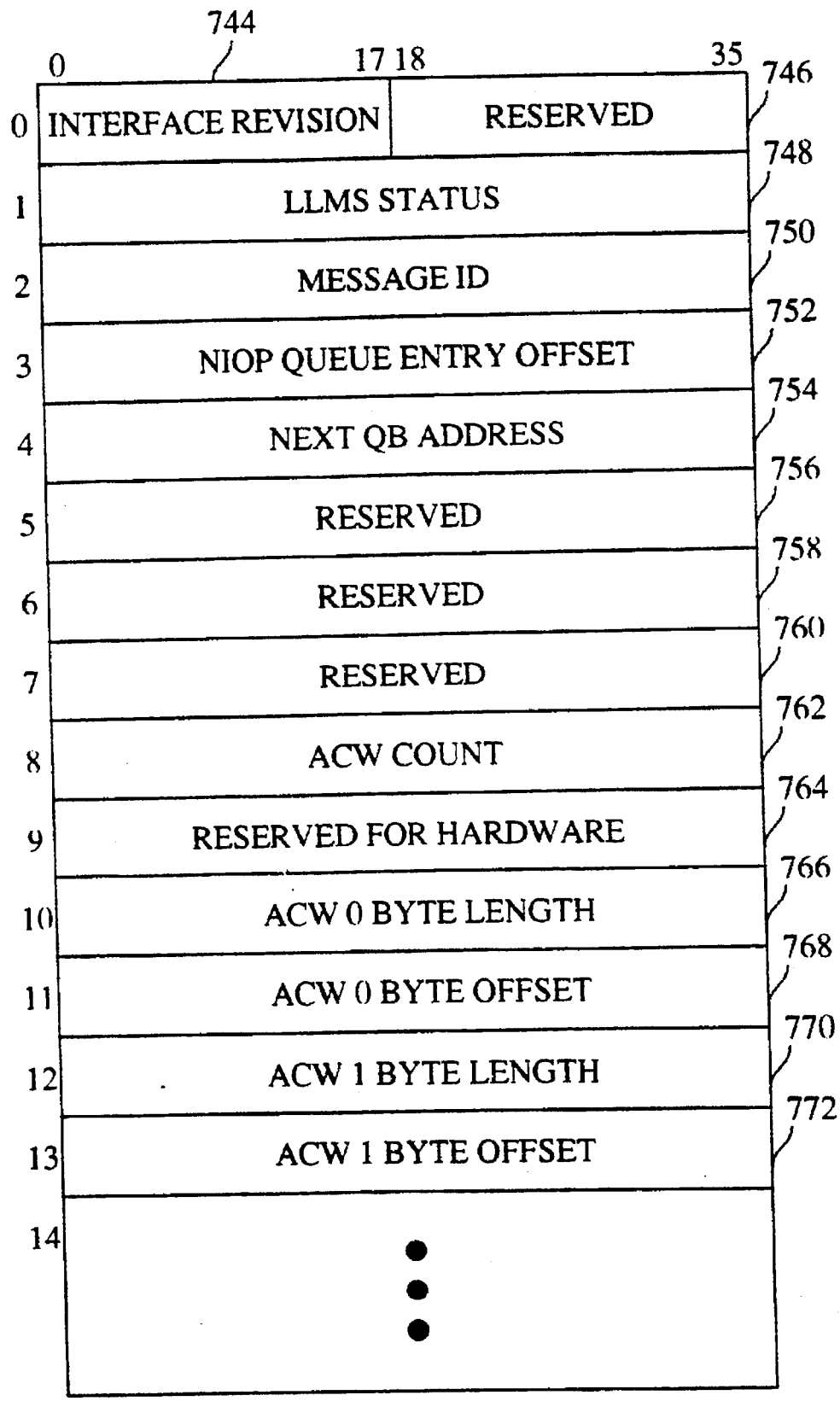
FIG. 31 is a diagram of the format of the NET$IN/NET$OUT packet.

Network input (NET$IN) and network output (NET$OUT) are Exec services used to queue buffers to the NIOP to be used for input messages or output messages. NET$IN and NET$OUT are extremely path length critical. It is within these services where the host pathlength improvements of the Network I/O Architecture are realized. They are executed using the user process to eliminate the overhead environment switching. The NET$IN and NET$OUT Interfaces each have a single parameter, a Queue Bank virtual address. This Queue Bank contains the NET$IN/NET$OUT packet. The caller must have read and write access to the packet. FIG. 31 is a diagram of the format of the NET$IN/NET$OUT packet. The Interface Revision field 744, in Bits 0–17 of Word 0, holds an identifier for the revision level of the interface. Bits 18–35 of Word 0 are Reserved 746. The LLMS Status field 748, in Word 1 of the packet, is used to identify the specific packet that is in error when the status that NET$IN/NET$OUT returns indicates that an error occurred. The LLMS Status is only stored in the packet that was being processed when the error was detected. The Message ID field 750, in Word 2 of the packet, is any 36–bit value the caller uses to identify this input (or output) buffer when looking for a completed NIOP Input Queue or NIOP Output Queue entry. The Message ID is written to the Message ID fields of the NIOP Input Queue/NIOP Output Queue entries as part of the NET$IN/NET$OUT service.

The NIOP Queue Entry Offset field 752, in Word 3, specifies which NIOP Input Queue or NIOP Output Queue entry is to be used to queue the input or output buffer to the NIOP. The Next Queue Bank (QB) Address field 754, in Word 4, specifies the address of the next QB to be used for an input buffer or the address of the next QB to contain portions of the same output message. All QBs have the same format. Next QB Address of zero indicates that there are no additional QBs in the chain. Word 5 756, Word 6 758, and Word 7 760 are all Reserved. The ACW Count 762, in Word 8, specifies the number of Access Control Words (ACWs) that follow. There is one ACW per buffer segment in the Queue Bank. Word 9 764 is Reserved For Hardware. The ACW 0 Byte Length field 766, in Word 10, specifies the number of bytes in the segment described by this ACW. In the preferred embodiment, this must be a multiple of four for input operations For input, the buffer size is the sum of ACWs in any one QB. For output, the buffer size is the sum of all ACWs in all QBs in the QB chain. The ACW 0 Byte Offset field 768, in Word 11, specifies the starting byte offset for the segment described by this ACW (the offset is relative to the start of the QB Text Area). Input is restricted to starting on a word boundary. Multiple Byte Length and Byte Offset fields, such as ACW 1 Byte Length 770 and ACW 1 Byte Offset 772, comprise the rest of the NET$IN/NET$OUT packet.

The head of the Queue Bank chain is addressed by the initial parameter (a QB address) passed by NET$IN or NET$OUT. Subsequent QBs in the chain are addressed by the Next QB Address. For NET$IN, for each Queue Bank ha the Queue Bank chain addressed by the Next Queue Bank Address, separate entries ha the NIOP Input Queue are made (i.e., there is a one-to-one correspondence between Queue Banks and IMPs). If the first Queue Bank's Next Queue Bank Address is non-zero, the pointed-to Queue Bank is for a new IMP. NET$IN with more than one Queue Bank results in multiple IMPs (and multiple NIOP Input Queue entries). However, for NET$OUT, all Queue Banks are part of a single OMP (and one NIOP Output Queue entry).

Figure 32:
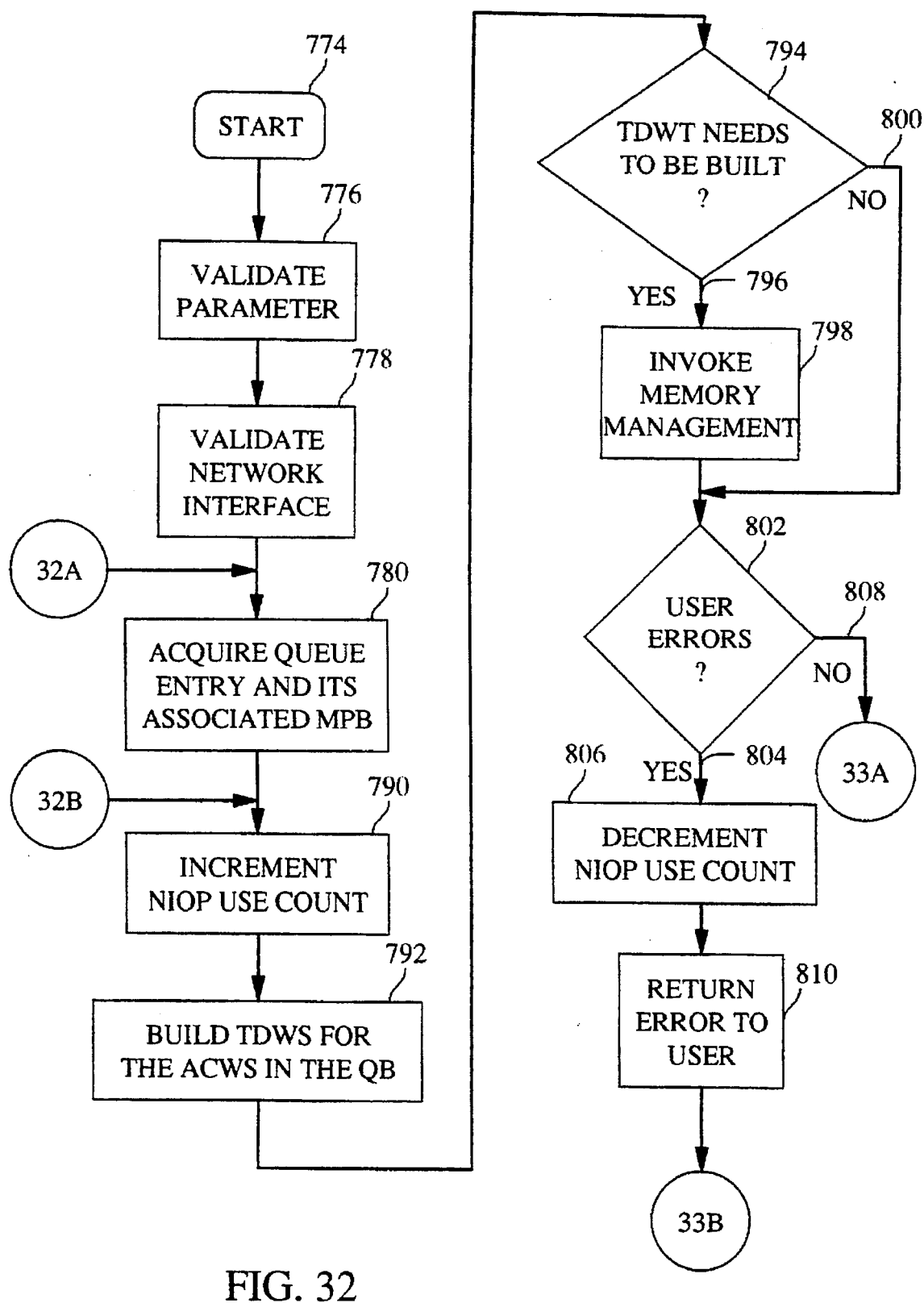
FIG. 32 and FIG. 33 are flow charts illustrating the steps for obtaining input from and sending output to a Network Interface.
Figure 33:
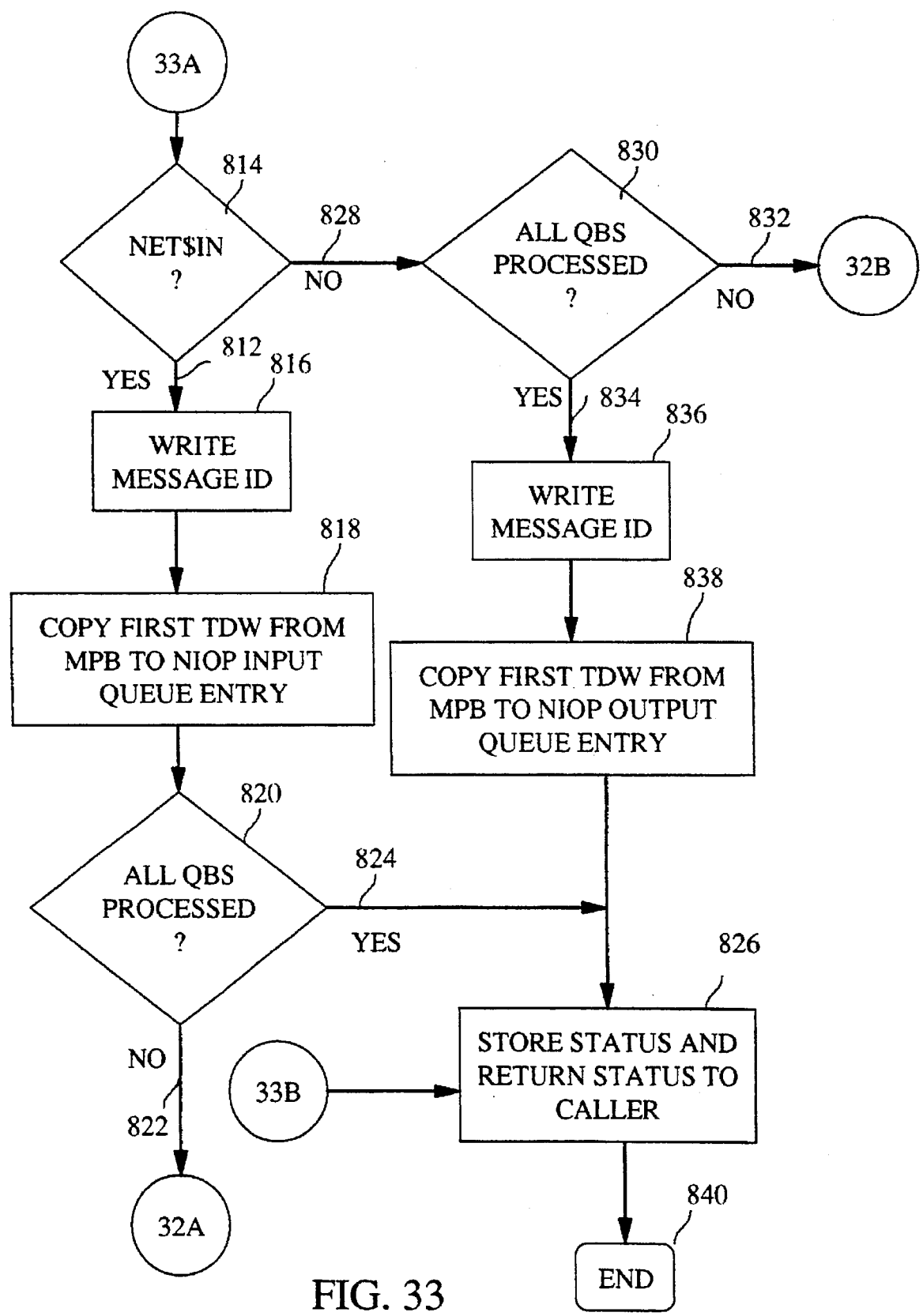

FIG. 32 and FIG. 33 are flow charts illustrating the steps for enqueuing IMPs/OMPs to the NIOP Input Queue/NIOP Output Queue. If an error condition is detected at any time during NET$IN/NET$OUT processing, an error status is returned to the calling program. After Start Step 774 for the NET$IN or NET$OUT service, the Exec validates the input parameters contained in the NET$IN or NET$OUT packet at Step 776. The packet is in the Queue Bank (QB) specified by the input parameter (the Queue Bank virtual address). At Step 778, the Exec validates that the Network Interface can be used. The Network Interface must be up and available, and not be in maintenance recovery, being reset, or being terminated. Next, at Step 780, an NIOP Input Queue or NIOP Output Queue entry specified by the NIOP Queue Entry Offset is acquired. If the Valid bit is set in this entry, an error status is returned to the caller indicating that the entry is not available. Otherwise, the NIOP Use Count is decremented for each Queue Bank in the prior IMP/OMP.

For each QB, the following steps are performed. At Step 790, the NIOP Use Count is incremented to reflect the addition of a QB to the NIOP Input Queue or NIOP Output Queue. If a TDW Template (TDWT) needs to be built (Test Step 794), then Yes path 796 is taken to Step 798, the Exec-internal Memory Management service is invoked to establish the memory pages of the Queue Bank and build the TDWTs. Otherwise, No path 800 is taken. In either case, processing continues with Test Step 802. If there are user errors such as a bad ACW, too many QBs, or too many TDWs, then Yes path 804 is taken to Step 806. If there are no errors, then No path 808 is taken to FIG. 33 via connector 33A. At Step 806, the NIOP Use Count is decremented. Next, at Step 810, the error is returned to the user. Processing continues on FIG. 33 via connector 33B.

Referring now to FIG. 33, if this Exec service call is for receiving an input message via NET$IN, then Yes path 812 is taken from Test Step 814 to Step 816. At this step, the Message ID is written into the packet. At Step 818, the First TDW is copied from the MPB to the NIOP Input Queue entry, thereby setting the Valid bit in the queue entry. If, at Test Step 820, all QBs specified by the caller have not been processed, then No path 822 is taken back to Step 780 on FIG. 32 via connector 32A so further processing of additional QBs may be performed. If all QBs have been processed, then Yes path 824 is taken to Step 826. If, at Test Step 814, this Exec service call is for sending an output message via NET$OUT, then No path 828 is taken to Test Step 830. If all QBs specified by the caller have not been processed, then No path 832 is taken back to Step 790 on FIG. 32 via connector 32B so further processing of additional QBs may be performed. If all QBs have been processed, then Yes path 834 is taken to Step 836. At this step, the Message ID is written into the NIOP Output Queue entry. At Step 838, the First TDW is copied from the MPB to the NIOP Output Queue entry, thereby setting the Valid bit in the queue entry. Finally, at Step 826, the status is stored and returned to the caller, and processing ends at End Step 840.

V. Instruction-Based Input/Output

The NIOP Support Instructions provide functionality equivalent to the NET$IN and NET$OUT Exec services described above. The processing overhead needed to implement each service is minimized through the use of specialized instructions, thereby improving overall system performance. The instruction pathlength traversed when using the NIOP Support Instructions shortens the number of processor cycles per I/O action. The Communications Program 32 uses the NIOP Support Instructions, rather than the NIOP Exec Services 34 NET$IN and NET$OUT, to implement network I/O-related requests. Specifically, instructions are provided to build IMPs and OMPs, enqueue them to the Network Input Queue or Network Output Queue, and release them after use. However, the INIT$NETWORK, RSET$NETWORK, and TERM$NETWORK services are still used.

A. Network I/O Processor Support Instructions

The Network I/O Processing architecture adds six instructions to the instruction set of the Computer System. There are three instructions used for input and three instructions used for output.

The Build Input Message Program (BIMP) instruction builds an IMP in a Message Program Buffer (MPB). The BIMP also increments the NIOP Use Count for the specified Queue Bank. A BIMP instruction must be executed for each Queue Bank in the input message. The BIMP requires three parameters. The first parameter is the address of the NIOP Queue Bank (NIOPQB) for the particular Network Interface being used. The second parameter is the NIOP Input Queue Entry Offset. The NIOP Input Queue Entry Offset is the address of the Network Input Queue (NIOP Input Queue)

entry to be used, relative to the start of the NIOP Input Queue. The BIMP must specify an NIOP Input Queue entry whose MPB has the NIOP Controlled (NC) field set to zero, otherwise an Addressing Exception interrupt is generated. The third parameter is the address of the Queue Bank to be added to the IMP. When building an IMP, an Addressing Exception is generated if the byte length is not a multiple of four or the byte offset is not a multiple of four in any Access Control Word (ACW). For all instructions, an Addressing Exception is generated if the Update In Progrss (UIP) field is set.

The Enqueue to NIOP Input Queue (ENIQ) instruction enqueues an IMP to an NIOP Input Queue entry and sets the associated MPB's NIOP Controlled (NC) field. The ENIQ requires three parameters. The first parameter is the address of the NIOP Queue Bank (NIOPQB) for the particular Network Interface being used. The second parameter is the NIOP Input Queue Entry Offset. The NIOP Input Queue Entry Offset is the address of the NIOP Input Queue entry to be used, relative to the start of the NIOP Input Queue. The third parameter is a Message Identifier (ID). The Message ID is copied to the Message ID 150 word of the NIOP Input Queue entry. The ENIQ instruction must specify an NIOP Input Queue entry whose MPB has its NIOP Controlled (NC) field set to zero, otherwise an Addressing Exception interrupt is generated.

The Release Input Message Program (RIMP) instruction releases the structures associated with an IMP. First, Use Count fields are decremented for each Queue Bank in the MPB. The NC field in the associated MPB is cleared. The RIMP instruction requires two parameters. The first parameter is the address of the NIOP Queue Bank (NIOPQB) for the particular Network Interface being used. The second parameter is the NIOP Input Queue Entry Offset. The NIOP Input Queue Entry Offset is the address of the NIOP Input Queue entry to be used, relative to the start of the NIOP Input Queue. The RIMP must specify an NIOP Input Queue entry with the Valid bit 146 cleared and whose MPB has the NC field set to one. Otherwise, an Address Exception interrupt is generated.

The Build Output Message Program (BOMP) instruction builds an OMP in an MPB. A BOMP instruction must be executed for each Queue Bank in the output message. The BOMP requires three parameters. The first parameter is the address of the NIOP Queue Bank (NIOPQB) for the particular Network Interface being used. The second parameter is the NIOP Output Queue Entry Offset. The NIOP Output Queue Entry Offset is the address of the Network Output Queue (NIOP Output Queue) entry to be used, relative to the start of the NIOP Output Queue. The BOMP must specify an NIOP Output Queue entry whose MPB has the NIOP Controlled (NC) field set to zero, otherwise an Address Exception interrupt is generated. The third parameter is the address of the Queue Bank to be added to the OMP.

The Enqueue to NIOP Output Queue (ENOQ) instruction enqueues an OMP to an NIOP Output Queue entry and sets the associated MPB's NIOP Controlled (NC) field. The ENOQ requires three parameters. The first parameter is the address of the NIOP Queue Bank (NIOPQB) for the particular Network Interface being used. The second parameter is the NIOP Output Queue Entry Offset. The NIOP Output Queue Entry Offset is the address of the Network Output Queue (NIOP Output Queue) entry to be used, relative to the start of the NIOP Output Queue. The third parameter is a Message Identifier (ID). The Message ID is copied to the Message ID 150 word of the NIOP Output Queue entry. The ENOQ instruction must specify an NIOP Output Queue entry whose MPB has its NIOP Controlled (NC) field set to zero, otherwise an Addressing Exception interrupt is generated.

The Release Output Message Program (ROMP) instruction releases the structures associated with an OMP. First, Use Count fields are decremented for each Queue Bank in the MPB. The NC field in the associated MPB is cleared. The ROMP instruction requires two parameters. The first parameter is the address of the NIOP Queue Bank (NIOPQB) for the particular Network Interface being used. The second parameter is the NIOP Output Queue Entry Offset. The NIOP Output Queue Entry Offset is the address of the NIOP Output Queue entry to be used, relative to the start of the NIOP Output Queue. The ROMP must specify an NIOP Output Queue entry with the Valid bit 146 cleared and whose MPB has the NC field set to one. Otherwise, an Address Exception interrupt is generated.

B. An Example For Using The Network I/O Architecture Support Instructions

Figure 34:
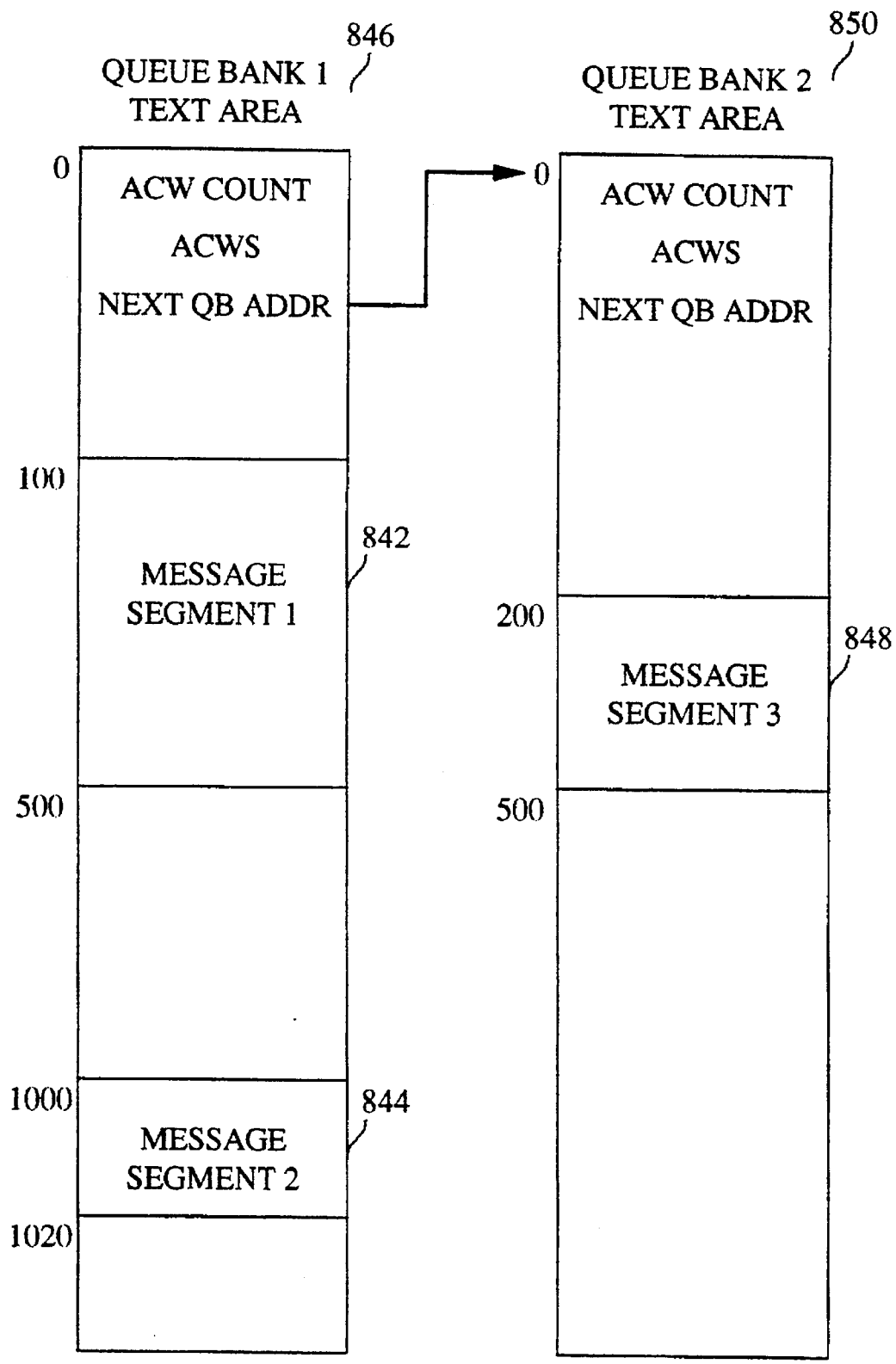
FIG. 34 is a block diagram showing sample Queue Banks for sending output messages.

FIG. 34 is a block diagram showing sample Queue Banks for sending output messages. There are three message segments in the sample message to be output over the Communications Network. Message Segment 1 842 and Message Segment 2 844 are stored in Queue Bank 1 Text Area 846. Message Segment 3 848 is stored in Queue Bank 2 Text Area 850. Field values stored in Queue Bank 1 for this example include ACW Count being equal to 2; ACW 0. Byte Length being equal to 400 (decimal), ACW 0. Byte Offset being equal to 100 (decimal), ACW 1. Byte Length being equal to 20 (decimal), ACW 1. Byte Offset being equal to 1000 (decimal), and Next Pointer being equal to the virtual address of Queue Bank 2. Field values stored in Queue Bank 2 include ACW Count being equal to 1, ACW Byte Length being equal to 300 (decimal), ACW Byte Offset being equal to 200 (decimal), and Next Pointer being equal to 0. Table I below shows a sample code fragment in the assembly language of the preferred embodiment for sending an output message over the Network Interface via the NIOP Output Queue by using the NIOP Support Instructions.

TABLE I

© 1995 Unisys Corporation.
. SEND_NIOP Output Queue: SEND OUTPUT MESSAGE OVER NIOP Output Queue . Builds OMP, enqueues OMP to NIOP Output Queue, then updates NOQ_ENQPTR.

TABLE I-continued

. Input parameters: A0 holds the VA of the first Queue Bank holding message segment(s). (Note that any subsequent QBs are in the linked list specified by the QB "Next_Pointer" field.)
. Output parameters: None

SEND_NOQ.

| | | | |
|---|---|---|---|
| | TNZ | EMPTY_NOQ_CNT,,Bdata | . Check for empty NIOP Output . Queue entries |
| | J | NO_NOQ_ENTRIES | . No NIOP Output Queue entries . available (error or wait) |

. The code in the box below is replaced by a CALL to NET$OUT in the
. Exec Service-based system.

| | | | |
|---|---|---|---|
| | L | A1,A0 | . Save first QB VA for Message ID |
| BOMP$_D$LOOP. | | | |
| | BOMP | A0,NOQ$_D$ENQPTR,,Bdata | . Write TDWs for this QB |
| | LBU | Btemp,A0 | . Base QB |
| | L | A0,NEXT$_D$ POINTER,,Btemp | . Get Next$_D$ Pointer |
| | JNZ | A0,BOMP$_D$LOOP | . Loop if more QBs |
| | ENOQ | A1,NOQ$_D$ENQPTR,,Bdata | . Enqueue OMP to NIOP Output . Queue |

| | | | |
|---|---|---|---|
| | DEC | EMPTY_NOQ_CNT,,Bdata | . Decrement empty NIOP Output . Queue entries count |
| | L,H2 | A0,NOQ_ENQPTR,,Bdata | . Get NOQ_ENQPTR offset |
| | AA,U | A0,NOQ_ENTRYSIZE | . Increment NOQ_ENQPTR offset |
| | TLE,U | A0,LAST_NOQENTRY | . Check for end-of-NIOP Output . Queue |
| | L,U | A0,1ST_NOQENTRY | . Reset to first NIOP Output Queue . entry |
| | S,H2 | A0,NOQ_ENQPTR,,Bdata | . Store new NOQ_ENQPTR offset |
| | RTN | 0 | . Subroutine done |

Table II below shows a sample code fragment for releasing NIOP Output Queue entries.

TABLE II

© 1995 Unisys Corporation.
. RLS_NIOP Output Queue: RELEASE NOQ ENTRY

. Releases all NIOP Output Queue entries with Valid bit = 0, then updates
. NOQ_DEQPTR.

. For each released entry, NOQ_STS_HNDL is CALLed to process the completion status
. Input parameters: None
. Output parameters: None

RLS_NOQ.

| | | | |
|---|---|---|---|
| | L,H2 | A0,NOQ_DEQPTR,,Bdata | . Get NOQ_DEQPTR offset |

ROMP_LOOP.

| | | | |
|---|---|---|---|
| | L,H1 | A1,NOQ,A0,Bniopqb | . Isolate NIOP Output Queue entry . Valid bit |
| | JB | A1,$+2 | . Check for Valid = 0 |
| | RTN | 0 | . No more entries w/valid = 0 to . process |
| | DL | A1,NOQ,A0,Bniopqb | . Store entry for status handler |
| | DS | A1,NOQ_STATUS,,Bdata | . |
| | DL | A1,NOQ+2,A0,Bniopqb | . |
| | DS | A1,NOQ_STATUS+2,,Bdata | . |

. The code in the box below is replaced by a call to NET$OUT in the Exec Service-based
. system.

| | | | |
|---|---|---|---|
| | ROMP | A0 | . Release the NIOP Output Queue . entry |

| | | | |
|---|---|---|---|
| | INC | EMPTY_NOQ_CNT,,Bdata | . Increment empty NIOP Output . Queue entries count |

TABLE II-continued

| | | |
|---|---|---|
| AA,U | A0,NOQ_ENTRYSIZE | . Increment NOQ_DEQPTR offset |
| TLE,U | A0,LAST_NOQENTRY | . Check for end-of-NIOP Output |
| | | . Queue |
| L,U | A0,1ST_NOQENTRY | . Reset to first NIOP Output Queue |
| | | . entry |
| S,H2 | A0,NOQ_DEQPTR,,Bdata | . Store new NOQ_DEQPTR offset |
| CALL | NOQ_STS_UNDL | . Process NIOP Output Queue status |
| J | ROMP_LOOP | . Check next entry for completion |

A novel system architecture for performing network input/output processing has been described. A Network I/O Processor (NIOP) supports application program requests for sending output to and receiving input from communications networks or optionally attached peripheral devices such as disk drives, tape drives, etc. Microcode enhancements and specialized operating system services provide the capability to minimize the instruction pathlength needed to perform network I/O, thereby improving the overall performance of the computer system. Special purpose instructions are introduced to further shorten the time required to provide network I/O capabilities.

The invention has been described in its presently contemplated best mode, and clearly it is susceptible to various modifications, modes of operation and embodiments, all within the ability and skill of those skilled in the art and without the exercise of further inventive activity. Accordingly, what is intended to be protected by Letters Patent is set forth in the appended claims.

Appendix A

NIOP Instruction Algorithms

Algorithm Notes:
1. There are two options for how the real address portion of the MPB TDWTs are built: 1) a model may use the Queue Bank Control Area TDWs to translate QB-relative addresses to real addresses (referred to as TDW_TRANSLATION_SUPPORT), or 2) a model may form QB absolute addresses, then use the Page Table to translate these addresses to real addresses (referred to as PT_TRANSLATION_SUPPORT).
2. NIQ/NOQ storage lock can be done on a NIQ/NOQ entry, on the NIQ/NOQ, or on the NIOPQB.
3. The constant "Text_Area_Byte_Offset" is the number of Control Area bytes.

1. BIMP/BOMP Algorithm
Validate Parameters
  1. Calculate the address of the Bank Descriptor (BD) referenced by QB Level, Bank Descriptor Index (L,BDI) and validate as an Active Queue Bank Descriptor (QBD). if any of the following conditions exist, generate an Addressing Exception and exit algorithm:
    a. QB L.BDI<0.32.
    b. A Limits Violation is detected on the BD reference.
    c. BD.Type<>4 (QBD).
    d. BD.Inactive=1.
    e. Write access to the Queue Bank is denied.
    f. Read access to the Queue Bank is denied.
  2. Calculate the address of the BD referenced by NIOPQB L.BDI and validate as an NIOPQBD. If any of the following conditions exist, generate an Addressing Exception and exit algorithm:
    a. NIOPQB L.BDI<0,32.
    b. A Limits Violation is detected on the BD reference.
    c. BD.Type<>NIOPQBD.
    d. Read Access to the NIOPQB is denied.
  3. Validate NIOP Input Queue/NIOP Output Queue Entry Address. If any of the following conditions exist, generate an Addressing Exception interrupt and exit algorithm:
    a. Entry_Address>4092 decimal.
    b. Entry_Address not on a 4-word boundary.
  4. If QB.ACW_Count=0, generate an Addressing Exception interrupt and exit algorithm.
  5. Acquire NIOP Input Queue/NIOP Output Queue entry:
    a. Storage lock MPB.
    b. If MPB(Entry_Address).UIP=1, then release storage lock, generate Addressing Exception, and exit algorithm.
    c. Else MPB(Entry_Address).UIP:=1.
    d. Release storage lock.
  6. Validate NIOP Input Queue/NIOP Output Queue entry state:
    If MPB(Entry_Address).NC =1, then MPB(Entry_Address).UIP =0, generate an Addressing Exception and exit algorithm.
  7. Check MPB trap and increment Use Count:
    a. Storage lock QB.
    b. If QB.MPBCW.MPB_Trap=1, then release storage lock, MPB(Entry_Address).UIP =0, generate Addressing Exception, and exit algorithm.
    c. QB.MPBCW.Use_Count:=QB.MPBCW. Use_Count+1.
    d. Release storage lock.
  8. Add QB to MPB.QBPs:
    a. If MPB(Entry_Address).Next_QBP_Address>MPB(Entry_Address).Max_QBP_Address, then MPB(Entry_Address).UIP=0, generate Addressing Exception, and exit algorithm.
    b. MPB(Entry_Address).QBP(Next_QBP_Address) :=QB Base Address.
    c. MPB(Entry_Address).Next_QBP_Address :=MPB(Entry_Address).Next_QBP_Address+2.
  9. If continuation of MPB build, set previous Data Chain:
    If MPB(Entry_Address).Next_TDW_Address<>MPBCEntry_Address).First_TDW_Address, then MPB(Entry_Address).TDW(Next_TDW_Address-2).DC:=1.
  10. Current_ACW_Count:=QB.ACW_Count.
  11. Temp_Next_TDW_Address:=MPB(Entry_Address).Next__TDW_Address.

Initialize for TDW Build
  12. Check ACW validity. If any of the following conditions exist, generate an Addressing Exception interrupt and exit algorithm:

a. ACW.Byte_Length=0.

b. ((ACW. Byte_Length+ACW.Byte_Offset) DIV 4)>QB.Upper_Limit.

c. For BIMP only, ACW.Byte_Length is not a multiple of 4 (Byte Length bits 34–35 <>0).

d. For BIMP only, ACW.Byte_Offset is not a multiple of 4 (Byte Offset bits 34–35 <>0).

13. Initialize holding registers for building this ACW's TDWs:

a. Current_Byte_Length:=ACW.Byte_Length.

b. Current_Byte_Offset:=ACW.Byte_Offset.

Write a TDW

14. If Temp_Next_TDW_Address >MPB(Entry_Address).Max_TDW_Address, then MPB(Entry_Address).UIP=0, generate Addressing Exception, and exit algorithm.

15. If TDW_TRANSLATION_SUPPORT, build TEMP_TDW:

a. QB_CA_TDWT_Number:=(Current_Byte_Offset+Text_Area_Byte_Offset) DIV (Page_Size *4)

b. If QB_CA.TDWT(QB_CA_TDWT_Number).Byte_Length=0, then MPB(Entry_Address).UIP=0, generate Addressing Exception, and exit algorithm.

c. Byte_Offset_Into_Page:=(Current_Byte_Offset+Text_Area_Byte_Offset) MOD (Page_Size *4)

d. Word_Offset_Into_Page:=Byte_Offset_Into_Page DIV 4 e. Bytes_Left In TDWT:=QB_CA.TDWT(QB_CA_TDWT_Number).Byte_Length-Byte_Offset_Into_Page f. Temp_TDW. Real_Address:=QB_CA.TDWT(QB_CA_TDWT_Number).Real_Address+Word_Offset_Into_Page.

g. Temp_TDW.Byte_Length:=smaller of Current_Byte_Length or Bytes_Left In TDWT.

h. Temp_TDW.Byte_Offset:=Byte_Offset_Into_Page MOD 4.

i. Temp_TDW. Valid:=1.

16. If PT_TRANSLATION_SUPPORT, build TEMP_TDW:

a. QB_CA_TDWT_Number:=(Current_Byte_Offset+Text_Area_Byte_Offset) DIV (Page_Size *4)

b. If QB_CA.TDWT(QB_CA_TDWT_Number).Byte_Length=0, then MPB(Entry_Address).UIP=0, generate Addressing Exception, and exit algorithm.

c. Byte_Offset_Into_Page:=(Current_Byte_Offset+Text_Area_Byte_Offset) MOD (Page_Size *4)

d. Bytes_Left In TDWT:=QB_CA.TDWT(QB_CA_TDWT_Number).Byte_Length-Byte_Offset_Into_Page e. Temp_TDW.Real_Address:=Real Address of (QB_CA+(Current_Byte_Offset DIV 4))

f. Temp_TDW.Byte_Length:=smaller of Current_Byte_Length or Bytes_Left In TDWT.

g. Temp_TDW. Byte_Offset:=Byte_Offset_Into_Page MOD 4.

h. Temp_TDW.Valid:=1.

17. Update holding registers:

a. Current_Byte_Length:=Current_Byte_Length - Temp_TDW.Byte_Length.

b. Current_Byte_Offset:=Current_Byte_Offset+Temp_TDW.Byte_Length.

18. Determine if TDW should have Data Chain set:

If (Current_Byte_Length<>0.OR. Current_ACW_Count>1), then Temp_TDW.DC:=1; else, Temp_TDW.DC:=0.

19. Write TEMP_TDW to MPB:

MPB(Entry_Address).TDW(Next_TDW_Address):=Temp_TDW.

Check for Continuation

20. If Current_Byte_Length<>0, then go to step 14 to build next TDW for this ACW.

21. Current_ACW_Count:=Current_ACW_Count-1. If Current_ACW_Count<>0, then go to step 12 to build TDWs for next ACW.

Commit MPB

22. MPB(Entry_Address).Next_TDW_Address:=MPB(Entry_Address).Next_TDW_Address+2.

23. Release NIOP Input Queue/NIOP Output Queue entry:

MPB(Entry_Address).UIP=0.

24. Exit algorithm.

2. ENIQ/ENOQ Algorithm

1. Calculate the address of the BD referenced by NIOPQB L.BDI and validate as an NIOPQBD. If any of the following conditions exist, generate an Addressing Exception and exit algorithm:

a. NIOPQB L.BDI<0,32.

b. A Limits Violation is detected on the BD reference.

c. BD.Type<>NIOPQBD.

d. Read Access to the NIOPQB is denied.

2. Validate NIOP Input Queue/NIOP Output Queue Entry Address. If any of the following conditions exist, generate an Addressing Exception interrupt and exit algorithm:

a. Entry_Address>4092 decimal.

b. Entry_Address not on a 4-word boundary.

2. Acquire NIOP Input Queue/NIOP Output Queue entry:

a. Storage lock MPB.

b. If MPB(Entry_Address).UIP=1, then release storage lock, generate an Addressing Exception, and exit algorithm.

c. Else MPB(Entry_Address).UIP:=1.

d. Release storage lock.

4. Validate NIOP Input Queue/NIOP Output Queue entry state:

If MPB(Entry_Address).NC=1, then MPB(Entry_Address).UIP=0, generate an Addressing Exception and exit algorithm.

5. Check that IMP/OMP has been written:

If MPB(Entry_Address).Next_TDW_Address=MPB(Entry_Address).First_TDW_Address, then MPB(Entry_Address).UIP=0, generate an Addressing Exception and exit algorithm.

6. Update NIOP Input Queue/NIOP Output Queue Entry State:

MPB(Entry_Address).NC:=1.

7. Write NIOP Input Queue/NIOP Output Queue entry:

a. NIQ/NOQ(Entry_Address).First_TDW:=MPB(Entry_Address).TDW(First_TDW_Address)

b. NIQ/NOQ(Entry_Address).Reserved_For_Software:=Message_ID

Note that word 0 of first TDW must be written as part of the last NIQ/NOQ entry write to prevent the NIOP from seeing the Valid bit set before the entire entry is written.

8. Release NIOP Input Queue/NIOP Output Queue entry:

MPB(Entry_Address).UIP=0.
9. Exit algorithm.
3. RIMP/ROMP Algorithm
  1. Calculate the address of the BD referenced by NIOPQB L,BDI and validate as an NIOPQBD. If any of the following conditions exist, generate an Addressing Exception and exit algorithm:
     a. NIOPQB L,BDI<0,32.
     b. A Limits Violation is detected on the BD reference.
     c. BD.Type<>NIOPQBD.
     d. Read Access to the NIOPQB is denied.
  2. Validate NIOP Input Queue/NIOP Output Queue Entry Address. If any of the following conditions exist, generate an Addressing Exception interrupt and exit algorithm:
     a. Entry_Address>4092 decimal.
     b. Entry_Address not on a 4-word boundary.
  3. Acquire NIOP Input Queue/NIOP Output Queue entry:
     a. Storage lock MPB.
     b. If MPB(Entry_Address).UIP=1, then release storage lock, generate Addressing Exception, and exit algorithm.
     c. Else MPB(Entry_Address).UIP:=1.
     d. Release storage lock.
  4. Validate NIOP Input Queue/NIOP Output Queue entry state. If any of the following conditions exist, then MPB(Entry_Address).UIP=0, generate an Addressing Exception interrupt and exit algorithm:
     a. MPB(Entry_Address).NC=0.
     b. NIQ/NOQ(Entry_Address).First_TDW.V=1.
  5. Decrement QB Use_Counts:
     a. Current_QBP_Address:=MPB(Entry_Address).First_QBP_Pointer.
     b. Current_QB_Address:=MPB(Entry_Address).QBP(Current_QBP_Address).QBBA
     c. Storage lock QB.
     d. QB.MPBCW.Use_Count:=QB.MPBCW.Use_Count-1.
     e. Release storage lock.
     f. Current_QBP_Address:=Current_QBP_Address+4.
     g. If Current_QBP<>MPB(Entry_Address).Next_QBP_Pointer, then go to substep b.
  6. Update NIOP Input Queue/NIOP Output Queue Entry State:
     MPB(Entry_Address).NC:=0.
  7. Release NIOP Input Queue/NIOP Output Queue entry:
     MPB(Entry_Address).UIP=0.
  8. Exit algorithm.

We claim:

1. In a computer system processing communications input/output requests for receiving network input data from, and sending network output data to, a plurality of communications networks coupled to the computer system by network interfaces, and for initializing, resetting, and terminating the usage of the network interfaces, network input data from the communications networks being transferred in network input messages, network output data to the communications networks being transferred in network output messages, and status being reported in input/output status messages, an input/output system for processing communications input/output requests comprising:

instruction processor means for executing computer program instructions;
  network input/output processing means coupled to said instruction processor means and the communications networks for accepting communications input/output requests from said instruction processor means, and receiving network input data from and sending network output data to the communications networks, including:
    network input/output means coupled to said instruction processor means for processing communications input/output requests received from said instruction processor means to send network output messages and receive network input messages over the network interface; and
    network interface controller means coupled to said network input/output means and the communications networks for controlling the network interface to receive network input messages from the communications networks and to forward the network input messages to said network input/output means, and to accept network output messages from said network input/output means and send the network output messages to the communications networks; and
  storage means coupled to said instruction processor means and said network input/output processing means for storing the network input messages, the network output messages, and the computer program instructions.

2. The input/output system of claim 1, wherein said storage means includes:
  control table means for storing initialization, reset, and termination communications input/output requests being sent from said instruction processor means to said network input/output processing means, and for storing the input/output status messages being sent from said network input/output processing means to said instruction processor means;
  network input queue means for controlling the storage of network input messages received from said network input/output processing means;
  network output queue means for controlling the sending of network output messages received from said instruction processor means.; and
  data buffer means for storing network input data and network output data which are accessible by said network input/output processing means and said instruction processor means.

3. The input/output system of claim 2, wherein said instruction processor means includes:
  application software means for processing application computer programs, said application software means having direct access to selected ones of said data buffer means wherein the network input data and the network output data are stored;
  communications software means coupled to said application software means for executing requests from said application software means to obtain network input data from the communications networks and send network output data to the communications networks; and
  executive software means coupled to said application software means and said communications software means for processing communications input/output requests from said communications software means to obtain network input messages from and to send network output messages to said network input/output processing means.

4. The input/output system of claim 3, wherein said executive software means includes:
  initializing means for initializing usage of a selected network interface;

resetting means for resetting usage of said selected network interface after the occurrence of an error;

receiving means for receiving network input data from said at least one network input/output processing means over said selected network interface;

sending means for sending network output data to said at least one network input/output processing means over said selected network interface; and terminating means for terminating usage of said selected network interface.

5. The input/output system of claim 4, wherein said instruction processor means further includes:

means for executing a build input message program instruction to build an input message program in said storage means, said input message program including at least one address of a selected data buffer means for storing a network input message.

6. The input/output system of claim 4, wherein said instruction processor means further includes:

means for executing an enqueue instruction to enqueue said input message program into said network input queue means.

7. The input/output system of claim 4, wherein said instruction processor means further includes:

means for executing a release input message program instruction to remove said input message program from said network input queue means.

8. The input/output system of claim 4, wherein said instruction processor means further includes:

means for executing a build output message program instruction to build an output message program in said storage means, said output message program including at least one address of a selected second one or more of said data buffer means for storing a network output message.

9. The input/output system of claim 4, wherein said instruction processor means further includes:

means for executing an enqueue instruction to enqueue said output message program into said network output queue means.

10. The input/output system of claim 4, wherein said instruction processor means further includes:

means for executing a release output message program instruction to remove said output message program from said network output queue means.

11. In a computer system having at least one instruction processor for executing computer program instructions fetched from a main storage unit, and having input/output requests far obtaining input data and sending output data, the input/output requests being either communications input/output requests or peripheral device input/output requests, communications input/output requests being for receiving network input data from, and sending network output data to, a plurality of communications networks coupled to the computer system, peripheral device input/output requests being for receiving peripheral input data from, and sending peripheral output data to, a plurality of attached peripheral devices coupled to the computer system, network input data from the communications networks being transferred in network input messages, network output data to the communications networks being transferred in network output messages, peripheral input data from the attached peripheral devices being transferred in peripheral input messages, a network input/output processor for processing requests for receiving input data from, and sending output data to, the plurality of communications networks and the plurality of peripheral devices, comprising:

network input/output means coupled to the at least one instruction processor and the main storage unit for processing communications input/output requests received from the at least one instruction processor to send network output messages and receive network input messages;

network interface controller means coupled to said network input/output means and the communications networks for controlling a network interface to receive network input messages from the communications networks and to forward the network input messages to said network input/output means, and to accept network output messages from said network input/output means and to send the network output messages to the communications networks;

channel input/output means coupled to the at least one instruction processor and the main storage unit for processing peripheral device input/output requests received from the at least one instruction processor to send peripheral output data and receive peripheral input messages; and channel adapter means coupled to said channel input/output means and the peripheral devices for receiving peripheral input messages from the peripheral devices and forwarding the peripheral input messages to said channel input/output means, and for accepting peripheral output data received from said channel input/output means and sending the peripheral output data to the peripheral devices.

12. The network input/output processor means of claim 11, wherein the network input messages, the network output messages, the peripheral input data, and the peripheral output data are stored in the main storage unit.

13. In a computer system having input/output requests for obtaining input data and sending output data, the input/output requests being either communications input/output requests or peripheral device input/output requests, communications input/output requests being for receiving network input data from, and sending network output data to, a plurality of communications networks coupled to the computer system by network interfaces, and for initializing, resetting, and terminating usage of network interfaces, peripheral device input/output requests being for receiving peripheral input data from, and sending peripheral output data to, a plurality of attached peripheral devices coupled to the computer system, network input data from the communications networks being transferred in network input messages, network output data to the communications networks being transferred in network output messages, peripheral input data from the attached peripheral devices being transferred in peripheral input messages, and status being reported in input/output status messages, an input/output system for processing input/output requests comprising:

instruction processor means for executing computer program instructions;

network input/output processing means coupled to said instruction processor means, the communications networks, and the attached peripheral devices for accepting input/output requests from said instruction processor means, and receiving input data from and sending output data to the communications networks and the attached peripheral devices, including:

network input/output means coupled to said instruction processor means for processing communications input/output requests received from said instruction processor means to send network output messages and receive network input messages over the network interface;

network interface controller means coupled to said network input/output means and the communications networks for controlling the network interface to receive network input messages from the communications networks and to forward the network input messages to said network input/output means, and to accept network output messages from said network input/output means and send the network output messages to the communications networks;

channel input/output means coupled to said instruction processor means for processing peripheral device input/output requests received from said instruction processor means to send peripheral output data and receive peripheral input messages; and channel adapter means coupled to said channel input/output means and the attached peripheral devices for receiving peripheral input messages from the attached peripheral devices and forwarding the peripheral input messages to said channel input/output means, and for accepting peripheral output data received from said channel input/output means and sending the peripheral output messages to the attached peripheral devices; and storage means coupled to said instruction processor means and said network input/output processing means for storing the network input messages, the network output messages, the peripheral input data, the peripheral output data, and the computer program instructions.

14. The input/output system of claim 13, wherein said storage means includes:

a control table for storing enable and disable network interface requests being sent from said instruction processor means to said network input/output processing means, and for storing the input/output status messages being sent from said network input/output processing means to said instruction processor means;

at least one network input queue for controlling the storage of network input messages received from said network input/output processing means;

at least one network output queue for controlling the sending of network output messages received from said instruction processor means.; and a plurality of data buffers for storing network input data and network output data which are accessible by said network input/output processing means and said instruction processor means.

15. The input/output system of claim 14, wherein selected ones of said plurality of data buffers are paged in to said storage means upon first reference to said selected ones of said plurality of data buffers, control data structures including real addresses of said selected ones of said plurality of data buffers are built, and said selected ones of said plurality of data buffers remain resident as long as they are in use by the input/output system.

16. The input/output system of claim 14, wherein said instruction processor means further includes:

means for executing a build input message program instruction to build an input message program in said storage means, said input message program including at least one address of a selected one or more of said plurality of data buffers for storing a network input message;

means for executing an enqueue instruction to enqueue said input message program into said at least one network input queue;

means for executing a release input message program instruction to remove said input message program from said at least one network input queue;

means for executing a build output message program instruction to build an output message program in said storage means, said output message program including at least one address of a selected second one or more of said plurality of data buffers for storing a network output message;

means for executing an enqueue instruction to enqueue said output message program into said at least one network output queue; and means for executing a release output message program instruction to remove said output message program from said at least one network output queue.

17. The input/output system of claim 15, wherein said instruction processor means includes:

application software means for processing application computer programs, said application software means having direct access to said selected ones of said plurality of data buffers paged into said instruction processor means, wherein the network input data and the network output data are stored;

communications software means coupled to said application software means for executing requests from said application software means to obtain network input data from the communications networks and send network output data to the communications networks; and executive software means coupled to said application software means and said communications software means for processing communications input/output requests from said communications software means to obtain network input messages from and to send network output messages said network input/output processing means, and for processing peripheral input/output requests from said application software means to obtain peripheral input messages from the attached peripheral devices and to send peripheral output data to the attached peripheral devices.

18. The input/output system of claim 17, wherein said executive software means includes:

initializing means for initializing usage of a selected network interface;

resetting means for resetting usage of said selected network interface after the occurrence of an error;

receiving means for receiving network input data from said network input/output processing means over said selected network interface;

sending means for sending network output data to said network input/output processing means over said selected network interface; and terminating means for terminating usage of said selected network interface.

19. In a computer system having input/output requests for obtaining input data and sending output data, the input/output requests being either communications input/output requests or peripheral device input/output requests, communications input/output requests being for receiving network input data from, and sending network output data to, a plurality of communications networks coupled to the computer system by network interfaces and for initializing, resetting, and terminating usage of network interfaces, peripheral device input/output requests being for receiving peripheral input data from and sending peripheral output data to a plurality of attached peripheral devices coupled to the computer system, network input data from the communications networks being transferred in network input messages, network output data to the communications networks being transferred in network output messages, peripheral input data from the attached peripheral devices being transferred in peripheral input messages, and status being reported in input/output status messages, an input/output system for processing input/output requests comprising:

instruction processor means for executing computer program instructions, said instruction processor means including application software means for processing user application computer programs;

communications software means coupled to said application software means for managing requests from said application software means to obtain network input data from the communications networks and send network output data to the communications networks; and executive software means coupled to said application software means and said communications software means for processing communications input/output requests from said communications software means to obtain network input messages from and to send network output messages to the communications networks, and for processing peripheral input/output requests from said application software means to obtain peripheral input messages from the attached peripheral devices and to send peripheral output data to the attached peripheral devices;

programmable network input/output processor means coupled to said instruction processor means, the communications networks, and the attached peripheral devices for accepting input/output requests from said instruction processor means, and receiving input data from and sending output data to the communications networks and the attached peripheral devices, said programmable network input/output processor means including network input/output means coupled to the at least one instruction processor for processing communications input/output requests received from said at least one instruction processor to send network output messages and receive network input messages;

network interface controller means coupled to said network input/output means and the communications networks for controlling a network interface to receive network input messages from the communications networks and to forward the network input messages to said network input/output means, and to accept network output messages from said network input/output means and send the network output messages to the communications networks;

channel input/output means coupled to said instruction processor means for processing peripheral device input/output requests received from said instruction processor means to send peripheral output data and receive peripheral input messages; and channel adapter means coupled to said channel input/output means and the attached peripheral devices for receiving peripheral input messages from the attached peripheral devices and forwarding the peripheral input messages to said channel input/output means, and for accepting peripheral output messages received from said channel input/output means and sending the peripheral output messages to the attached peripheral devices; and a main storage unit coupled to said instruction processor means and said programmable network input/output processor means for storing the network input messages, the network output messages, the peripheral input data, the peripheral output data, and the computer program instructions; said main storage unit including a control table for storing initialization, reset, and termination communications input/output requests being sent from said instruction processor means to said programmable network input/output processor means, and for storing input/output request status messages being sent from said programmable network input/output processor means to said instruction processor means;

at least one network input queue for controlling the storage of network input messages received from said network input/output processing means;

at least one network output queue for controlling the sending of network output messages received from said instruction processor means; and a plurality of data buffers for storing network input data and network output data which are directly accessible by said programmable network input/output processor means and said application software means, said communications software means, and said executive software means.

20. The input/output system of claim 19, wherein said executive software means includes:

initializing means for initializing usage of a selected network interface;

resetting means for resetting usage of said selected network interface after the occurrence of an error;

receiving means for receiving network input data from said programmable network input/output processor means over said selected network interface;

sending means for sending network output data to said programmable network input/output processor means over said selected network interface; and terminating means for terminating usage of said selected network interface.

21. The input/output system of claim 19, wherein said instruction processor means further includes:

means for executing a build input message program instruction to build an input message program in said main storage unit, said input message program including at least one address of a selected one or more of said plurality of data buffers for storing a network input message;

means for executing an enqueue instruction to enqueue said input message program into said at least one network input queue;

means for executing a release input message program instruction to remove said input message program from said at least one network input queue;

means for executing a build output message program instruction to build an output message program in said main storage unit, said output message program including at least one address of a selected second one or more of said plurality of data buffers for storing a network output message;

means for executing an enqueue instruction to enqueue said output message program into said at least one network output queue; and means for executing a release output message program instruction to remove said output message program from said at least one network output queue.

22. In a computer system having at least one instruction processor for executing computer program instructions fetched from a main storage unit, and having input/output requests for performing input/output operations, the input/output requests being either communications input/output requests or peripheral device input/output requests, communications input/output requests being for receiving network input data from, and sending network output data to, a plurality of communications networks coupled to the computer system by network interfaces, peripheral device input/output requests being for receiving peripheral input data from, and sending peripheral output data to, a plurality of attached peripheral devices coupled to the computer system, network input data from the communications networks being transferred in network input messages, network output data to the communications networks being transferred in network output messages, peripheral input data from the attached peripheral devices being transferred in peripheral input messages, and having a network input/output processor for processing communications input/output requests for receiving network input data from, and sending network output data to, a plurality of communications networks, and for processing peripheral input/output requests for receiving peripheral input data from, and sending peripheral output data to, a plurality of attached peripheral devices, the network input/output processor executing a network input/output program and a peripheral device program, the network input/output program utilizing a control table, a network input queue, a network output queue, and associated data buffers for storing network input data and network output data, residing in the main storage unit to implement communications input/output requests, the associated data buffers being accessible to computer programs executing on the at least one instruction processor, a computer-implemented method of input/output communication with minimized system overhead and without invoking data copy operations comprising the steps of:

(a) initializing at least one network interface whereby the network input/output processor communicates with a selected one of the plurality of communications networks;

(b) accepting, by the network input/output processor, an input/output request from the instruction processor;

(c) forwarding the input/output request to the network input/output program if the input/output request is a communications input/output request or to the peripheral device program if the input/output request is a peripheral device input/output request;

(d) receiving a network input message over said at least one network interface from a communications network by processing an entry in the network input queue, storing the network input data included in the network input message in at least one data buffer in the main storage unit, and notifying the instruction processor of the reception of the network input data when the communications input/output request is for receiving network input data from the communications network;

(e) obtaining network output data from at least one data buffer in the main storage unit, sending a network output message containing the network output data to a communications network by processing an entry in the network output queue, and returning the status of the requested input/output operation in the control table when the communications input/output request is for sending network output data to the communications network;

(f) initiating a peripheral input request, receiving a peripheral input message from a peripheral device, storing the peripheral input data in the main storage unit, and notifying the instruction processor of the reception of the peripheral input message when the peripheral device input/output request is for receiving peripheral input data from a peripheral device; and (g) receiving peripheral output data from the instruction processor, sending the peripheral output data to a peripheral device, and returning the status of the requested input/output operation in the control table when the peripheral device input/output request is for sending peripheral output data to a peripheral device.

23. The computer-implemented method of input/output communication of claim 22, further including the step:

(h) terminating said at least one network interface.

24. In a computer system having at least one instruction processor for executing computer program instructions fetched from a main storage unit, and having communications input/output requests for receiving network input data from, and sending network output data to, a plurality of communications networks coupled to the computer system by network interfaces, network input data from the communications networks being transferred in network input messages, network output data to the communications networks being transferred in network output messages, a network input/output processor for processing requests for receiving network input data from and sending network output data to a plurality of communications networks, the network input/output processor utilizing a control table, a network input queue, a network output queue, and associated data buffers for storing network input data and network output data residing in the main storage unit to implement communications input/output requests, the associated data buffers being accessible to computer programs executing on the at least one instruction processor, a computer-implemented method of input/output communication with minimized system overhead and without invoking data copy operations comprising the steps of:

(a) initializing a network interface whereby the network input/output processor communicates with a selected one of the plurality of communications networks;

(b) accepting, by the network input/output processor, a communications input/output request from the instruction processor;

(c) receiving a network input message from a communications network by processing an entry in the network input queue, storing the network input data included in the network input message in at least one data buffer in the main storage unit, and notifying the instruction processor of the reception of the network input data when the communications input/output request is for receiving network input data from the communications network; and (d) obtaining network output data from at least one data buffer in the main storage unit, sending a network output message contacting the network output data to a communications network by processing an entry in the network output queue, and returning the status of the requested input/output operation in the control table when the communications input/output request is for sending network output data to the communications network.

25. The computer-implemented method of input/output communication of claim 24, wherein step (a) includes the steps of:

(a1) acquiring storage in the main storage unit for the data buffers associated with the network input queue and the network output queue;

(a2) assigning a network interface for a communications path between the network input/output processor and a communications network;

(a3) starting processes in the instruction processor to monitor the usage of the network input queue and the network output queue;

(a4) storing network input/output processing control information into a selected one of the data buffers in the main storage unit;

(a5) signaling the network input/output processor to initialize said network interface; and (a6) initializing said network interface by sending network output messages including maintenance information to the network input/output processor.

26. The computer-implemented method of input/output communication of claim 24, wherein step (c) includes the steps of:

(c1) selecting at least one data buffer in the main storage unit to receive network input data;

(c2) incrementing a network input counter indicating that reception of network input data is requested and a selected network input queue entry is in use;

(c3) building an input message program, said input message program including control information describing said at least one data buffer where network input data is to be stored upon reception;

(c4) enqueuing said input message program to said selected network input queue entry by the at least one instruction processor;

(c5) dequeuing said input message program from said selected network input queue by the network input/output processor over said network interface;

(c6) receiving a network input message from the communications network by the network input/output processor;

(c7) storing the network input data contained in said network input message into the main storage unit in said at least one data buffer described by said input message program;

(c8) writing the status of the network input data transfer into said input message program in said selected network input queue entry;

(c9) interrupting the instruction processor to initiate the processing of the network input data;

(c10) releasing said input message program making said selected network input queue entry available for reuse; and (c11) decrementing said network input counter indicating that requested reception of network input data is complete and said selected network input queue entry may be reused.

27. The computer-implemented method of input/output communication of claim 26, wherein step (c3) is implemented by a build input message program instruction executed by the at least one instruction processor.

28. The computer-implemented method of input/output communication of claim 26, wherein step (c4) is implemented by an enqueue to network input queue instruction executed by the at least one instruction processor.

29. The computer-implemented method of input/output communication of claim 26, wherein step (c10) is implemented by a release input message program instruction executed by the at least one instruction processor.

30. The computer-implemented method of input/output communication of claim 24, wherein step (d) includes the steps of:

(d1) storing network output data to be sent to the communications network in at least one data buffer in the main storage unit by the at least one instruction processor;

(d2) incrementing a network output counter indicating that transmission of network output data is requested and a selected network output queue entry and associated said at least one data buffer are in use;

(d3) building an output message program, said output message program including control information describing said at least one data buffer where the network output data to be sent is stored;

(d4) enqueuing said output message program in said selected network output queue entry by the at least one instruction processor;

(d5) dequeuing said output message program from said selected network output queue entry by the network input/output processor;

(d6) sending the network output data in said at least one data buffer referenced by said output message program to the communications network over said network interface;

(d7) writing the status of the network output data transfer into said output message program in said selected network output queue entry;

(d8) releasing said output message program making said selected network output queue entry available for reuse; and (d9) decrementing said network output counter indicating that the requested transmission of network output data is complete and said selected network output queue entry may be reused.

31. The computer-implemented method of input/output communication of claim 30, wherein step (d3) is implemented by a build output message program instruction executed by the at least one instruction processor.

32. The computer-implemented method of input/output communication of claim 30, wherein step (d4) is implemented by an enqueue to network output queue instruction executed by the at least one instruction processor.

33. The computer-implemented method of input/output communication of claim 30, wherein step (d8) is implemented by a release output message program instruction executed by the at least one instruction processor.

34. In a computer system having at least one instruction processor for executing computer program instructions fetched from a main storage unit, and having communications input/output requests for receiving network input data from, and sending network output data to, a plurality of communications networks coupled to the computer system by network interfaces, network input data from the communications networks being transferred in network input messages, network output data to the communications networks being transferred in network output messages, a network input/output processor for processing requests for receiving network input data from, and sending network output data to, a plurality of communications networks, the network input/output processor utilizing a control table, a network input queue, a network output queue, and associated data buffers for storing network input data and network output data residing in the main storage unit to implement communications input/output requests, the associated data buffers being accessible to computer programs executing on the at least one instruction processor, a computer-implemented method of input/output communication with minimized system overhead and without invoking data copy operations comprising the steps of:

(a) initializing a network interface whereby the network input/output processor communicates with a selected one of the plurality of communications networks; said initializing step including the steps of (a1) acquiring storage in the main storage unit for the data buffers associated with the network input queue and the network output queue;

(a2) assigning a network interface for a communications path between the network input/output processor and a communications network;

(a3) starting processes in the instruction processor to monitor the usage of the network input queue and the network output queue;

(a4) storing network input/output processing control information into a selected one of the data buffers in the main storage unit;

(a5) signaling the network input/output processor to initialize said network interface; and (a6) initializing said network interface by sending network output messages including maintenance information to the network input/output processor;

(b) accepting, by the network input/output processor, a communications input/output request from the instruction processor;

(c) receiving a network input message from a communications network by processing an entry in the network input queue, storing the network input data included in the network input message in at least one data buffer ha the main storage unit, and notifying the instruction processor of the reception of the network input data when the communications input/output request is for receiving network input dam from the communications network; said receiving network input message step including the steps of (c1) selecting at least one data buffer in the main storage unit to receive network input data;

(c2) incrementing a network input counter indicating that reception of network input data is requested and a selected network input queue entry is in use;

(c3) building an input message program, said input message program including control information describing said at least one data buffer where network input data is to be stored upon reception;

(c4) enqueuing said input message program to said selected network input queue entry by the at least one instruction processor;

(c5) dequeuing said input message program from said selected network input queue by the network input/output processor;

(c6) receiving a network input message from the communications network by the network input/output processor over said network interface;

(c7) storing the network input data contained in said network input message into the main storage unit in said at least one data buffer described by said input message program;

(c8) writing the status of the network input data transfer into said input message program in said selected network input queue entry;

(c9) interrupting the instruction processor to initiate the processing of the network input data;

(c10) releasing said input message program making it available for reuse; and (c11) decrementing said network input counter indicating that requested reception of network input data is complete and said selected network input queue entry may be reused; and (d) obtaining network output data from at least one data buffer in the main storage unit, sending a network output message containing the network output data to a communications network by processing an entry in the network output queue, and returning the status of the requested input/output operation in the control table when the communications input/output request is for sending network output data to the communications network, said obtaining step including the steps of (d1) storing network output data to be sent to the communications network in at least one data buffer in the main storage unit by the at least one instruction processor;

(d2) incrementing a network output counter indicating that transmission of network output data is requested and a selected network output queue entry and associated said at least one data buffer are in use;

(d3) building an output message program, said output message program including control information describing the at least one data buffer where the network output data to be sent is stored;

(d4) enqueuing said output message program in said selected network output queue entry by the at least one instruction processor;

(d5) dequeuing said output message program from said selected network output queue entry by the network input/output processor;

(d6) sending the network output data in said at least one data buffer referenced by said output message program to the communications network over said network interface;

(d7) writing the status of the network output data transfer into said output message program in said selected network output queue entry;

(d8) releasing said output message program making it available for reuse; and (d9) decrementing said network output counter indicating that the requested transmission of network output data is complete and said selected network output queue entry may be reused.

\* \* \* \* \*